United States Patent
Yoon et al.

(10) Patent No.: US 12,168,929 B2
(45) Date of Patent: Dec. 17, 2024

(54) QUANTIFYING ZONAL FLOW IN MULTI-LATERAL WELLS VIA TAGGANTS OF FLUIDS

(71) Applicant: Saudi Arabian Oil Company, Dhahran (SA)

(72) Inventors: Bora Yoon, Watertown, MA (US); Hooisweng Ow, Woburn, MA (US); Sehoon Chang, Boston, MA (US); Wei Wang, Quincy, MA (US); Rena Shi, Cambridge, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/182,235

(22) Filed: Mar. 10, 2023

(65) Prior Publication Data
US 2024/0301790 A1 Sep. 12, 2024

(51) Int. Cl.
*E21B 49/08* (2006.01)
*C09K 8/60* (2006.01)
*E21B 41/00* (2006.01)
*C09K 103/00* (2006.01)

(52) U.S. Cl.
CPC ......... *E21B 49/08* (2013.01); *C09K 8/60* (2013.01); *E21B 41/0035* (2013.01); *C09K 2103/00* (2013.01); *C09K 2211/14* (2013.01)

(58) Field of Classification Search
CPC ......... E21B 47/11; E21B 47/111; E21B 34/06
USPC .................................................. 166/250.12
See application file for complete search history.

(56) References Cited

U.S. PATENT DOCUMENTS

| | | | |
|---|---|---|---|
| 5,608,214 A | * | 3/1997 | Baron ............... G01V 5/12 250/269.3 |
| 6,659,175 B2 | | 12/2003 | Malone et al. |
| 7,560,690 B2 | | 7/2009 | Stray et al. |
| 8,949,029 B2 | | 2/2015 | Nyhavn |

(Continued)

FOREIGN PATENT DOCUMENTS

WO WO 2014104914 7/2014

OTHER PUBLICATIONS

SLB, Downhole Interval Control Valves, retrieved Mar. 29, 2024 from https://www.slb.com/products-and-services/innovating-in-oil-and-gas/completions/well-completions/intelligent-completions/downhole-interval-control-valves#:~:text=Interval%20or%20flow%20control%20valves,interventions%2C%20and%20maximize%20 (Year: 2024).*

(Continued)

*Primary Examiner* — Angela M DiTrani Leff
(74) *Attorney, Agent, or Firm* — Fish & Richardson P.C.

(57) ABSTRACT

A method, system, and taggants (tracers) for quantifying zonal flow in a multi-lateral well having a wellbore with a first lateral and second lateral. The technique includes flowing first produced fluid from a formation via the first lateral into production tubing providing a first taggant through a first dosing tubing to the first lateral, and flowing second produced fluid from the formation via the second lateral into the production tubing and providing a second taggant through a second dosing tubing to the second lateral. A produced stream having the first produced fluid and the second produced fluid flows uphole through the production tubing and discharges from the wellbore. The produced stream may be analyzed to measure an amount of the first taggant in the produced stream and an amount of the second taggant in the produced stream.

20 Claims, 39 Drawing Sheets

(56) References Cited

U.S. PATENT DOCUMENTS

| | | | |
|---|---|---|---|
| 9,133,683 B2 | 9/2015 | Dyer et al. | |
| 9,290,689 B2* | 3/2016 | Lafitte | E21B 47/11 |
| 9,910,026 B2 | 3/2018 | Zhang et al. | |
| 10,669,839 B2 | 6/2020 | Nyhavn | |
| 10,815,775 B2* | 10/2020 | Lauritzen | E21B 27/02 |
| 2004/0094297 A1* | 5/2004 | Malone | C09K 8/035 |
| | | | 166/250.15 |
| 2007/0241277 A1* | 10/2007 | Stray | E21B 47/11 |
| | | | 250/303 |
| 2007/0289740 A1* | 12/2007 | Thigpen | E21B 37/06 |
| | | | 166/250.01 |
| 2011/0240287 A1* | 10/2011 | Hartshorne | E21B 47/11 |
| | | | 166/250.12 |
| 2011/0257887 A1* | 10/2011 | Cooper | E21B 47/11 |
| | | | 702/12 |
| 2014/0299756 A1* | 10/2014 | Cameron | E21B 47/11 |
| | | | 250/259 |
| 2015/0130468 A1* | 5/2015 | Christian | E21B 47/11 |
| | | | 324/324 |
| 2018/0282605 A1* | 10/2018 | Borrell | C09K 8/58 |
| 2019/0382652 A1* | 12/2019 | Brierley | C09K 8/70 |
| 2020/0283678 A1* | 9/2020 | Ogle | C09K 8/88 |
| 2021/0396130 A1* | 12/2021 | Trinder | E21B 47/138 |
| 2022/0056329 A1* | 2/2022 | AlJabri | C09K 11/06 |
| 2022/0162927 A1* | 5/2022 | Rowaihy | E21B 33/124 |
| 2023/0193755 A1* | 6/2023 | Chen | E21B 43/12 |
| | | | 166/250.12 |

OTHER PUBLICATIONS

Aggrey et al., "A Novel Approach of Detecting Water Influx Time in Multi-Zone and Multilateral Completions Using Real-Time Downhole Pressure Data," presented at the SPE Middle East Oil and Gas Show and Conference, Manama, Bahrain, Mar. 11-14, 2007, 11 pages.

Andresen et al., "Interventionless Surveillance in a Multi-Lateral Horizontal Well," presented at the IADC/SPE Drilling Conference and Exhibition, San Diego, California, Mar. 6-8, 2012, 9 pages.

Anopov et al., "Permanent Downhole Chemical Tracer System for Wireless Surveillance and Optimizing Well Production," presented at the SPE/IADC Middle East Drilling Technology Conference and Exhibition, Abu Dhabi, UAE, Jan. 31, 2018, 13 pages.

Chen et al., "Upconversion Nanoparticles: Design, Nanochemistry, and Applications in Theranostics," Chemical Reviews, Mar. 2014, 114(10):5161-5214, 101 pages.

Dyer et al., "Technology Update: New Intelligent Completion System Enables Compartment-Level Control in Multilateral Wells," Journal of Petroleum Technology, Sep. 2016, 68(09):18-21, 3 pages.

Dyrli et al., "Ten Years of Reservoir Monitoring with Chemical Inflow Tracers—What Have We Learnt and Applied Over the Past Decade?" presented at the SPE Kuwait Oil & Gas Show and Conference, Kuwait City, Kuwait, Oct. 17, 2017, 22 pages.

Isoppo et al., "Highly Fluorescent Lipophilic 2,1,3-Benzothiadiazole Fluorophores as Optical Sensors for Tagging Material and Gasoline Adulteration with Ethanol," Sensors and Actuators B: Chemical, Apr. 2020, 35 pages.

Jose et al., "Benzophenoxazine-Based Fluorescent Dyes for Labeling Biomolecules," Tetrahedron, Nov. 2006, 62:(48):11021-11037, 17 pages.

Joubran, "Intelligent Completions: Design and Reliability of Interval Control Valves in the Past, Present, and Future," presented at the Offshore Technology Conference, Houston, Texas, May 3, 2018, 29 pages.

Muradov et al., "Zonal Rate Allocation in Intelligent Wells," presented at the EUROPEC/EAGE Conference and Exhibition, Amsterdam, The Netherlands, Jun. 8-11, 2009, 13 pages.

Ow et al., "First Deployment of a Novel Advanced Tracers System for Improved Waterflood Recovery Optimization," presented at the Abu Dhabi International Petroleum Exhibition and Conference, Abu Dhabi, UAE, Nov. 12, 2018, 10 pages.

pubchem.ncbi.nlm.nih.gov [online], "2-(2-Ethylhexyl)-6,7-dimethoxy-1H-benz[de]isoquinoline-1,3(2H)-dione," available on or before Mar. 6, 2024, via Internet Archive: Wayback Machine URL <https://web.archive.org/web/20240306211042/https://pubchem.ncbi.nlm.nih.gov/compound/92025#section=2D-Structure>, retrieved on Mar. 6, 2024, 12 pages.

pubchem.ncbi.nlm.nih.gov [online], "Bis(2-methylpropyl) 4,10-dicyanoperylene-3,9-dicarboxylate," available on or before Mar. 6, 2024, via Internet Archive: Wayback Machine URL <https://web.archive.org/web/20240306210457/https://pubchem.ncbi.nlm.nih.gov/compound/13750327>, retrieved on Mar. 6, 2024, 15 pages.

pubchem.ncbi.nlm.nih.gov [online], "Perylene Red," available on or before Mar. 6, 2024, via Internet Archive: Wayback Machine URL <https://web.archive.org/web/20240306211744/https://pubchem.ncbi.nlm.nih.gov/compound/16172388#section=Deprecated-CAS>, retrieved on Mar. 6, 2024, 16 pages.

Salimov et al., "Allocation Of Zonal Production In Smart Wells: Offshore Abu-Dhabi Case Study," presented at the Abu Dhabi International Petroleum Exhibition & Conference, Abu Dhabi, UAE, Nov. 16, 2017, 11 pages.

Thomas et al., "Deployment and Detection of a Novel Barcoded Advanced Tracers System for the Optimization of Improved Waterflood Recovery in Hydrocarbon Reservoirs," presented at the SPE Middle East Oil and Gas Show and Conference, Manama, Bahrain, Mar. 20, 2019, 10 pages.

Williams et al., "Wireless Reservoir Surveillance Using Intelligent Tracers," presented at the Offshore Technology Conference, Houston, Texas, Apr. 30-May 3, 2012, 11 pages.

Zhou et al., "Upconversion Luminescent Materials: Advances and Applications," Chemical Reviews, Dec. 2014, 115(1):395-465, 71 pages.

\* cited by examiner

| Concentration | Before Background Subtraction | | After Background Subtraction | |
|---|---|---|---|---|
| | 590 - 800 nm | 604 nm | 590 - 800 nm | 604 nm |
| 10 ppm | 94% | 94% | 92% | 92% |
| 5 ppm | 88% | 87% | 84% | 84% |
| 3 ppm | 88% | 86% | 81% | 82% |
| 1 ppm | 101% | 94% | 80% | 80% |
| 0.5 ppm | 125% | 110% | 82% | 83% |
| 0.1 ppm | 236% | 177% | 23% | 45% |

Recovery Factor

FIG. 19

| Concentration | Recovery Factor | | | |
|---|---|---|---|---|
| | Before Background Subtraction | | After Background Subtraction | |
| | 550 - 750 nm | 597 nm | 550 - 750 nm | 597 nm |
| 5 ppm | 108% | 105% | 101% | 100% |
| 3 ppm | 102% | 97% | 93% | 91% |
| 1 ppm | 129% | 121% | 96% | 100% |
| 0.5 ppm | 115% | 103% | 54% | 63% |

FIG. 25

(A) Perylene Derivatives (B) Pyrromethene Derivatives (C) Benzothiadiazole Derivatives (D) DPA/PDCA Derivatives R = -CH$_2$CH$_3$, -(CH$_2$)$_3$CH$_3$, -(CH$_2$)$_5$CH$_3$, -(CH$_2$)$_7$CH$_3$, -(CH$_2$)$_9$CH$_3$, -(CH$_2$)$_{11}$CH$_3$, -CH$_2$C$_6$H$_5$ (A)

(B)

(C)

(D)

QUANTIFYING ZONAL FLOW IN MULTI-LATERAL WELLS VIA TAGGANTS OF FLUIDS

TECHNICAL FIELD

This disclosure relates to reservoir management involving quantifying zonal flow in multi-lateral wells.

BACKGROUND

A wellbore in a subterranean formation in the Earth crust may be treated. The wellbore treatments may be to facilitate production of hydrocarbon, such as crude oil or natural gas, from the subterranean formation. The wellbore treatments may be to collect data and understand the production.

Hydrocarbon reservoir management may be accomplished by increasing or optimizing the recovery of oil and gas while reducing the capital investments and operating expenses. Flow model predictions may be combined with price forecasts to estimate how much revenue will be generated by a proposed reservoir management plan. Revenue stream forecasts may be used to prepare both short and long term budgets. The reservoir management process can be characterized as integrated, dynamic, and ongoing. The process is integrated because various technical, economic, and other factors may play roles in managing a reservoir, which can work in an integrated manner. For instance, the management may decide when to initiate an enhanced oil recovery (EOR) process on basis of market conditions.

Crude oil development and production in oil reservoirs may be separated into at least the three phases of primary, secondary, and tertiary. Primary recovery (for example, via pressure depletion) and secondary oil recovery (for example, via water injection) in combination generally recover about 20% to 50% of original oil in place (OOIP). Therefore, a large amount of oil (for example, at least 50% of the crude oil in the reservoir) typically remains in the reservoir or geological formation after these conventional oil-recovery processes of primary recovery and secondary recovery. Primary and secondary recovery of production can leave up to 75% of the crude oil in the well. Primary oil recovery is generally limited to hydrocarbons that naturally rise to the surface or recovered via artificial lift devices such as pumps. Secondary recovery employs water and gas injection to displace oil to the surface.

A way to further increase oil production is through tertiary recovery also known as EOR. EOR or tertiary oil recovery increases the amount of crude oil or natural gas that can be extracted from a reservoir or geological formation. Although typically more expensive to employ on a field than conventional recovery, EOR can increase production from a well up to 75% recovery or more. EOR or tertiary recovery can extract crude oil from an oil field that cannot be extracted otherwise. There are different EOR or tertiary techniques.

An understanding of the hydrocarbon flow dynamics, flow paths, and produced/available amounts of hydrocarbon in a given reservoir can aid in reservoir management.

SUMMARY

An aspect relates to a method of quantifying zonal flow in a multi-lateral well, including: flowing first produced fluid having hydrocarbon from a subterranean formation via a first lateral in a wellbore of the multi-lateral well through a first valve into production tubing in the wellbore; flowing second produced fluid having hydrocarbon from the subterranean formation via a second lateral in the wellbore through a second valve into the production tubing; providing a first taggant through a first dosing tubing to the first produced fluid in the first lateral; providing a second taggant through a second dosing tubing to the second produced fluid in the second lateral; flowing a produced stream having the first produced fluid and the second produced fluid uphole through the production tubing and discharging the produced stream from the wellbore; and analyzing the produced stream to measure an amount of the first taggant in the produced stream and an amount of the second taggant in the produced stream, wherein the first taggant and the second taggant are oil soluble.

Another aspect relates to a method of quantifying zonal flow in a multi-lateral well, including: providing a first tracer through a first dosing tubing to a first region of a wellbore of the multi-lateral well, the first region associated with a first lateral of the wellbore; providing a second tracer through a second dosing tubing to a second region of the wellbore, the second region associated with a second lateral of the wellbore, wherein the first tracer and the second tracer are each oil soluble and optically detectable; flowing from a subterranean formation a first produced fluid comprising hydrocarbon through the first lateral and a first valve into production tubing in the wellbore; flowing from the subterranean formation a second produced fluid comprising hydrocarbon through the second lateral and a second valve into the production tubing; flowing a produced stream comprising the first produced fluid and the second produced fluid uphole through the production tubing and discharging the produced stream from the wellbore; and analyzing the produced stream to measure an amount of the first tracer in the produced stream and an amount of the second tracer in the produced stream.

Yet another aspect relates to a method of quantifying zonal flow in a multi-lateral well, including: providing a first taggant from Earth surface through a first dosing tubing to a first region in a wellbore of the multi-lateral well, wherein the wellbore is formed through the Earth surface into a subterranean formation in Earth crust, wherein the first region is a region of intersection of a first lateral in the wellbore with a vertical portion of the wellbore; providing a second taggant from the Earth surface through a second dosing tubing to a second region in the wellbore, wherein the second region is a region of intersection of a second lateral in the wellbore with the vertical portion; producing a first produced fluid from the subterranean formation through the first lateral into production tubing in the wellbore; producing a second produced fluid from the subterranean formation through the second lateral into the production tubing; flowing a produced stream comprising the first produced fluid and the second produced fluid uphole through the production tubing and discharging the produced stream from the wellbore; and analyzing the produced stream to measure an amount of the first taggant in the produced stream and an amount of the second taggant in the produced stream, wherein the first taggant and the second taggant each comprise at least one of Lumogen Red (LR), Lumogen Violet (LV), Lumogen Yellow (LY), Nile Red (NR), a hydrophobically-modified Nile Blue (NB), a perylene derivative, a pyrromethene derivative, a benzothiadiazole derivative, a dipicolinic acid (DPA) derivative, a phenanthroline dicarboxylic acid (PDCA) derivative, curcumin, or an upconverting nanoparticle (UCNP).

The details of one or more implementations are set forth in the accompanying drawings and the description below.

Other features and advantages will be apparent from the description and drawings, and from the claims.

BRIEF DESCRIPTION OF DRAWINGS

FIG. 19 is a table of recovery factors for LR after two-step purification.

FIG. 25 is a table of recovery factors.

DETAILED DESCRIPTION

Figure 1:
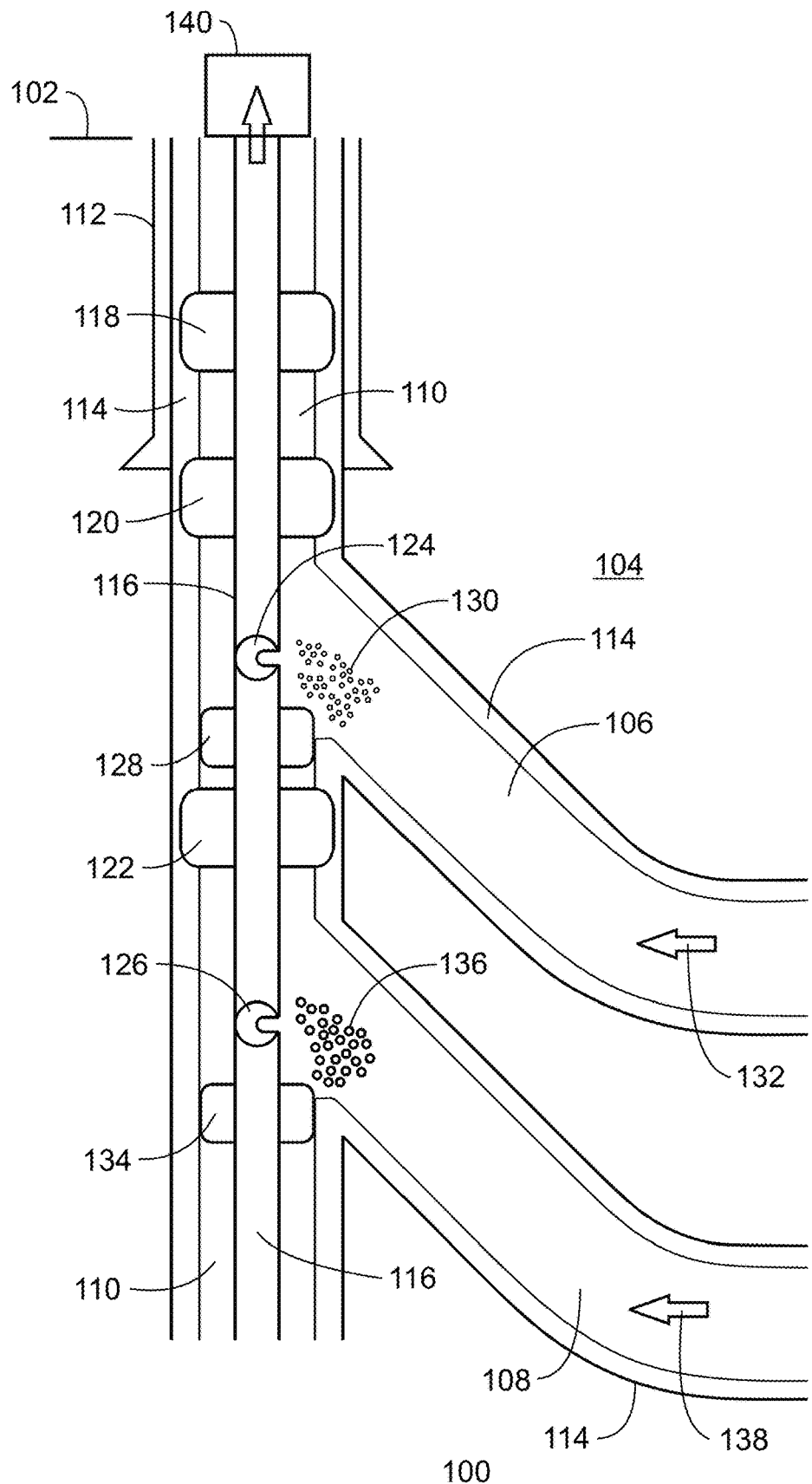
FIG. 1 is a diagram of a wellbore formed through the Earth surface into a subterranean formation in the Earth crust.

Some aspects of the present disclosure are directed to oil-soluble tracers for quantifying zonal flow in multi-lateral wells. The tracers can be labeled as taggants of fluids. Dosing tubing (e.g., capillary dosing lines) is utilized to inject the tracers from the wellhead at surface into the different downhole zones (laterals). An abrupt tracer dosing shut off generates a transient in tracer concentrations as the production flows carrying the tracers to the surface, obviating the need to shut in the well.

An embodiment is a method of quantifying zonal flow in a multi-lateral well, including providing a first taggant through a first dosing tubing to a first lateral in a wellbore of the multi-lateral well, providing a second taggant through a second dosing tubing to a second lateral in the wellbore, flowing a first produced fluid having hydrocarbon from a subterranean formation via the first lateral through a first valve into production tubing in the wellbore, and flowing a second produced fluid having hydrocarbon from the subterranean formation via the second lateral through a second valve into the production tubing. The method includes flowing a produced stream including the combined first produced fluid and second produced fluid uphole through the production tubing and discharging the produced stream from the wellbore. The method includes analyzing the produced stream to measure an amount of the first taggant in the produced stream and an amount of the second taggant in the produced stream, wherein the first taggant and the second taggant are oil soluble.

Applicable oil-soluble taggants (tracers) include, for example, Lumogen Red (LR), Lumogen Violet (LV), Lumogen Yellow (LY), Nile Red (NR), hydrophobically-modified Nile Blue (NB), perylene derivatives, pyrromethene derivatives, benzothiadiazole derivatives, dipicolinic acid (DPA) derivatives, phenanthroline dicarboxylic acid (PDCA) derivatives, curcumin, and upconverting nanoparticles (UCNP).

The carrier fluid of the tracers (taggants) as injected may be crude oil, mineral oil, solvent mixtures, dodecanol, etc.

At surface, analytical techniques may be employed to measure or detect tracers in produced fluid.

The tracer (taggant) concentrations dosed into the laterals and collected with the produced fluids at the surface over a prescribed time duration are utilized to quantitate (quantify) the contributions of fluids (produced fluids) from each lateral. The tracers may be selectively soluble taggants of fluids for quantification of zonal flow in multi-lateral wells (multi-lateral wellbores). The tracers may be selectively soluble, for example, for hydrocarbon phases or crude oil.

Disclose herein are selectively soluble taggants to be injected from the surface via dosing lines (tubing, conduits) into different sections or zones of a multilateral well. These taggants are designed to mark different fluid phases produced from each zone and be carried by the produced oil and water to the surface. Their concentrations measured at the surface—specifically, how their concentrations decrease over time after dosing is shut off—may allow for the computation of the oil producing rates from each zone.

Compositions of the oil-soluble taggants may include hydrophobic organic fluorophores with good to excellent solubility in apolar phases, such as the commercially available Lumogen® F dyes, Nile Red (NR), and pyrromethene-based molecules, benzothiadiazole-based molecules discussed below. Also discussed are molecular ligands capable of sensitizing lanthanide ions for more efficient luminescent processes, such as derivatives of dipicolinic acids and phenanthroline dicarboxylic acids, that have been specifically chemically functionalized for solubility in apolar solvents or hydrophobic environment. Disclosed are different organic fluorophores with facilely tunable solubility, e.g., Nile Blue (NB), through one-pot chemistries and naturally fluorescent oil-soluble food colorant (such as curcumin) as a competent taggant for the oil phase as well.

Describe herein different classes of oil-soluble materials, such as lanthanide ions complexed by hydrophobic ligands, e.g., beta-diketonate complexes, dodecane tetraacetic acid-based macrocyclic complexes, etc., for detection by inductively coupled plasma (ICP) spectroscopy and the like.

Disclosed are the characteristics and the formulation of a carrier fluid in which the taggants would be dissolved or suspended in, so that they can be injected and transported into the interval (lateral, zone) from the surface. The carrier fluid is miscible with the target-fluid phase downhole. The taggants can be dissolved or suspended in the carrier fluid at concentrations above 1,000 parts per million by volume (ppmv), such as in the range of 1,000 ppmv to 10,000 ppmv. For oil-soluble taggants, the boiling point of the carrier fluid is preferably higher than 100° C. with low volatility/flash point, e.g., dodecanol. The taggants could also be dissolved or suspended in crude oil or crude oil diluted with solvents.

Analysis and detection strategies for the oil-phase taggants may include a first action may be chromatographic that coarsely removes most of the crude oil components with the aid of a specific solvent. A second action may be filtration by Celite® (hereinafter "Celite") and a solvent mixture that further removes the fraction of crude oil that coelutes with the taggant. Celite is Celite® 545 (from Sigma-Aldrich), which is a formulation of Diatomaceous Earth that can be utilized as a filtration aid for the pre-processing of distillate. Diatomaceous earth is considered as skeletal remains of single-celled algae/diatoms formed due to sedimentary deposits. Coeluts is generally of two or more chemical compounds to elute from a chromatographic column together.

The eluent is evaluated spectrometrically and the concentrations of the taggants are quantified. Automatable chromatographic methods with inline optical detection, such as the previously described solid phase extraction (SPE)-two dimensional (2D)—high-performance liquid chromatography (HPLC) inline detection techniques for analyzing tracers (e.g., crosswell tracers), can be used as well.

The complexities of well completions have increased steadily over the years with the rapid advancement in extended reach drilling technology. Wells are routinely completed in multilayered reservoirs, with multilaterals that have compartments with varying pressure. Intelligent completions that include valves and sensors can contribute to efficient reservoir management practice to monitor production and execute appropriate and beneficial well intervention. The valves may include, for example, flow control valves (FCVs). The sensors may include sensors or gauges [e.g., permanent downhole gauges (PDGs)] and may measure, for example, that measure water cut (e.g., volume percent water) and fluid flow rate (e.g., mass per time or volume per time) including in real time. In such intelligent completions, electrically controllable FCVs can be remotely adjusted in real-time to increase, balance, or optimize production after oil and water rate feedbacks from downhole PDGs in the field for relatively large areas of a reservoir, increasing or maximizing hydrocarbon recovery with shorter optimization cycle due to more informed reservoir management decisions.

In one example, the Manara production and reservoir management system, which was launched as a collaboration between Saudi Arabian Oil Company (having headquarters in Dhahran, Saudi Arabia) and Schlumberger Limited (SLB) (having headquarters in Houston, Texas, USA), provides for simultaneous, real-time monitoring and control utilizing a single electric control line of up to 60 compartments in multilateral wells, with extended-reach sections longer than 12 kilometers (km). Nonetheless, even with the commercialization of the Manara platform in September 2015, pervasive adoption of the technologies that enable or facilitate compartment-level control have been stymied by costs and long-term device reliability in high salinity and pressure downhole conditions.

For multilateral wells, the installation of interval control valves (ICVs) that can have adequate controls (e.g., simplified controls), run history (e.g., long-term run history), and reliability may be a beneficial intermediate step toward the vision of full-field deployment of entirely automatable intelligent completions with real-time optimization controls. The employment of production logging tools and data from production history, flow tests, downhole gauge readings, zonal production allocation, and well performance analysis may be inferred and the increasing or optimization of hydrocarbon production can be achieved with adjustments of the ICVs. However, the ability to infer zonal oil and water contribution from different laterals with simple surface measurements, without having to perform downhole metering (involving attendant cabling, downhole electronic devices, and associated costs) may still be highly desirable.

Resman AS is a Norwegian service company offering a tracer technology that embeds unique chemical tracers into a porous polymer resin, such as indicated in FIG. 1. These resin monoliths are installed during well completions and can be placed at different production intervals as a semipermanent (e.g., approximate 10-year lifetime) downhole monitoring system. When the resins containing the tracers are exposed to the target well fluids (hydrocarbon and/or water), the unique tracers are released at a rate that can be interrogated at relatively high sensitivity at the surface. Because the detection of constantly released tracers from different intervals at the surface does not offer quantifiable information other than which zone is producing, the creation of a transient is therefore implemented for quantitation of fluid production rates from each interval. This necessitates a temporary shut-in of production at the surface, which may introduce artifacts in the fluid flow that do not accurately characterize zonal contribution when production is resumed. In addition, the release of chemical tracers from a polymer matrix is mechanistically complex and dependent on chemical diffusion, interfacial phenomena, and various chemical interactions between the sequestered tracer and the polymer matrix. To engineer a similar degradable material system suitable for the expected operational environment would require substantial expertise and time investment.

Figure 2:
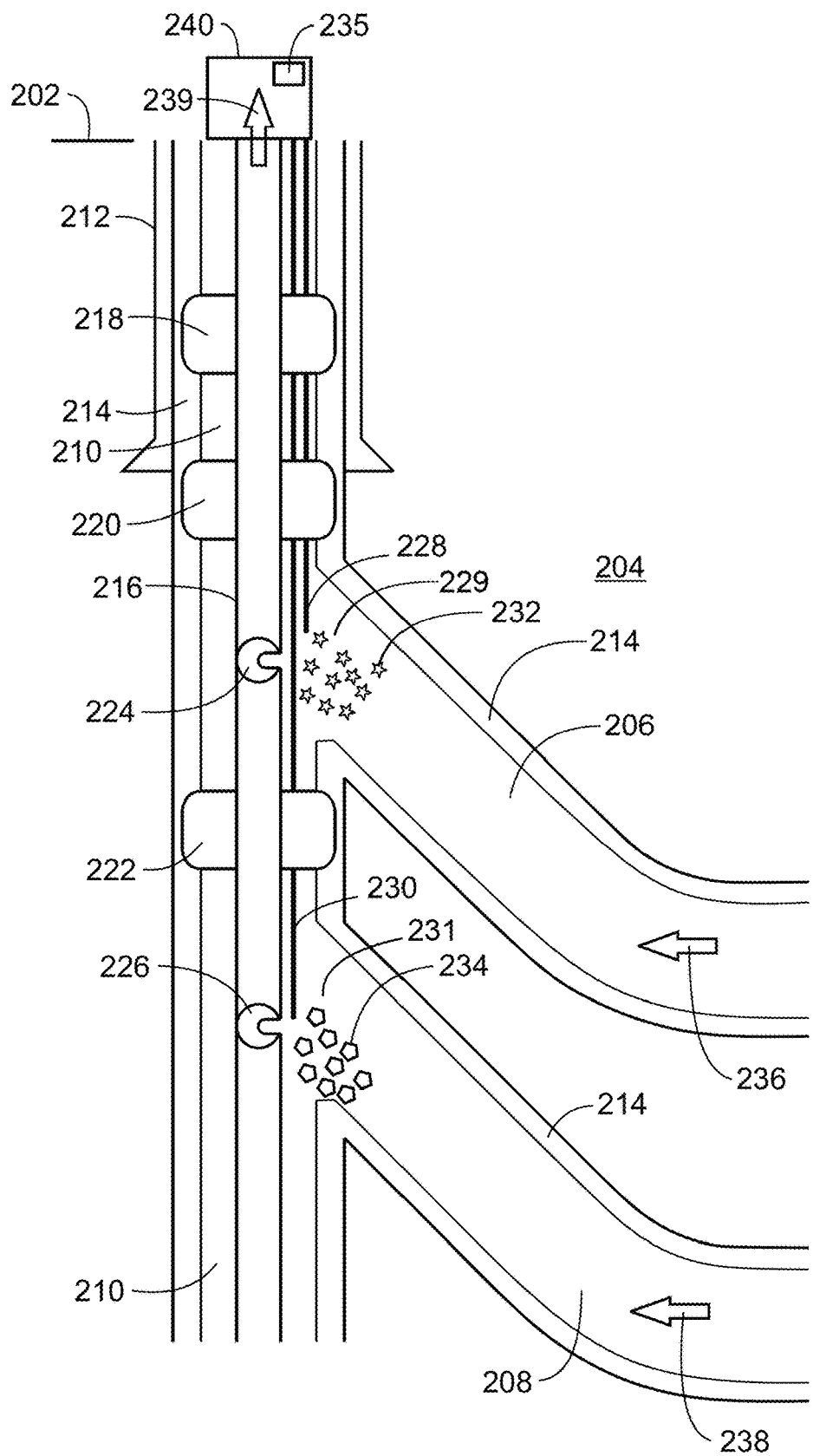
FIG. 2 is a wellbore formed through the Earth surface into a subterranean formation in the Earth crust.

As indicated in FIG. 2, a different technique may measure at surface the zonal oil and water contribution to fluid flow without disruption to production. By installing a dosing line (tubing) (e.g., passive, capillary, permanent or substantially permanent) from the surface during well completion, selectively soluble tracers can be injected from the wellhead into the different zones during routine well performance diagnostics. An abrupt tracer dosing shut-off would generate the transient in tracer concentrations as the production flows carry the tracers to the surface, obviating the need to shut in the well.

FIG. 1 and FIG. 2 provide for a comparison of features between selective soluble tracers dosed via dosing tubing from the surface (FIG. 2) and a controlled-release resin installed as part of the completion (FIG. 1). The technique indicated by FIG. 1 generally needs a well shut-in for measurement and analysis. The technique indicated by FIG. 2 generally can avoid a well shut-in for measurement and analysis.

FIG. 1 is a wellbore 100 formed through the Earth surface 102 into a subterranean formation 104 of the Earth crust. The wellbore 100 has a vertical portion and two laterals including a first lateral 106 and a second lateral 108.

The wellbore 100 includes a borehole 110 and a borehole wall 114 (wellbore wall) at the interface with subterranean formation 104. The wellbore 100 may include casing 112 (reservoir casing) disposed along the borehole wall 114. The borehole wall 114 may be reservoir rock in the openhole case, or casing or metal liner in the reservoir rock in cased portions of the wellbore. The wellbore 100 may include production tubing 116 disposed in the borehole 110.

Portions of the wellbore 100 can be an open completion. For example, vertical portions can be openhole and/or the laterals can be openhole. The wellbore 100 can be generally a cased completion. This top casing is depicted, but the casing can go further down along the vertical portion to at least the laterals. While not fully shown for clarity, the casing 112 may generally run the length of the vertical portion of the wellbore 100, and in some cases, along the two laterals 106 and 108. Moreover, it should be noted that while only two laterals are depicted, the wellbore 100 may have more than two laterals.

During production, produced fluid may flow from the subterranean formation 104 into the laterals 106, 108. The produced fluid (e.g., hydrocarbon) may flow, for example, through the openhole borehole wall 114 into the lateral, or for a cased completion of the laterals, through perforations (not shown) in the casing 112 into the lateral. The hydrocarbon produced via the first lateral may include crude oil or natural gas, or both. The hydrocarbon produced via the second lateral may include crude oil or natural gas, or both. The produced fluid can include water in implementations. Thus, the produced fluid via one or both of the laterals 106, 108 can include hydrocarbon and water.

Production tubing 116 may be situated in the borehole 110 in the vertical portion of the wellbore 100. The wellbore 100 may have packers, such as the depicted isolation packers including a first packer 118, a second packer 120, and a third packer 122. A purpose of the first packer 118 may be a redundancy of additional sealing in case leakage across the second packer 120.

The illustrated implementation includes two valves (first valve 124 and second valve 126) disposed along the production tubing 116 to receive produced fluid from the two laterals, respectively, into the production tubing. The first valve 124 and the second valve 126 may each be, for example, an interval control valve (ICV). In implementations, interval or flow control valves can be operated automatically, manually, or remotely as part of an intelligent completion. Utilized to control multiple zones (laterals) selectively, the ICVs may reduce water cut and gas cut, reduce well interventions, and increase well productivity. Intelligent completions may address completion challenges (and reservoir management tasks) arising from deviated, extended-reach, multi-targeted, or multilateral wells.

A first resin 128 (e.g., a resin pack) is disposed in the borehole 110 to release a first taggant 130 (first tracer) into the first produced fluid 132 flowing from the first lateral 106. The first taggant 130 may be gradually release from the resin pack as the resin pack is exposed to target wellbore fluids, such as hydrocarbon. A second resin 134 (e.g., a resin pack) is disposed in the borehole 110 to release a second taggant 136 (second tracer) into the produced fluid 138 flowing from the second lateral 108. The second taggant 136 may be gradually released from that resin pack as the resin pack is exposed to target wellbore fluids, such as hydrocarbon. The second taggant 136 may be different from the first taggant 130. A temporary well shut-in may be required, for example, at about 8 hours to 72 hours to accumulate the taggants 130, 136 to build up the concentration of the respective taggant in each zone. Then, as the well is reopened, pulses of the taggants 130, 136 (e.g., dyes) indicating respective production of the two zones will be produced in proportion to the respective lateral influx rate.

The first produced fluid 132 and the second produced fluid 138 are produced from (flow from) the subterranean formation 104 into first lateral 106 and the second lateral 108, respectively. The first produced fluid 132 and the second produced fluid 138 each generally include hydrocarbon, such as crude oil and/or natural gas. The first produced fluid 132 and the second produced fluid 138 may each include water.

In operation, the first valve 124 receives the first produced fluid 132 at a flow rate Q1 from the first lateral 106 into the production tubing 116. The second valve 126 receives the second produced fluid 138 at a flow rate Q2 from the second lateral 108 into the production tubing 116. The flow rates Q1 and Q2 may each be, for example, volume per time. The combined flow (Q1 and Q2) of the produced fluid 132, 138 is upward through the production tubing 116 toward uphole and exits the wellbore 100 by discharging from the borehole 110 through a wellhead 140 at the surface 102. The combined stream of the produced fluid 132, 138 may be analyzed to detect the taggants 132, 138 to determine the relative contribution of the first produced fluid 136 and the second produced fluid 138 to the combined stream. A well shut-in is generally required for analysis/calculation. Without a shut-in of the well, there would be no transient in tracer concentrations from, for example, two different zones. The tracers injected into the different zones will be constantly released out in steady state to the surface and you don't get any meaningful information for each zone from the tracer dye signal on the surface because the flows are comingled from all the laterals.

FIG. 2 is a wellbore 200 formed through the Earth surface 202 into a subterranean formation 204 of the Earth crust. The wellbore 200 has a vertical portion and two laterals including a first lateral 206 and a second lateral 208.

The wellbore 200 includes a borehole 210 in the vertical portion and in the laterals. The wellbore 200 has casing 212 and borehole wall 214 along the borehole 210. For openhole, the borehole wall 214 is the subterranean formation 204 (e.g., reservoir rock). For presence of casing, the borehole wall 214 (or wellbore wall) can be the casing or metal liner embedded in the subterranean formation 204 along the perimeter of the borehole 210.

While not fully shown for clarity, the casing 212 may generally run the length of the vertical portion of the wellbore 200 (vertical portion of the borehole 210), and in some implementations, along the two laterals 206 and 208. During production, produced fluid may flow from the subterranean formation 204 into the laterals 206, 208.

Production tubing 216 may be situated in the borehole 210 in the vertical portion of the wellbore 200. The wellbore 200 may have packers, such as the depicted isolation packers including a first packer 218, a second packer 220, and a third packer 222. Further, the illustrated implementation includes two valves (first valve 224 and second valve 226) disposed along the production tubing 216 to receive produced fluid from the two laterals, respectively, into the production tubing 216. The first valve 224 and the second valve 226 may each be, for example, an ICV, as discussed with respect to FIG. 1.

A first dosing tubing 228 (e.g., capillary dosing line) runs from the surface 202 into the wellbore 200 (into the borehole 210) to the intersection of the first lateral 206 with the vertical portion of the wellbore 200. The term "capillary" here may simply mean the tubing as having a relatively narrow or small diameter.

A second dosing tubing 230 (e.g., capillary dosing line) runs from the surface 202 into the wellbore 200 (into the borehole 210) to the intersection of the second lateral 208 with the vertical portion. The dosing tubing 228, 230 may be small in diameter, such as having a nominal diameter of less than 1 inch or less than 0.5 inch, such is the ranges of 0.1 inch to 0.5 inch, or 0.1 inch to 0.3 inch.

Taggants (tracers) 232, 234 may be applied from surface 202 through the dosing tubing 228, 230 into the borehole 210. In implementations, a surface pump(s) 235 at the surface 202 may provide motive force for flow of the taggants 232, 234 through the dosing tubing 228, 230 into the borehole 210. The first taggant 232 is different from the second taggant 234.

A carrier fluid may be utilized in the application (injection) of the first taggant 232 through the first dosing tubing 228 and the second taggant 234 through the second dosing tubbing 230. The carrier fluid may be, for example, crude oil, mineral oil, or certain solvents. The taggants 232, 234 may be liquid and dissolve (in solution) in the carrier fluid and in the wellbore fluid (produced fluid).

The first taggant 232 (first tracer) may be provided via the first dosing tubing 228 to an intersection region 229 of the wellbore vertical portion and the first lateral 206. Thus, the first taggant 232 discharges from the first dosing tubing 228 into the first produced fluid 236 flowing from the first lateral 206 toward the production tubing 216. The first taggant 232 may be provided via the first dosing tubing 228 to adjacent to the first valve 224. The amount (e.g., volume or mass) and flow rate (e.g., volume per time or mass per time) of the first taggant 232 through the dosing tubing (tube) 228 into the wellbore 200 may be specified (as implemented) and known.

The second taggant 234 (second tracer) may be provided via the second dosing tubing 230 to an intersection region 231 of the wellbore vertical portion and the second lateral 208. Thus, the second taggant 234 discharges from the second dosing tubing 230 into the second produced fluid 238 flowing from the second lateral 208 toward the production tubing 216. The second taggant 234 may be provided to adjacent to the second valve 226 in the region of the intersection of the vertical portion and the second lateral 208. The amount (e.g., volume or mass) and flow rate (e.g., volume per time or mass per time) of the second taggant 234 through the dosing tubing (tube) 230 into the wellbore 200 may be specified and known. Again, the taggants 232, 234 may be applied (injected) in the aforementioned carrier fluid through the dosing tubes 228, 230 into the wellbore 200.

The flow rates of each taggant 232, 234 as injected may be, for example, in the range of 0.1 gallon per minute (gpm) to 0.5 gpm. The concentration of the taggants 232, 234 in the produced fluid at surface 102 may generally depend on the amount of the taggant injected. Knowing or specifying the flow rates (mass or volume) of the dosed taggants 232, 234 as applied may facilitate evaluating the taggant concentration (maximum taggant concentration) in the produced at surface. It may be beneficial to measure down to a few percent (e.g., less than 3% by volume or weight) in the produced fluid to map out the decay rates of the taggant concentration once the taggant dosing is shut off. The amount of taggant dosed may be related to detection of the taggant. Moreover, the rate of dosed taggant may be specified to facilitate a saturated concentration of the taggant to generate pulses of dyes indicating the two zones.

The taggants 232, 234 (tracers) may be soluble in oil including crude oil, and characterized as oil-soluble. The taggants 232, 234 may be oil-soluble taggants (tracers) including, for example, LR, LV, LY, NR, hydrophobically-modified NB, perylene derivatives, pyrromethene derivatives, benzothiadiazole derivatives, DPA derivatives, PDCA derivatives, curcumin, and UCNP.

As indicated with respect to FIG. 1, in operation for FIG. 2, the first produced fluid 236 and the second produced fluid 238 are produced from (flow from) the subterranean formation 204 into the first lateral 206 and the second lateral 208, respectively. As mentioned, the first produced fluid 236 and the second produced fluid 238 may each flow through perforations in the casing 212 and the cement 214 into the borehole of the first lateral 206 and the second lateral 208, respectively. The first produced fluid 236 and the second produced fluid 238 may each include hydrocarbon, such as crude oil and/or natural gas.

In operation, the first valve 224 receives the first produced fluid 236 at a flow rate Q1 from the first lateral 206 into the production tubing 216. The second valve 226 receives the second produced fluid 238 at a flow rate Q2 from the second lateral 208 into the production tubing 216. The flow rates Q1 and Q2 may each be, for example, volume per time, and may be analogous to Q1 and Q2 discussed with respect to FIG.

1. The combined flow (flow rates Q1 and Q2) of the produced fluid 236, 238 of the discharge stream 239 is upward through the production tubing 216 toward uphole and exits the wellbore 200 by discharging from the borehole 210 through a wellhead 240 at the surface 202.

This discharged produced stream 239 of the combined produced fluid 236, 238 (total flow rate=Q1+Q2) may be analyzed to detect or measure the taggants 232, 234 (tracers) in the produced stream 239 to determine the relative contribution of the first produced fluid 236 (and/or hydrocarbon [e.g., crude oil] in the first produce fluid 236) and the second produced fluid 238 (and/or hydrocarbon [e.g., crude oil] in the second produced fluid 238) to the produced stream 239 (combined produced fluid 236 and 238) that discharges at the surface 202. Again, the tracers 232, 234 are oil-soluble and thus in the crude oil of (or the crude oil phase in) the first produced fluid 236 and in the second produced fluid 238.

The taggants 232, 234 in the produced stream 239 may be measured or detected, for example, via optical detection (optical measurement) or other measurement techniques. Optical measurement may refer to noncontact measurement utilizing light sources. Optical detection/measurement can employ at least one lens, a light source, and a detector. Optical measurement may be a measurement technique that relies on the use of optical sensors to collect measurements. Several different types of systems (analytical instruments) are available for optical detection, including fully automated ones, as well as systems that allow for more manual control. Optical measurement can be noninvasive. The features of excitation and emission can be involved.

An online analytical instrument (e.g., for performing optical detection or other types of measurements) may be employed to automatically sample the produced stream 239 at surface 202 for measurement in the field of the taggants 232, 234 (e.g., in near real time). On the other hand, a sample of the produced stream 239 may be manually collected by a human operator or technician at surface 202 and subjected to analysis (e.g., optical detection or other measurement technique) for the taggants 232, 234 via a laboratory analytical instrument in a laboratory (e.g., in a mobile laboratory at the well site having the wellbore 200).

The analytical instruments and techniques for detection or measurement (e.g. optical) of the oil-soluble taggants (tracers) may include chromatographic and spectrometric techniques for the separation of the taggants from dissolved organic matter interferents in the crude oil or oil phase of the produced fluids. In implementations, the detection of the taggants 232, 234 in the produced stream 234 may be at trace concentrations [e.g., less than 1 part per million (ppm) by weight or volume] and ultra-trace concentrations (e.g., less than 0.1 ppm by weight or volume). In particular, two dimensional (2D) high-pressure liquid chromatography (HPLC) may be employed. Specifically, an inline solid phase extraction-2D-HPLC inline analysis technique may be applied for determining the concentrations of the taggants in the target fluid phase from each lateral. The solid phase extraction may be applied for sample preparing, and the 2D-HPLC applied for analysis to measure taggants (tracers).

In implementations, a well shut-in (shut-in of the wellbore 200) is generally not implemented for the measurements of the discharged produced stream 239 at surface 202 for the taggants 232, 234. In other words, transients may be generated with the dosing procedure of the taggants. For example, the actions of the dosing procedure that generate a transient include an abrupt discontinuing of the dosing.

The techniques include measuring zonal oil and water contribution to fluid flow by detecting oil-dissolved tracers at the surface without disruption to production (without shut-in the well). For this, by installing dosing tubing from the surface during well completion, oil soluble tracers can be injected from the wellhead into the different zones. Once injected, first, steady-state tracer dosing can be measured at the surface because there is a constant flow coming out from the production well. Then, to introduce a transient in tracer concentrations, only the tracer dosing can be abruptly shut off (not the whole production). Then the production flows from each zone will carry the tracers to the surface, which will decay at a different rate. These decay rates are proportional to the influx rate of each zone. So, in this case, shut-in the well is not required, instead the transient is generated by tracer dosing procedure.

The dosing procedure may include: [1] injecting the first taggant 232 (e.g., in a carrier fluid) through the first dosing tubing 228 (conduit) to the first lateral 206 and adjacent the valve 224; [2] injecting the second taggant 234 (e.g., in a carrier fluid) through the second dosing tubing 230 (conduit) to the second lateral 208 and adjacent the valve 226; [3] abruptly shutting off the taggants 232, 234 to generate a transient; and [4] measuring the amount and flow rate of the taggants 232, 234 (tracers) at surface in produced stream 239. The measurement and calculation procedure may include: [A] measuring concentrations of the taggants 232, 234 (tracers) in the produced stream 239; and [B] calculating the amount of the first produced fluid 236 and the amount of the second produced fluid 238 based on the amount and rate of taggants 232, 234 injected and based on the concentrations of the taggants 232, 234 in the produced stream 239.

In implementations, the amount of oil (e.g., crude oil) in the produced fluid can be determined, and the amount of water in the produced fluid can be determined. The production (produced fluid) flows from each zone (laterals 206, 208) carrying the respective taggants 232, 234 to the surface, and in which respective concentrations of the taggants 232, 234 in the produced fluid may generally decay at a different rates after shutting off the taggant dosing. The amount of oil and water can be determined because the decay rates may be proportional to the influx rate (production rate of produced fluid) of each zone, and with the taggants being selectively soluble in oil. For a discussion of tracer decay rates, see U.S. patent application Ser. No. 17/644,641 (published as U.S. 2023/0193755), which is incorporated by reference herein in its entirety.

Embodiments further detail different classes of oil-soluble tracer/taggant materials that can be injected each lateral of the well to tag the hydrocarbon phase of the reservoir fluid. Each class of materials is described for its suitability as an oleophilic taggant in terms of: (i) simplicity of detection modality, which has implications on the development of a fieldable analysis instrument, (ii) detection sensitivity in crude oil matrix, (iii) short-term stability under downhole condition and long-term stability in crude oil, and (iv) ease of commercialization or availability of commercial sources for the materials. The taggant will be dissolved in a carrier fluid, e.g., crude oil, mineral oil, solvent mixtures, etc., that facilitates the taggant to be delivered to the laterals via the dosing lines.

The taggants disclosed herein as applicable may include known compounds that are commercially available (as well as novel compositions) that have not been applied to this purpose of tagging different phases of reservoir fluids for quantification of zonal flow contributions in multilateral wells.

The characteristics and the formulation of a carrier fluid in which the taggants would be dissolved or suspended, so that the taggants can be effectively injected and transported into the interval from the surface are discussed. The carrier fluid is miscible with the target-fluid phase (e.g., crude oil) downhole. The taggants can be dissolved or suspended in the carrier fluid at concentrations above 1,000 parts per million (ppm) by volume, e.g., in the range of 1,000 ppm by volume to 10,000 ppm by volume. The boiling point of the carrier fluid may be greater than 100° C. (e.g., in a range of 100° C. to 225° C.) with relatively low volatility/flash point, e.g., dodecanol. The taggants could also be dissolved or suspended in crude oil or crude oil diluted with a solvent.

Discussed below are the chromatographic and spectrometric techniques for the separation of the taggant materials from dissolved organic matter interferents in the aqueous and oil phases of the produced fluids and their detection at trace (e.g., less than 1 ppm) and ultra-trace concentrations, such as less than 100 micromolar (PM).

The concentrations of the taggants dosed into the laterals and collected with the produced fluids at the surface over a prescribed time duration may be utilized to quantitate (quantify) the contributions of fluids (oil and water) from each lateral in the assessment of production efficiency. Data from the calculated zonal flow contribution may inform and aid the subsequent adjustments of production parameters to improve reservoir management and increase hydrocarbon recovery.

Oil-soluble taggants (oil-soluble molecular taggants) applicable to embodiments of the present techniques are discussed. These taggants include, for example, optically-detectable fluorophores that are soluble in the oil phase, e.g. optically-detectable fluorophores being the Lumogen® F dyes series by BASF SE (chemical company) having headquarters in Ludwigshafen, Germany. BASF's Lumogen® F dyes are known to exhibit relatively high fluorescence quantum yield and photostability as well as high thermal stability. The Lumogen® F dyes include the structures of Lumogen Violet (LV), Lumogen Yellow (LY) and Lumogen Red (LR) shown in FIG. 3. The emission maxima for each dye dissolved in dichloromethane (DCM) at a concentration of 0.25 ppm were observed at 432 nanometer (nm), 518 nm, and 604 nm when excited at 378 nm, 476 nm, and 578 nm for LV, LY and LR, respectively, which can be distinguished from one another (see FIG. 4). In particular, as expected from their structures, solubility of perylene-based LR in organic solvents, specifically in toluene, e.g., 80 grams per liter (g/L), is higher than that of the other two dyes (10 g/L for LV and <1 g/L for LY) because of its increased hydrophobicity, facilitating the use of LR as a tracer highly miscible with crude oil.

Figure 3:
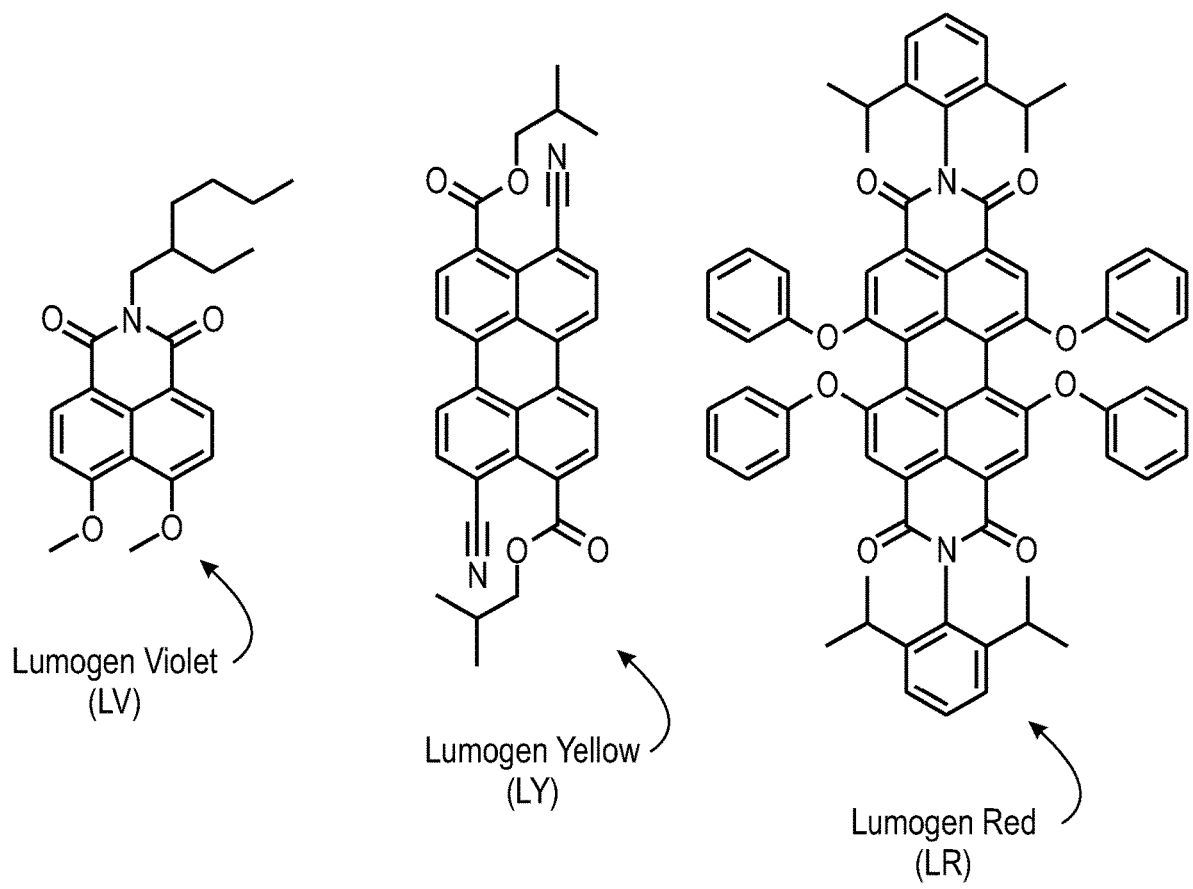
FIG. 3 is diagrams of the structures of Lumogen Violet (LV), Lumogen Yellow (LY), and Lumogen Red (LR).

FIG. 3 are structures of Lumogen Violet (LV), Lumogen Yellow (LY), and Lumogen Red (LR). Lumogen Red (LR) [known as Lumogen F Red 305 or Perylene Red] has the depicted structure with the molecular formula of $C_{72}H_{58}N_2O_8$. The International Union of Pure and Applied Chemistry (UPAC) name is:

7,18-bis[2,6-di(propan-2-yl)phenyl]-11,14,22,26-tetraphenoxy-7,18-diazaheptacyclo[14.6.2.2$^{2,5}$.0$^{3,12}$.

0$^{4,9}$.0$^{13,23}$.0$^{20,24}$]hexacosa-1(22),2(26),3,5(25),9,11, 13,15,20,23-decaene-6,8,17,19-tetrone.

Lumogen Yellow (LY) [known as Lumogen F Yellow 083] has the depicted structure and the molecular formula $C_{32}H_{26}N_2O_4$ with IUPAC name that is bis(2-methylpropyl) 4,10-dicyanoperylene-3,9-dicarboxylate.

Lumogen Violet (LV) [known as Lumogen F Violet 570] has the depicted structure with molecular formula $C_{22}H_{27}NO_4$ and IUPAC name that is 2-(2-ethylhexyl)-6,7-dimethoxybenzo[de]isoquinoline-1,3-dione.

Figure 4:
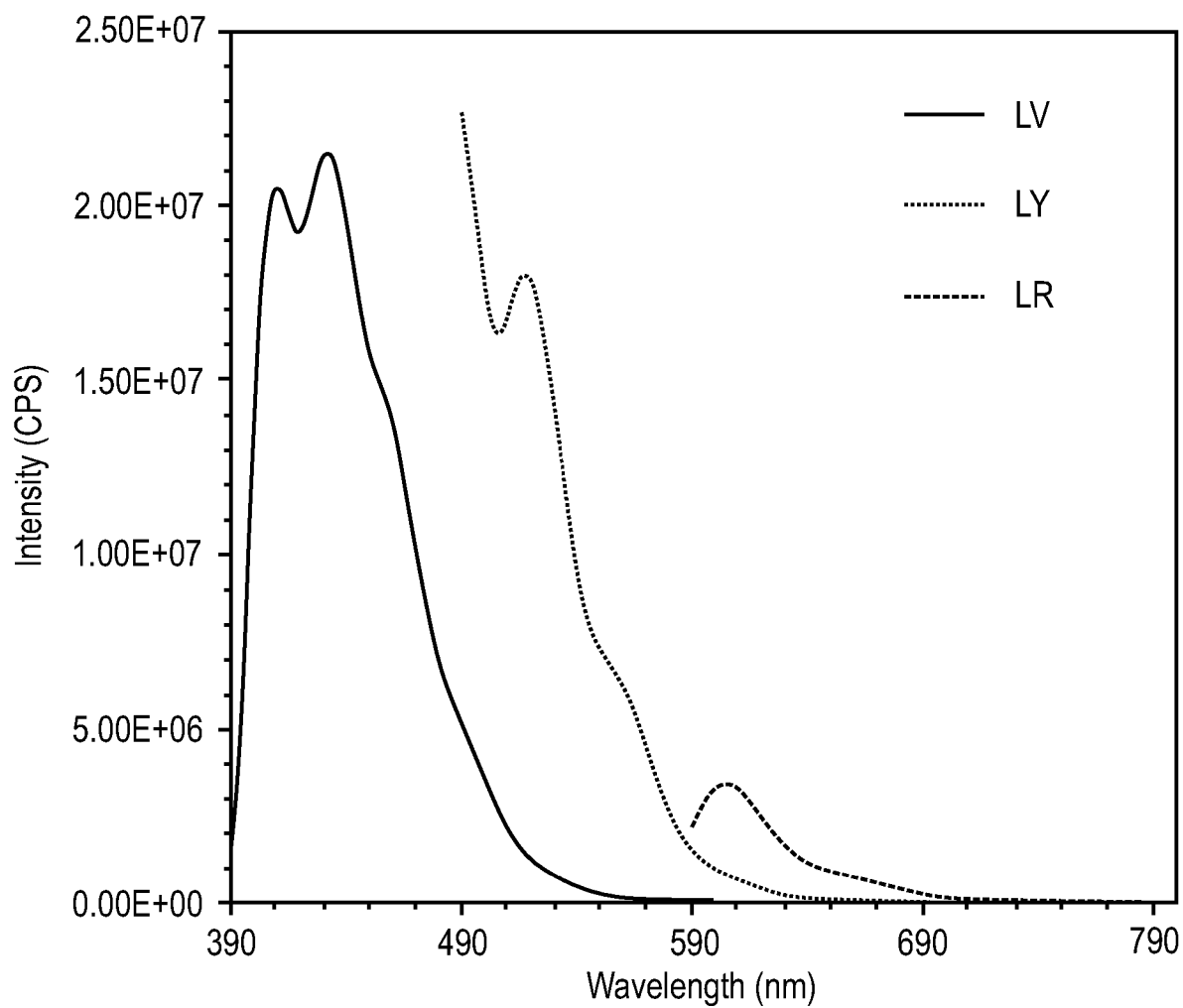
FIG. 4 is a plot of intensity versus wavelength, giving fluorescence emission spectra of LV, LY, and LR.

FIG. 4 is a plot of intensity [counts per second (CPS)] versus wavelength (nm), giving fluorescence emission spectra of LV, LY, and LR. Each sample for the fluorescence emission was prepared in DCM at 0.25 ppm by volume and excited at 378, 476 and 578 nm for LV, LY and LR, respectively.

Figure 5:
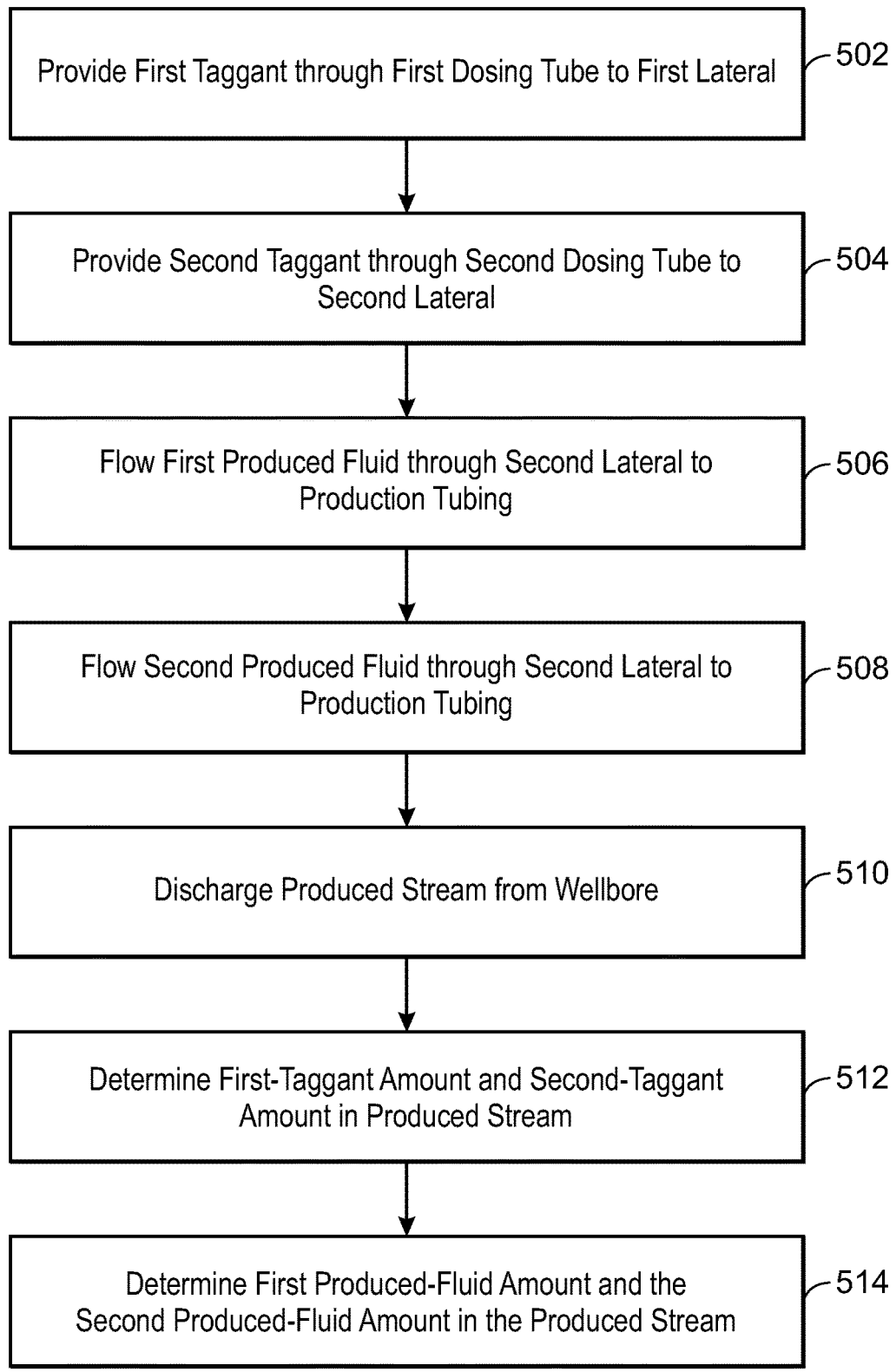
FIG. 5 is a block flow diagram of a method of quantifying zonal flow in a multi-lateral well.

FIG. 5 is a method 500 of quantifying zonal flow in a multi-lateral well. The multi-lateral well includes a wellbore formed through the Earth surface into a subterranean formation in the Earth crust. The wellbore includes a vertical portion and at least two laterals (first lateral and second lateral). The laterals can be known as zones. The produced fluid from the first lateral (first zone) may include hydrocarbon (e.g., crude oil and/or natural gas) and/or water. The produced fluid from the second lateral (second zone) may include hydrocarbon (e.g., crude oil and/or natural gas) and/or water.

At block 502, the method includes providing a first taggant (tracer) from the Earth surface through a first dosing tubing (e.g., a first capillary dosing line) to a first lateral in the wellbore. A purposed of providing (injecting) the first taggant may be to tag fluid that is produced via the first lateral. The first taggant may be intended to tag produced fluid from the first lateral so that this produced fluid can be identified. This produced fluid flows through the first lateral from the subterranean formation to the production tubing.

The first taggant may be provided from the Earth surface through the first dosing tubing to a first region associated with the first lateral. The first region may be a region of intersection of the first lateral with the vertical portion. The first taggant may discharge from the first dosing tubing into the wellbore (e.g., into the first region), such as near or adjacent to a first valve (e.g., first ICV) disposed along production tubing in the vertical portion of the wellbore. A pump at the surface may be utilized to provide motive force for flow of the first taggant through the first dosing tubing.

At block 504, the method includes providing a second taggant (tracer) from the Earth surface through a second dosing tubing (e.g., a second capillary dosing line) to a second lateral in the wellbore. The second taggant may be intended to tag produced fluid from the second lateral so that this produced fluid can be identified. A purpose of providing (injecting) the second taggant may be to tag fluid that is produced via the second lateral (and flows through the second lateral from the subterranean formation to the production tubing).

The second taggant may be provided from the Earth surface through the second dosing tubing to a second region associated with the second lateral. The second region may be a region of intersection of the second lateral with the vertical portion of the wellbore. The second taggant may discharge from the second dosing tubing into the wellbore (e.g., into the second region), such as near or adjacent to the second valve (e.g., second ICV) disposed along the production tubing. A pump at the surface may be utilized to provide motive force for flow of the second taggant through the second dosing tubing.

The first taggant and the second taggant are oil-soluble. The first taggant may be different from the second taggant. The first taggant and the second taggant may each be at least one of LV, LY, LR, or NR, or other oil-soluble taggants discussed herein.

At block 506, the method includes flowing (producing) a first produced fluid (having hydrocarbon and possible water) from the subterranean formation via (through) the first lateral through the first valve (e.g., ICV) into the production tubing in the wellbore. Again, the production tubing may be in a vertical portion of the wellbore.

At block 508, the method includes flowing a second produced fluid having hydrocarbon and possible water from the subterranean formation via the second lateral through the second valve (e.g., ICV) into the production tubing. As mentioned, the first valve and the second valve may be disposed along production tubing to receive fluid into the production tubing.

At block 510, the method includes flowing (producing) a produced stream including the first produced fluid and the second produced fluid uphole through the production tubing and discharging the produced stream from the wellbore. Producing the first produced fluid may involve flowing the first produced fluid from the first lateral through the first valve into the production tubing, and producing the second produced fluid may involve flowing the second produced fluid through the second valve into the production tubing, wherein the first valve and second valve are disposed along the production tubing. The first produced fluid and the second produced fluid combine in the production tubing, and the combination discharges at surface as the produced stream from the production tubing and the wellbore.

At block 512, the method includes analyzing the produced stream (e.g., at Earth surface) to determine (measure) an amount (first-taggant amount) of the first taggant in the produced stream and an amount (second-taggant amount) of the second taggant in the produced stream. The analytical techniques (instruments) may include, for example, ultraviolet (UV)-vis spectroscopy, fluorescence spectroscopy, high pressure liquid chromatography (HPLC), and liquid chromatography-mass spectrometry (LC-MS), and the like.

At block 514, the method includes determining (e.g., calculating) an amount of the first produced fluid (the first produced-fluid amount) in the produced stream and an amount of second produced fluid (the second produced-fluid amount) in the produced stream based on the amount of the first taggant in the produced stream as measured and the amount of the second taggant in the produced stream as measured. Embodiments measure zonal produced fluid contribution to the total produced fluid by detecting oil-dissolved tracers at the surface without disruption to production (without shut-in of the well). For this, with aid of doing tubing from the surface, oil soluble tracers can be injected from the wellhead into the different zones. Once injected, steady-state tracer dosing can be measured at the surface because there is a constant flow coming out from the production well. Then, to introduce a transient in tracer concentrations, the tracer dosing can be abruptly shut off (not the whole production). Then the production flows from each zone will carry the tracers to the surface, which will decay at a different rate. These decay rates are proportional to the influx rate of each zone. So, in this case, shut-in the well is not required, instead the transient is generated by tracer dosing implementation.

Again, the method may include determining an amount of the first produced fluid in the produced stream and an amount of second produced fluid in the produced stream based on the amount of the first taggant in the produced stream as measured and the amount of the second taggant in the produced stream as measured. Determining the water cut of the first production zone or the second production zone includes using the following equation:

$$Toil(i) = \sim \exp(-a\ Q_i\ t)$$

wherein $Toil(i)$ is the tracer concentration in oil from a specified production zone, a is a geometrical constant of an annular completion region approximately equal to $1/V$, where V is the volume of the annular region from the mouth of the dosing line up to the mouth of the inflow control valve, $Q_i$ is a total oil production flow rate from the specified production zone, and t is time.

In summary, disclose herein are selectively soluble taggants (e.g., the aforementioned oil-soluble tracers) to be injected from the surface via dosing lines into different sections or zones of a multilateral well. These taggants are designed to mark different fluid phases produced from each zone and be carried by the produced oil and water to the surface. Their concentrations measured at the surface—specifically, how their concentrations decrease over time after dosing is shut off—allows for the computation of the oil producing rates from each zone.

Applicable oil-soluble taggants (tracers) include, for example, Lumogen Red (LR), Lumogen Violet (LV), Lumogen Yellow (LY), Nile Red (NR), hydrophobically-modified Nile Blue (NB), perylene derivatives, pyrromethene derivatives, benzothiadiazole derivatives, dipicolinic acid (DPA) derivatives, phenanthroline dicarboxylic acid (PDCA) derivatives, curcumin, and upconverting nanoparticles (UCNP).

As mentioned, a carrier fluid may promote or advance injection of the taggant via the dosing tubing from the surface into the different zones in the reservoir. For oil-soluble taggants, the carrier fluid may be crude oil, mineral oil, solvent mixtures, etc.

An embodiment is a method of quantifying zonal flow in a multi-lateral well, including flowing first produced fluid having hydrocarbon from a subterranean formation via a first lateral in a wellbore of the multi-lateral well through a first valve into production tubing in the wellbore, and flowing second produced fluid having hydrocarbon from the subterranean formation via a second lateral in the wellbore through a second valve into the production tubing. The hydrocarbon may include crude oil. The hydrocarbon may include natural gas. At least one of the first produced fluid or the second produced may include water. The wellbore may be formed through the Earth surface into the subterranean formation in the Earth crust. The first valve (e.g., ICV) and the second valve (e.g., ICV) may be disposed along the production tubing to receive the first produced fluid and the second produced fluid, respectively, into the production tubing.

The method includes providing a first taggant through a first dosing tubing to the first produced fluid in the first lateral, and providing a second taggant through a second dosing tubing to the second produced fluid in the second lateral, wherein the first taggant and the second taggant are oil soluble. In implementations, the first taggant and the second taggant each include at least one of LR, LV, LY, NR, or a hydrophobically-modified NB. the first taggant and the second taggant each comprise at least one of LR, LV, LY, NR, a hydrophobically-modified NB, a perylene derivative, a pyrromethene derivative, a benzothiadiazole derivative, a DPA derivative, a PDCA derivative, curcumin, or an UCNP. The first taggant may be different from the second taggant.

The method includes flowing a produced stream having the first produced fluid and the second produced fluid uphole through the production tubing and discharging the produced stream from the wellbore, and analyzing the produced stream to measure an amount of the first taggant in the produced stream and an amount of the second taggant in the produced stream. The method may include determining an amount of the first produced fluid in the produced stream and an amount of second produced fluid in the produced stream based on the amount of the first taggant in the produced stream as measured and the amount of the second taggant in the produced stream as measured.

Another embodiment is a method of quantifying zonal flow in a multi-lateral well, including providing a first tracer through a first dosing tubing to a first region of a wellbore of the multi-lateral well, the first region associated with a first lateral of the wellbore, and providing a second tracer through a second dosing tubing to a second region of the wellbore, the second region associated with a second lateral of the wellbore. The first tracer may be provided from the Earth surface through the first dosing tubing to the first region. The second tracer may be provided from the Earth surface through the second dosing tubing to the second region. The first region may be at an intersection of the first lateral with a vertical portion of the wellbore. The second region may at an intersection of the second lateral with the vertical portion. The production tubing may be disposed in the vertical portion. The first tracer and the second tracer are each oil soluble and optically detectable. The first tracer and the second tracer may each be soluble in crude oil. The first tracer and the second tracer may each include at least one of LR, LV, LY, NR, or a hydrophobically-modified NB. The first tracer and the second tracer may each include at least one of LR, LV, LY, NR, a hydrophobically-modified NB, a perylene derivative, a pyrromethene derivative, a benzothiadiazole derivative, a DPA derivative, a PDCA derivative, curcumin, or an UCNP. The first tracer may be different from the second tracer The wellbore may be formed through the Earth surface into a subterranean formation in the Earth crust. The method includes flowing from the subterranean formation a first produced fluid having hydrocarbon (e.g., crude oil, natural gas, etc.) through the first lateral and a first valve into production tubing in the wellbore, and flowing from the subterranean formation a second produced fluid comprising hydrocarbon through the second lateral and a second valve into the production tubing. The first valve (e.g., ICV) and the second valve (e.g., ICV) may be disposed along the production tubing. The method includes flowing a produced stream having the first produced fluid and the second produced fluid uphole through the production tubing and discharging the produced stream from the wellbore. The method includes analyzing the produced stream to measure an amount of the first tracer in the produced stream and an amount of the second tracer in the produced stream.

Yet another embodiment is a method of quantifying zonal flow in a multi-lateral well, including providing a first taggant from Earth surface through a first dosing tubing to a first region in a wellbore of the multi-lateral well, wherein the wellbore is formed through the Earth surface into a subterranean formation in Earth crust, and wherein the first region is a region of intersection of a first lateral in the wellbore with a vertical portion of the wellbore. The method includes providing a second taggant from the Earth surface through a second dosing tubing to a second region in the wellbore, wherein the second region is a region of intersection of a second lateral in the wellbore with the vertical portion. The first taggant and the second taggant each include at least one of LR, LV, LY, NR, a hydrophobically-modified NB, a perylene derivative, a pyrromethene derivative, a benzothiadiazole derivative, a DPA derivative, a PDCA derivative, curcumin, or an UCNP. In implementations, the first taggant and the second taggant each include at least one of the LR, the LV, the LY, the NR, or the hydrophobically-modified NB. The first taggant may be different from the second taggant.

The method includes producing a first produced fluid from the subterranean formation through the first lateral into production tubing in the wellbore. The first produced fluid may include hydrocarbon and water, wherein the hydrocarbon may include crude oil or natural gas, or both. The producing of the first produced fluid may involve flowing the first produced fluid through a first valve into the production tubing. The method includes producing a second produced fluid from the subterranean formation through the second lateral into the production tubing. The second produced fluid may include hydrocarbon (including crude oil or natural gas, or both) and water. The producing of the second produced fluid may involve flowing the second produced fluid through a second valve into the production tubing. The production tubing may be disposed in the vertical portion of the wellbore. The first valve (e.g., ICV) and second valve (e.g., ICV) if employed are disposed along the production tubing.

The method includes flowing a produced stream having the first produced fluid and the second produced fluid uphole through the production tubing and discharging the produced stream from the wellbore. The method includes analyzing the produced stream to measure an amount of the first taggant in the produced stream and an amount of the second taggant in the produced stream. The method may include calculating an amount of the first produced fluid in the produced stream and an amount of second produced fluid in the produced stream based on the amount of the first taggant in the produced stream as measured and the amount of the second taggant in the produced stream as measured.

EXAMPLES

Example 1, Example 2, Example 3, and Example 4 are presented. Examples 1-4 are given as examples and not intended to limit the present techniques.

Example 1: Considered LR, LV, LY, and NR. Discussed are the general materials and techniques, characterization, gravity column chromatography, Celite filtration, and results.

Lumogen Red (LR), Lumogen Violet (LV), Lumogen Yellow (LY), and Nile Red (NR) were evaluated. As for experimental procedure, chemicals and materials were used generally as received unless otherwise noted. Lumogen Red as Lumogen F Red 305, Lumogen Violet as Lumogen Violet 570, and Lumogen Yellow as Lumogen F Yellow 083 were acquired from BASF SE. Nile Red and Celite (diatomaceous earth or diatomite) as Celite® 545 were purchased from Acros Organics B.V.B.A. (having headquarters in Geel, Belgium) of Thermo Fischer Scientific Corporation having headquarters in Waltham, Massachusetts, USA. Acros OrganicS™ products are now packaged as Thermo Fisher Scientific™ products.

Toluene was purchased from Sigma-Aldrich Chemical Company having headquarters in St. Louis, Missouri, USA. Dichloromethane, methanol, and borosilicate glass Pasteur pipettes (5.75 in., cat. no. 53283-916 used for Celite filtration) were purchased as VWR Chemicals BDH® from Avantor, Inc. having headquarters in Radnor Township, Pennsylvania, USA. Silica gel (60-200 mesh, chromatographic grade) was acquired from Fisher Scientific Company having headquarters in Hampton, New Hampshire, USA. Crude oil used in the experiments was obtained from the Hawiyah area of Ghawar field in Saudi Arabia. Sand (washed, dried) was as Macron Fine Chemicals™ from Avantor, Inc. Pipettes (epT.I.P.S., 0.5-10 mL, 243 mm, cat. no. 022492101) used for gravity column chromatography were purchased from Eppendorf North America of Eppendorf Biotech Company having headquarters in Hamburg, Germany. Glass-backed TLC plates (75×25 mm, cat. no. T-CSF7525-0) were purchased from Agela Technologies associated with Phenomenex. For determination of limits of detection, gravity-column chromatography was conducted in triplicate for each relevant sample concentration.

As for characterization, ultraviolet (UV)-vis absorption spectra were obtained utilizing an Agilent Cary 5000 spectrometer available from Agilent Technology, Inc. having headquarters in Santa Clara, California, USA. Fluorescence spectra were collected on a Horiba NanoLog-3 spectrofluorometer available from Horiba, Ltd. having headquarters in Kyoto, Japan. Samples were prepared in 4 milliliter (mL) of dichloromethane (DCM), of which 3 mL was taken for the spectroscopic measurements.

Gravity column chromatography was employed for Lumogen Red, Lumogen Violet, Lumogen Yellow, and Nile Red. For Lumogen Red, a 10 mL Eppendorf pipette was first plugged with cotton, loaded with 3 grams (g) of silica gel, leveled, and then topped off with 1 g of sand. Tracer dyes were first dissolved in toluene, constituting stock solutions that were then further diluted into crude oil (toluene/crude oil, 1:9, v/v). This mixture was then diluted into DCM (crude oil mixture/DCM, 1:4, volume/volume [v/v]); 0.5 mL of the final mixture was set aside to be loaded onto the prepared column. Prior to sample loading, the column was equilibrated with 10 mL of DCM. Following equilibration, the 0.5 mL column sample was loaded onto the sand layer of the column and flushed through with 6 mL of DCM by gravity, collected as one fraction. Another 4 mL of DCM was flushed through the column by gravity, leading to a second fraction in which Lumogen Red was eluted.

For Lumogen Violet, Lumogen Yellow, and Nile Red, elution was implemented by a sequential elution process where the sample-loaded column is first flushed with 10 mL of DCM (summarized in the elution profile for Lumogen Red), then flushed with 10 mL of DCM/MeOH (95:5, v/v), collected as one fraction, and lastly flushed with a final 4 mL of DCM/MeOH (95:5, v/v) from which dye was eluted and collected in a separate fraction.

As for Celite filtration, a borosilicate Pasteur pipet was first plugged with cotton, then loaded with approximately 0.2 g of Celite. Each gravity column sample to be purified was dried and redissolved in 1 mL of methanol (MeOH or $CH_3OH$) and sonicated for 30 seconds. The packed Celite column was then pre-wetted with MeOH and the 1 mL sample was loaded, and the resulting sample was collected under a slight positive air pressure until the solvent level reaches the Celite layer. The original sample vial was then further washed with 1 mL MeOH and flushed through the column in the same manner twice, into the same collection vial. The column was then flushed with pure MeOH twice (1 mL each), and the total collected sample volume was evaporated and redissolved in 4 mL of DCM for fluorescence spectroscopy.

Figure 6:
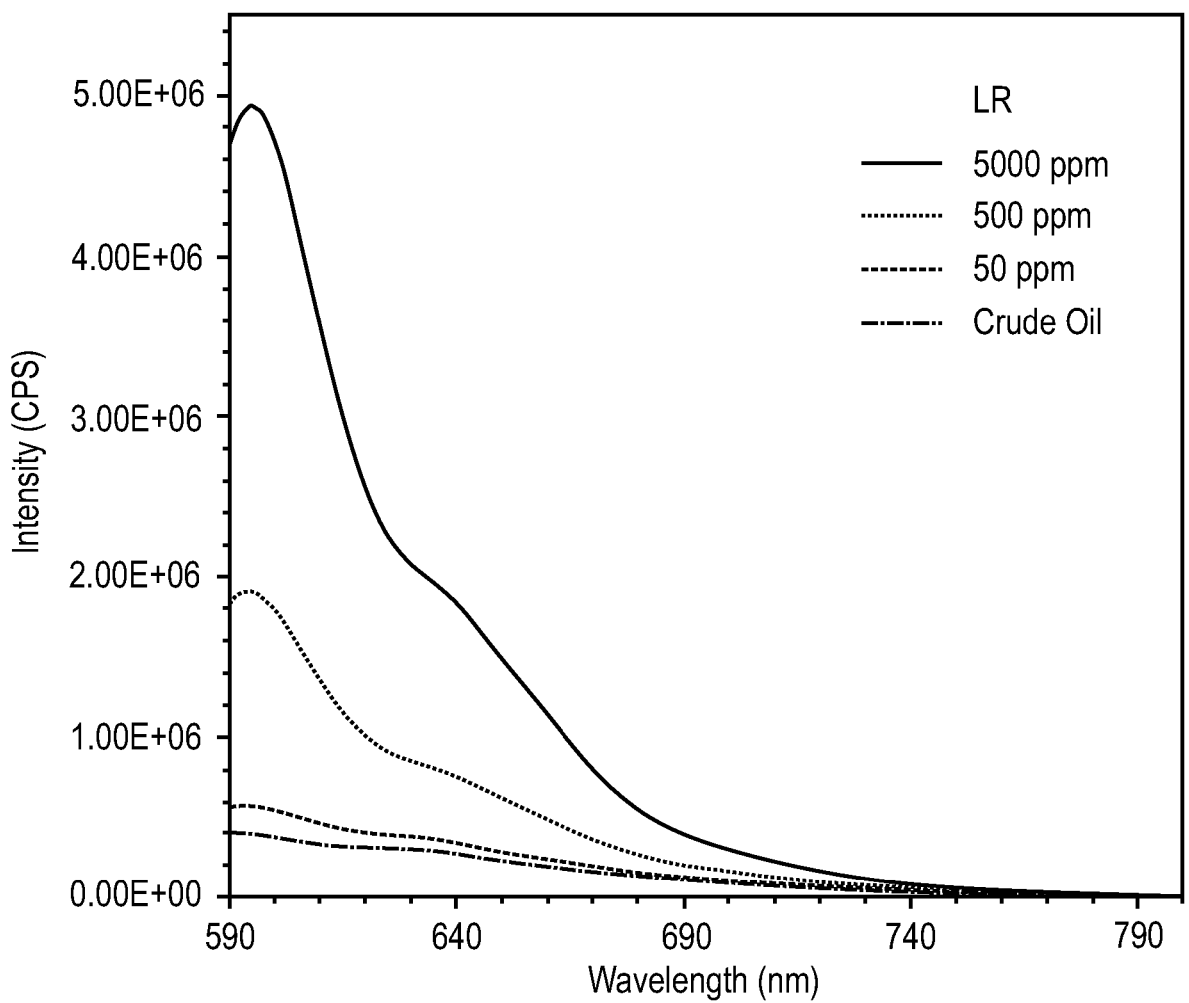
FIG. 6 is a plot of intensity versus wavelength for LR.

As for results, FIG. 6 is a plot of intensity in counts per second (CPS) versus wavelength (nm) for Lumogen Red. The plot is emission spectra of LR diluted in crude oil at various concentrations and that of crude oil as a control sample. Excitation is at 578 nm. The ppm are ppm by volume. With respect to Lumogen Red (LR), the fluorescence properties of LR and crude oil mixtures without purification were first investigated. A stock solution of LR in toluene was sequentially diluted to a series of concentrations with crude oil to prepare the sample mixtures with a ratio of toluene to crude oil, 1:9 (v/v). In FIG. 6, high concentration of LR in crude oil (50 ppm by volume) shows a distinct fluorescence emission maximum at 604 nanometer (nm) when excited at 578 nm. However, it was found that crude oil that does not contain LR (black) also fluoresces upon excitation at 578 nm mainly (primarily) because of the aromatic hydrocarbon fraction in crude oil. Because the emission band of LR overlaps with that of crude oil control, it prevents accurate determination of the fluorescence signal of LR only. In fact, because of the background emission from crude oil, LR at a concentration below 50 ppm cannot be detected in crude oil matrix, which thus may invite separation and purification of LR from crude oil to enhance detection sensitivity (and make feasible and clearly detected).

Silica gel column chromatography is one of the most widely used separation and purification methods to isolate a product from mixtures by eluting fractions of the sample successively with a suitable chromatography solvent system, allowing for separation based on different adsorption capacities of the sample fractions onto silica gel. The retention factors ($R_f$) for fractions in crude oil and LR were identified by thin layer chromatography (TLC), a complementary separation technique to silica gel column chromatography, using 100% DCM to determine beneficial or optimal conditions for silica gel column chromatography. It was found that a non-polar fraction of crude oil and LR migrate together with the solvent front ($R_f > 0.87$) and most polar fractions of crude oil remain at the baseline ($R_f < 0.1$), which can be easily separated by silica gel column chromatography via isocratic elution with DCM. Therefore, devised was the simple gravity chromatography column (depicted in FIG. 7) for the separation.

Figure 7:
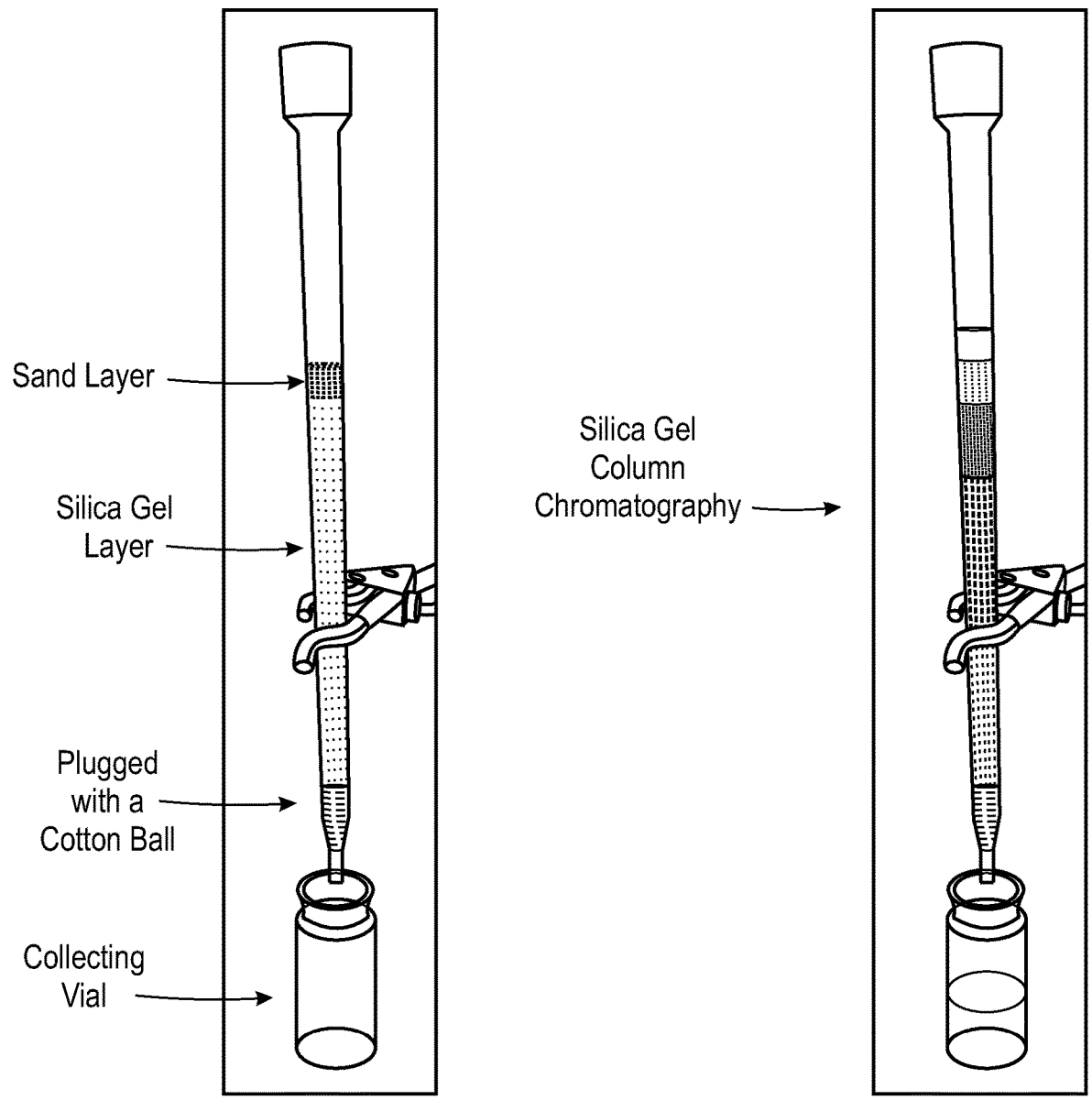
FIG. 7 is images of a custom-made gravity chromatography column.

FIG. 7 is the set up (arrangement) for the custom-made gravity-column chromatography system. In particular, the gravity chromatography column is assembled having a 10 mL-volume pipette tip packed with dry silica gel (3 g) that is capped with sand (1 g) on top (as shown in FIG. 7). In FIG. 7, the image on the left is before fluid is introduced to the column and before fluid is collected in the vial, and the image on the right is after fluid is introduced into the column and after fluid is collected in the vial. A brief description of employment of this gravity column chromatography is as follows. Crude oil mixtures containing LR in various concentrations from 10 ppm to 1 ppm were prepared from a stock solution of LR (100 ppm) in toluene by sequential dilution (toluene/crude oil, 1:9, v/v). Because of its high viscosity, the crude oil mixtures were further diluted to 1:4 with DCM, the current chromatography solvent, resulting in a 0.5 mL of solution for each sample for loading the column. The column was conditioned with DCM (10 mL) and once the solvent level reaches the sand layer, the sample mixture was carefully added to the top of the sand layer. Then, 6 mL of DCM was passed through the column by gravity, allowing the non-polar fractions of crude oil to be collected in a collecting vial placed under the column. Once the solvent level reaches the parallel level of the sand, an additional 4 mL of DCM was added to the column to collect LR in a new collecting vial.

Figure 8:
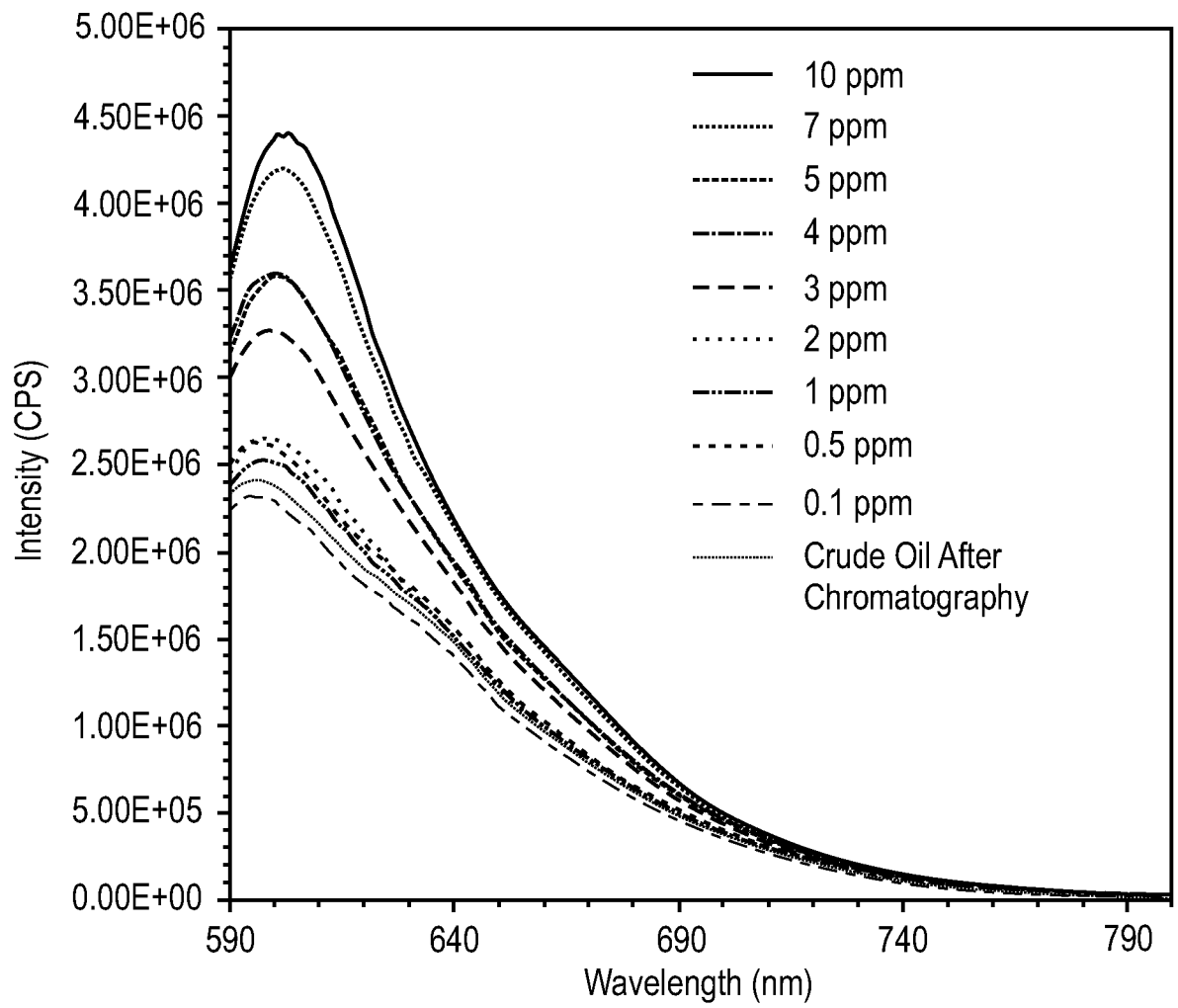
FIG. 8 is a plot of intensity versus wavelength depicting results of the spectrofluorometric characterization of the collected LR fractions performed with the gravity chromatography column of FIG. 7.

FIG. 8 is a plot of intensity (CPS) versus wavelength (nm) depicting results of the spectrofluorometric characterization of the collected LR fractions performed with the gravity chromatography column of FIG. 7. These fluorescence emission spectra of LR are averaged over three measurements at various concentrations eluted with DCM by gravity column chromatography. A spectrum for crude oil was averaged over five measurements. Note that concentrations indicated in the FIG. 8 legend represent the initial LR concentrations in crude oil before dilution in DCM for chromatography. The data presented in FIG. 8 show a noticeable increase in fluorescence emission intensity of LR after separation and purification from polar components of crude oil by gravity column chromatography. The integrated fluorescence peak intensities over the wavelength range between 590 nm and 800 nm show that LR 10 ppm after chromatography exhibited comparable fluorescence intensity to that for LR 5000 ppm in crude oil.

Again, as noted, the concentrations indicated in the FIG. 8 legend represent the initial LR concentrations in crude oil before dilution in DCM for chromatography. However, a fraction obtained from a control experiment with crude oil also shows an increase in emission intensity by 5-fold, likely the result of favorable light absorption and excitation of the sample with the dark polar components removed. Consequently, a relatively poor linear trend of the emission intensities across LR concentrations was observed (correlation coefficient $R^2$=0.91 for the plot of FIG. 9; correlation coefficient $R^2$=0.94 for the plot of FIG. 10) presumably because of the overlapped fluorescence emission of the non-polar crude oil fractions coeluted with LR during the chromatography, contributing to the quantification of LR emission.

Figure 9:
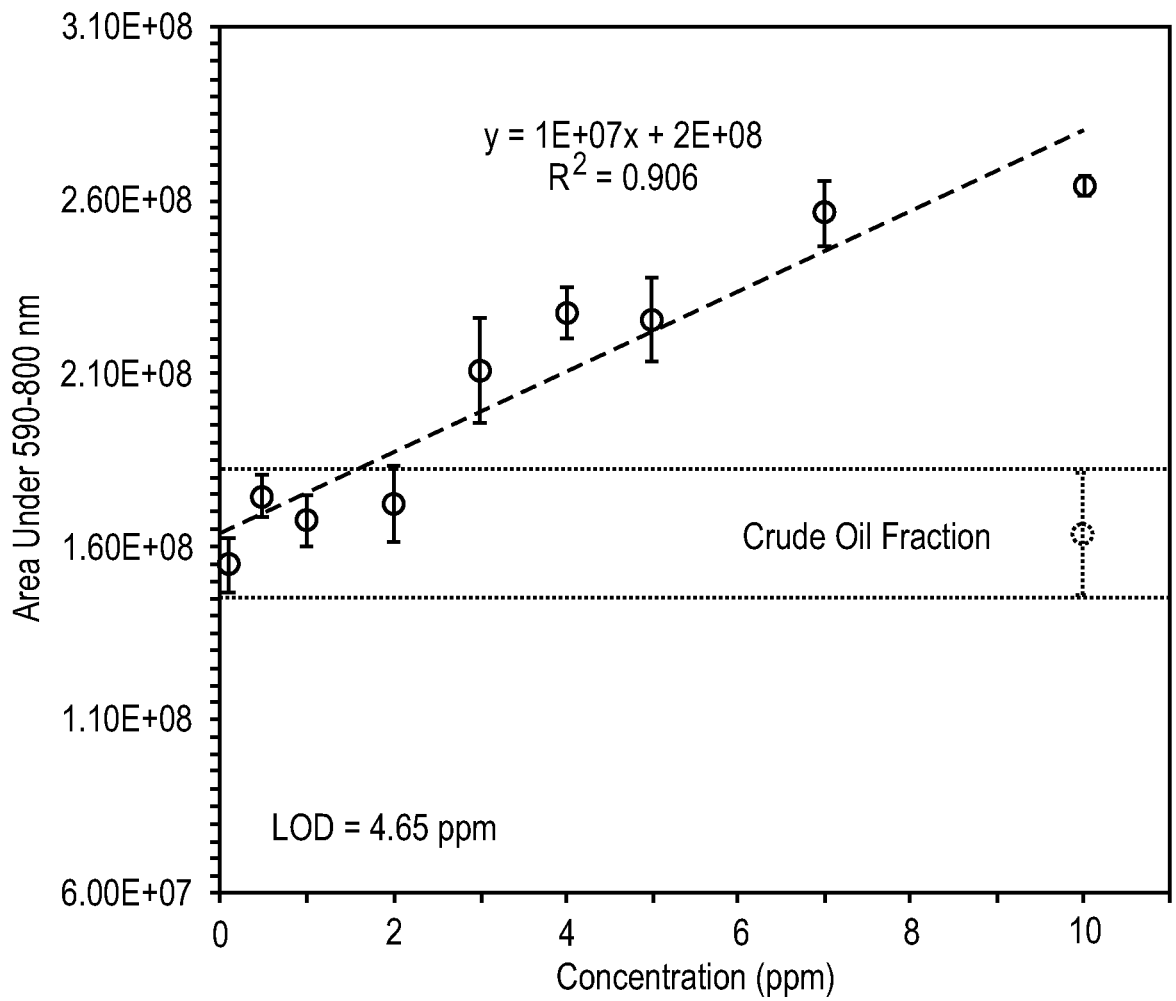
FIG. 9 is a plot of area versus concentration LR associated with spectrofluorometric characterization performed with the gravity chromatography column of FIG. 7.

FIG. 9 is a plot of area (sum of CPS) (under 590-800 nm) versus concentration (ppmv) of LR associated with spectrofluorometric characterization performed with the gravity chromatography column of FIG. 7. This is for the integrated fluorescence peak intensities (sum of CPS) ranging between 590 and 800 nm. The linear regression analyses of the integrated fluorescence peak intensities are for ranging between 590 nm and 800 nm.

Figure 10:
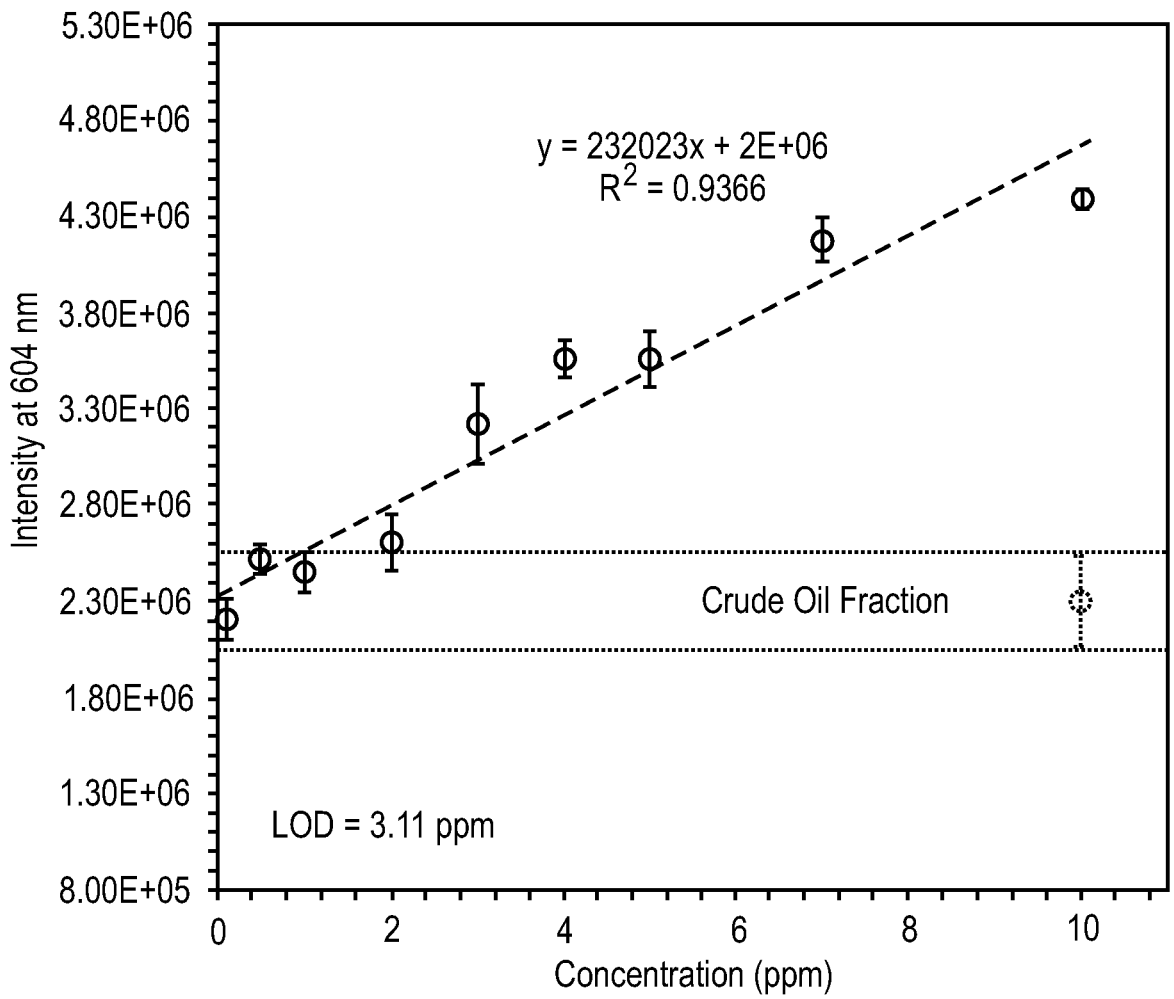
FIG. 10 is a plot of intensity versus concentration of LR associated with spectrofluorometric characterization performed with the gravity chromatography column of FIG. 7.

FIG. 10 is a plot of intensity (CPS) (at 604 nm) versus concentration (ppmv) of LR associated with spectrofluorometric characterization performed with the gravity chromatography column of FIG. 7. The emission intensities are observed at 604 nm of LR at various concentrations after chromatography, respectively, upon excitation at 578 nm.

The limit of detection (LOD) of LR after chromatography was calculated based on the average and standard deviation of the fluorescence emission of the crude oil control sample and a response curve obtained from linear regression analysis using LOD (ppm)=(mean$_{blank}$+3σ$_{blank}$−a)/b; where mean$_{blank}$ is the average of five measurements of crude oil control, σ$_{blank}$ is the standard deviation of the control, a is the intercept and b is the slope of the linear regression curve, respectively.

In FIG. 9, the calculated LOD was found to be 4.65 ppmv from the integrated LR fluorescence peak intensities.

In FIG. 10, the calculated LOD was 3.11 ppmv when the LR emission intensities are observed at 604 nm upon excitation at 578 nm.

Figure 11:
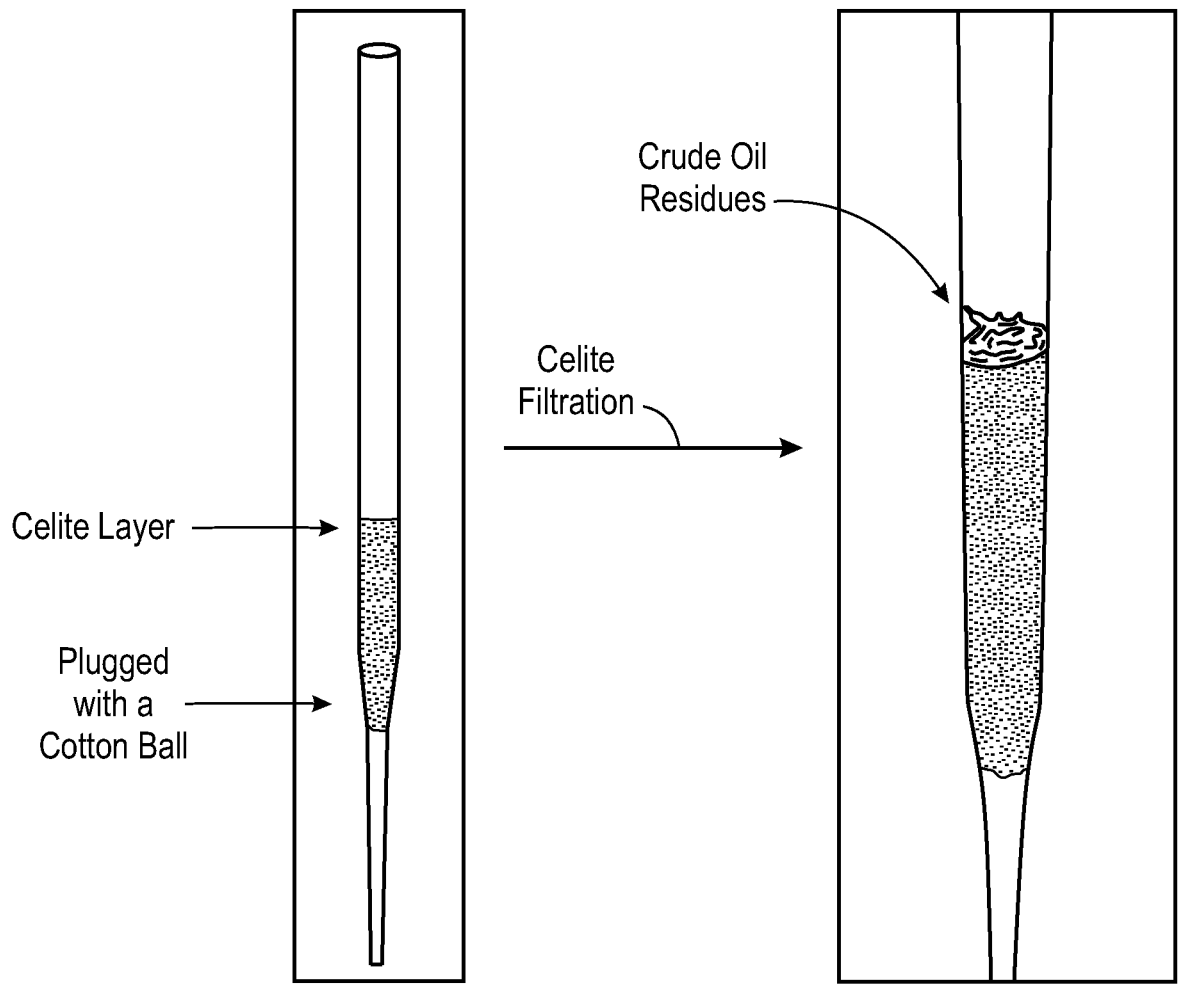
FIG. 11 is images of a custom-made Celite filtration system employed to analyze LR.

FIG. 11 is a set-up (arrangement) for the custom-made Celite filtration system that was employed to analyze LR.

Figure 12:
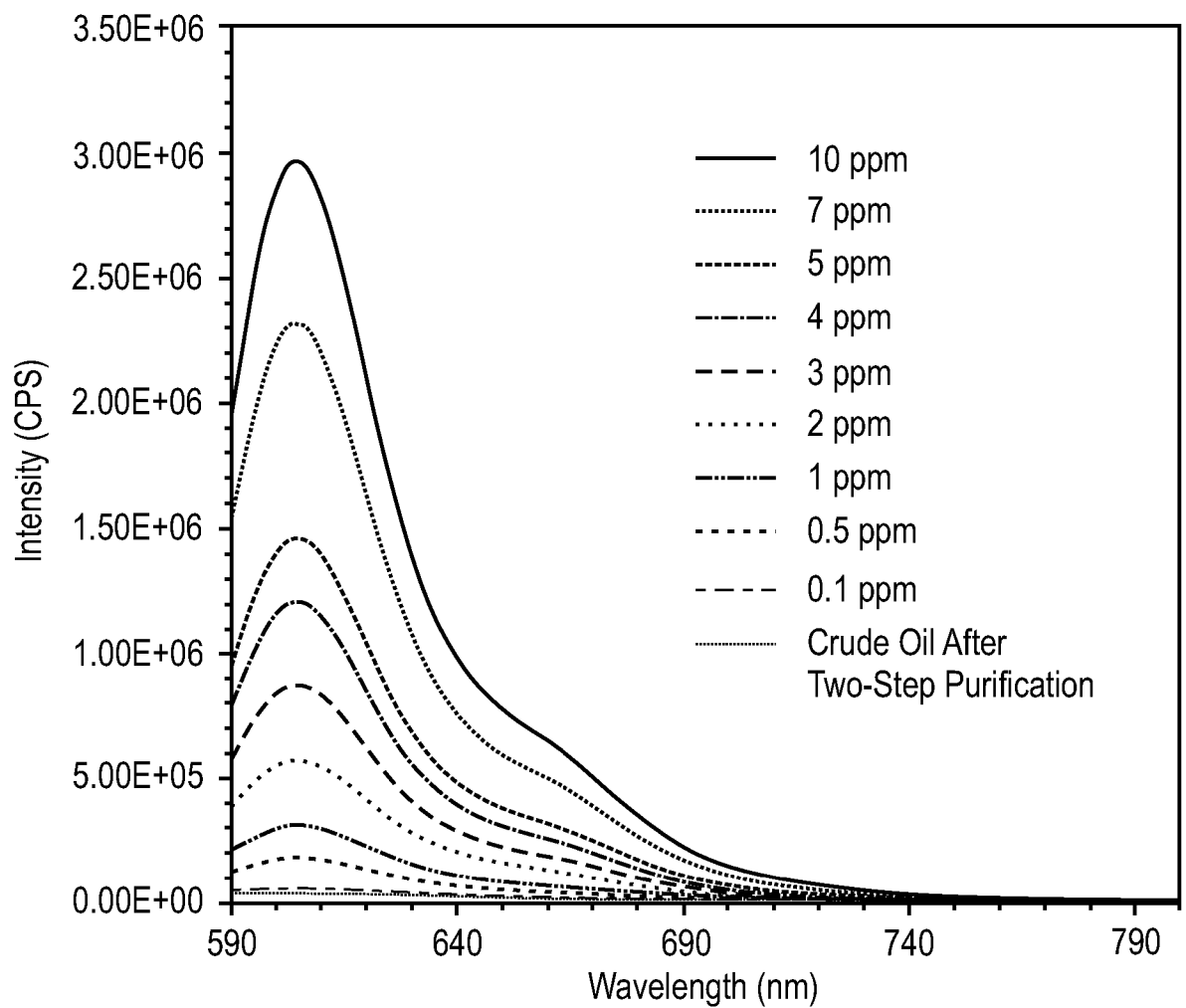
FIG. 12 is a plot of fluorescence emission spectra of LR averaged over three measurements at various concentrations after two-step purification by chromatography.

FIG. 12 is a plot of fluorescence emission spectra of LR averaged over three measurements at various concentrations after two-step purification by chromatography using DCM and Celite filtration using methanol (MeOH or $CH_3OH$), followed by evaporation and re-dissolving in 4 mL of DCM. A spectrum for crude oil was averaged over five measurements. Note that concentrations indicated the FIG. 12 legend represent the initial LR concentrations in crude oil before dilution in DCM for chromatography.

Figure 13:
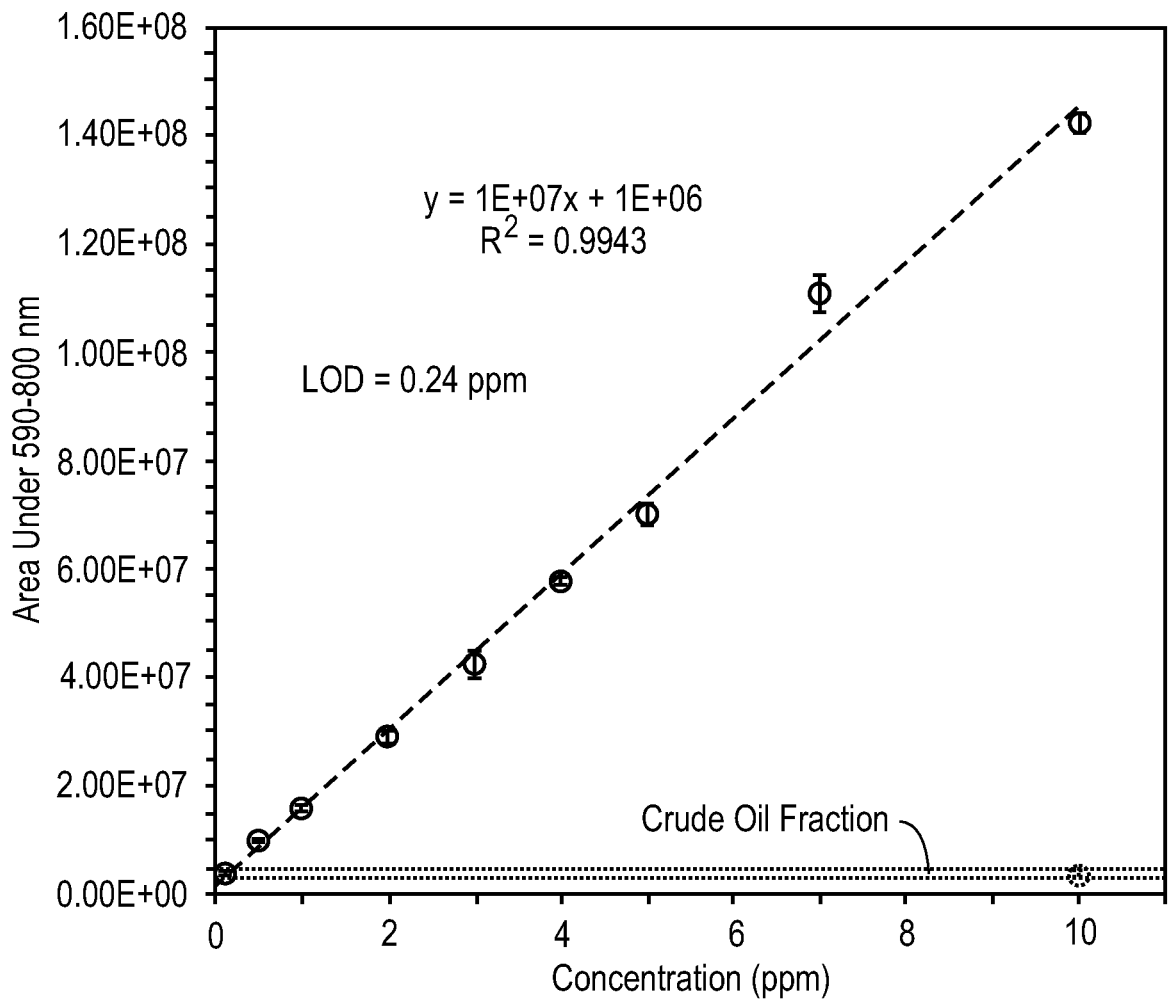
FIG. 13 is a plot of linear regression analyses for LR of the integrated fluorescence peak intensities and associated with the Celite filtration indicated in FIG. 11.

FIG. 13 is a plot of linear regression analyses for LR of the integrated fluorescence peak intensities ranging between 590 nm and 800 nm. The plot of FIG. 13 is associated with the Celite filtration as indicated in FIG. 11.

Figure 14:
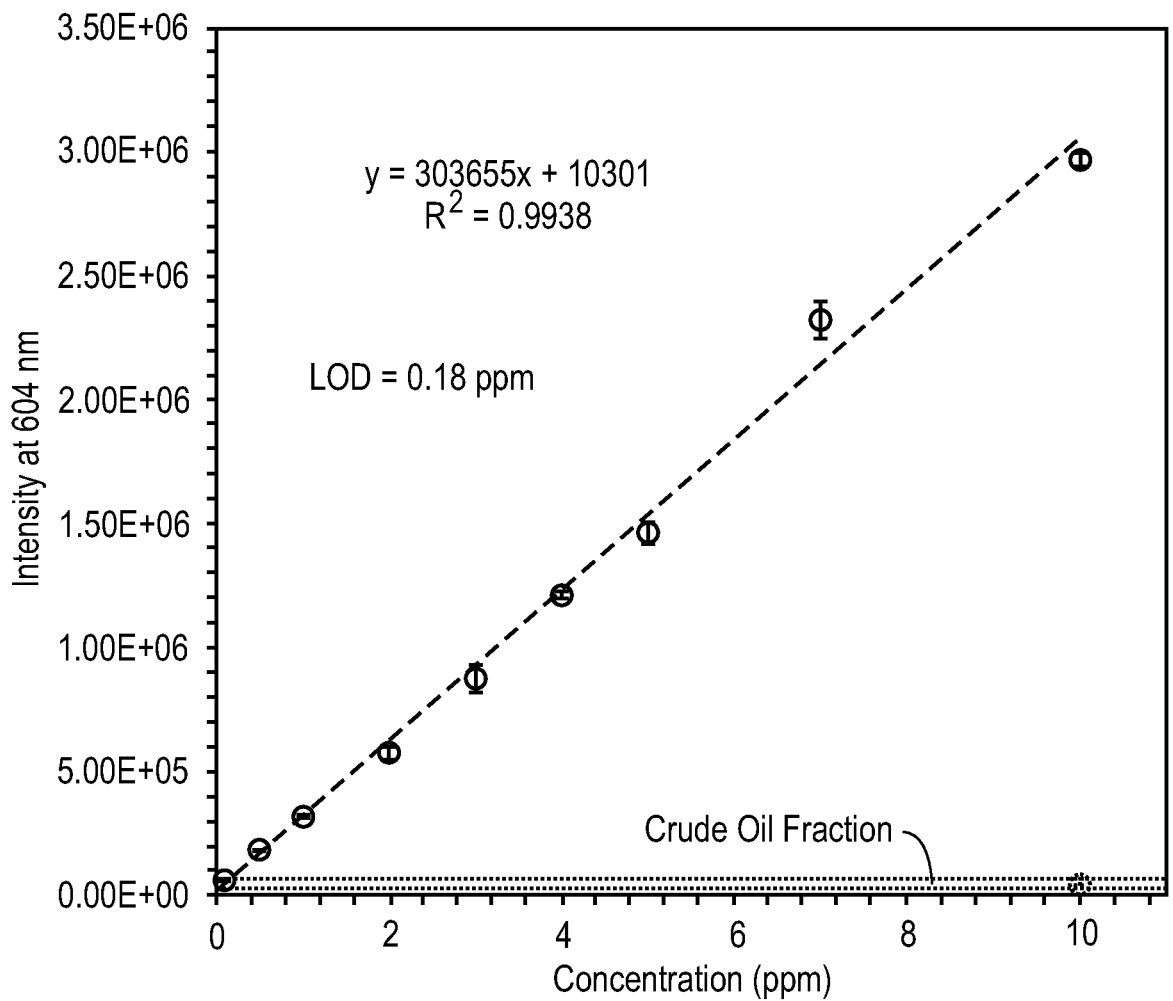
FIG. 14 is a plot of the emission intensities of LR at various concentrations after two-step purification and associated with the Celite filtration.

FIG. 14 is a plot of the emission intensities observed at 604 nm of LR at various concentrations after two-step purification, respectively, upon excitation at 578 nm. The plot of FIG. 14 is associated with the Celite filtration.

To enhance the detection sensitivity further for LR, the fluorescent non-polar fractions of crude oil coeluted with LR during the chromatography may be removed or partially removed from the resulting effluent mixtures. While the polar components of crude oil can be effectively separated using the gravity column chromatography over silica gel with 100% DCM, the separation of the non-polar crude oil components remains a challenge because of its similar polarity with LR, identified by the $R_f$ value on TLC. Therefore, explored was the second step of purification and isolation of the product by utilizing the solubility difference between LR and the non-polar crude oil components. It was found that unlike LR that is moderately soluble in methanol (MeOH), the non-polar fractions in crude oil showed a poor MeOH solubility. Therefore, in subsequent work, DCM from the resulting effluent was evaporated and then the dark viscous residues were re-dissolved in 1 mL of MeOH followed by sonication for 30 seconds.

The insoluble crude oil fractions were then filtered through the Celite packed column depicted in FIG. 11 using MeOH under a slight positive air pressure, washed with additional 4 mL of MeOH. The filtrate was evaporated to dryness and then re-dissolved in 4 mL of DCM for photoluminescence characterization. As shown in FIG. 12, fluorescence emission from the crude oil control sample was found significantly decreased after filtering off the MeOH insoluble residues from crude oil by Celite filtration. The detection limits for LR after the two-step purification were also improved to 0.24 ppmv and 0.18 ppmv from the integrated LR fluorescence peak intensities and the peak intensities observed at 604 nm, respectively, when excited at 578 nm with an enhanced linear trend of the fluorescence intensities ($R^2$=0.99) in both cases (see FIG. 13 and FIG. 14). It should be noted that the decrease in absolute emission intensities for LR compared to the ones before Celite filtration even at the same concentrations is because the background fluorescence signal from crude oil overlapped with the LR emission band was also reduced after the filtration, as can be seen from the fluorescence intensity of the crude oil control sample.

To estimate the amount of the tracer materials to be used in the field test, determining if there is any loss of the tracer after its separation/purification from crude oil is considered. Before calculating recovery factors of LR after the two-step purification, first considered is its dilution factors since LR is sequentially diluted with a chromatography solvent, which is then evaporated and re-dissolved in 4 mL of DCM for the spectroscopic analysis. The dilution factor of LR when diluted from the initial crude oil containing LR to the resulting 4 mL DCM solution after two-step purification was calculated to be 40 if it is assumed that 100% of LR can be recovered. Based on this dilution factor, we obtained fluorescence emission spectra of LR dissolved in DCM at a concentration of 2.5 part per billion by volume (ppbv) to 250 ppbv, equivalent to the initial LR concentrations in crude oil from 0.1 ppmv to 10 ppmv (see FIGS. 12 and 15). And then calibration curves for LR were constructed based on either the integrated area under the curve over the wavelength range between 590 and 800 nm (see FIG. 16) or the peak intensity observed at 604 nm (see FIG. 17), both plotted against the LR concentration converted to its initial concentration by using the dilution factor of 40. These calibration curves were then compared to their corresponding linear curves obtained from averaged LR emission after two-step purification to calculate LR recovery factors. However, it was found that the recovery factors for the relatively low concentrations of LR (s 1 ppm) were above 100% in both cases, likely because of the background emission from the residual fractions of crude oil that are still left in the resulting solution even after two-step purification (see FIG. 19).

Figure 15:
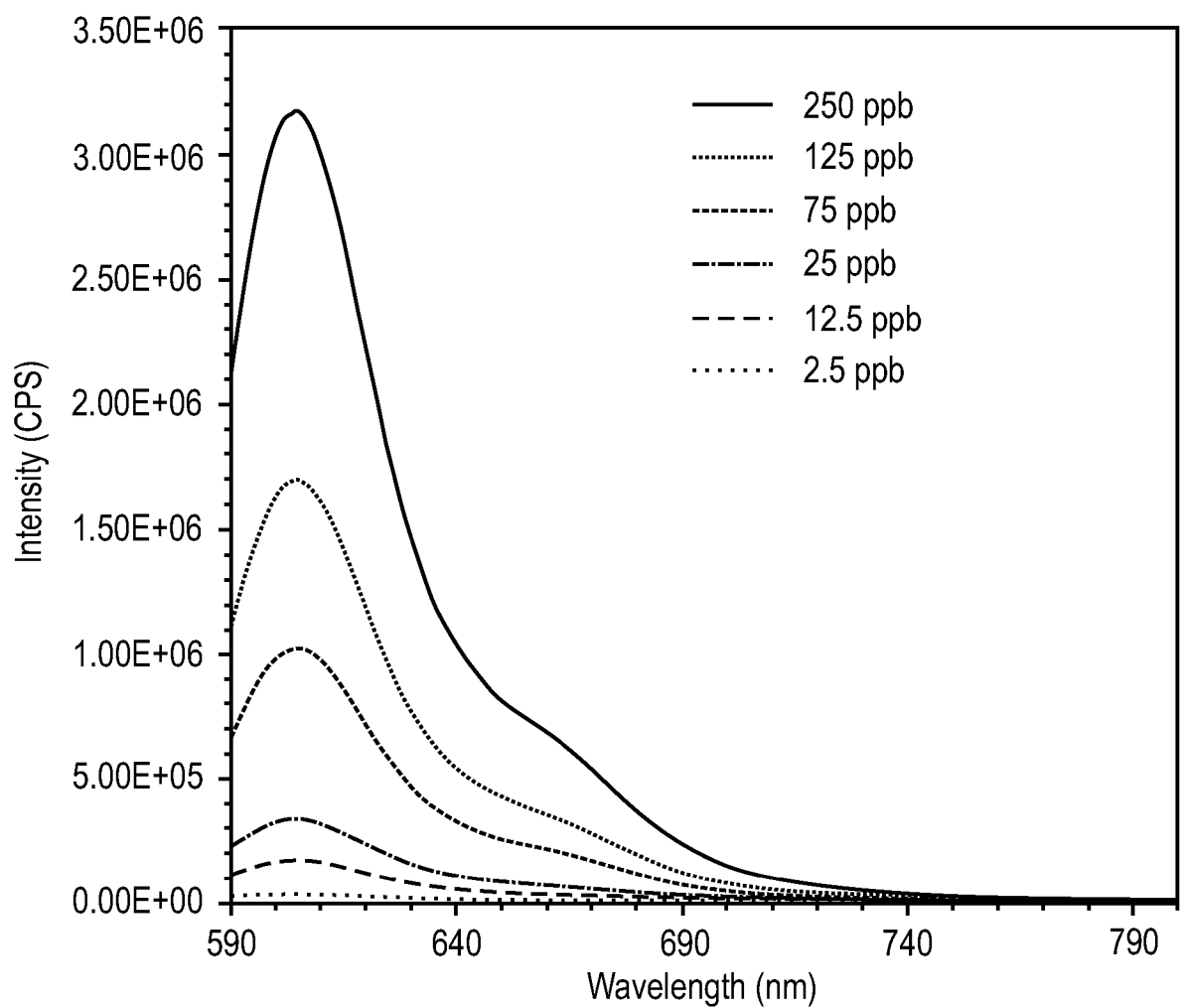
FIG. 15 is a plot of intensity versus wavelength giving fluorescence emission spectra of LR in dichloromethane (DCM) at various concentrations.

FIG. 15 is a plot of intensity (CPS) versus wavelength (nm) giving fluorescence emission spectra of LR in DCM at various concentrations (in ppbv).

Figure 16:
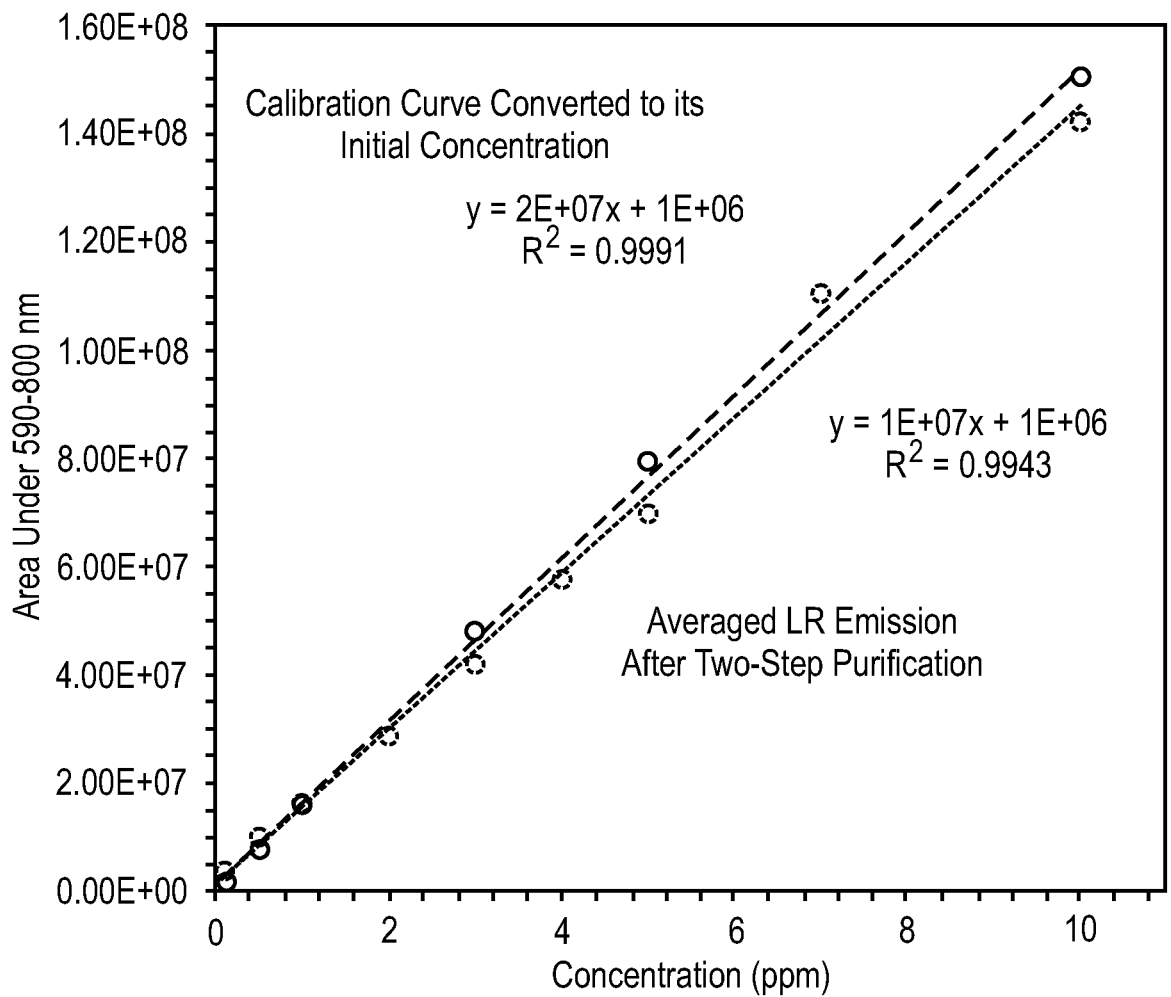
FIG. 16 is a plot of area versus concentration of LR in DCM, giving a calibration curve for LR and a curve for averaged LR emission after two-step purification.

FIG. 16 is a plot of area (under 590-800 nm) versus concentration (ppmv) of LR in DCM, giving a calibration curve for LR and a curve for averaged LR emission after two-step purification. Note that the calibration curve was plotted against the LR concentration converted to its initial concentration by using a dilution factor of 40. Both curves were obtained by plotting the integrated peak area from 590 to 800 nm.

Figure 17:
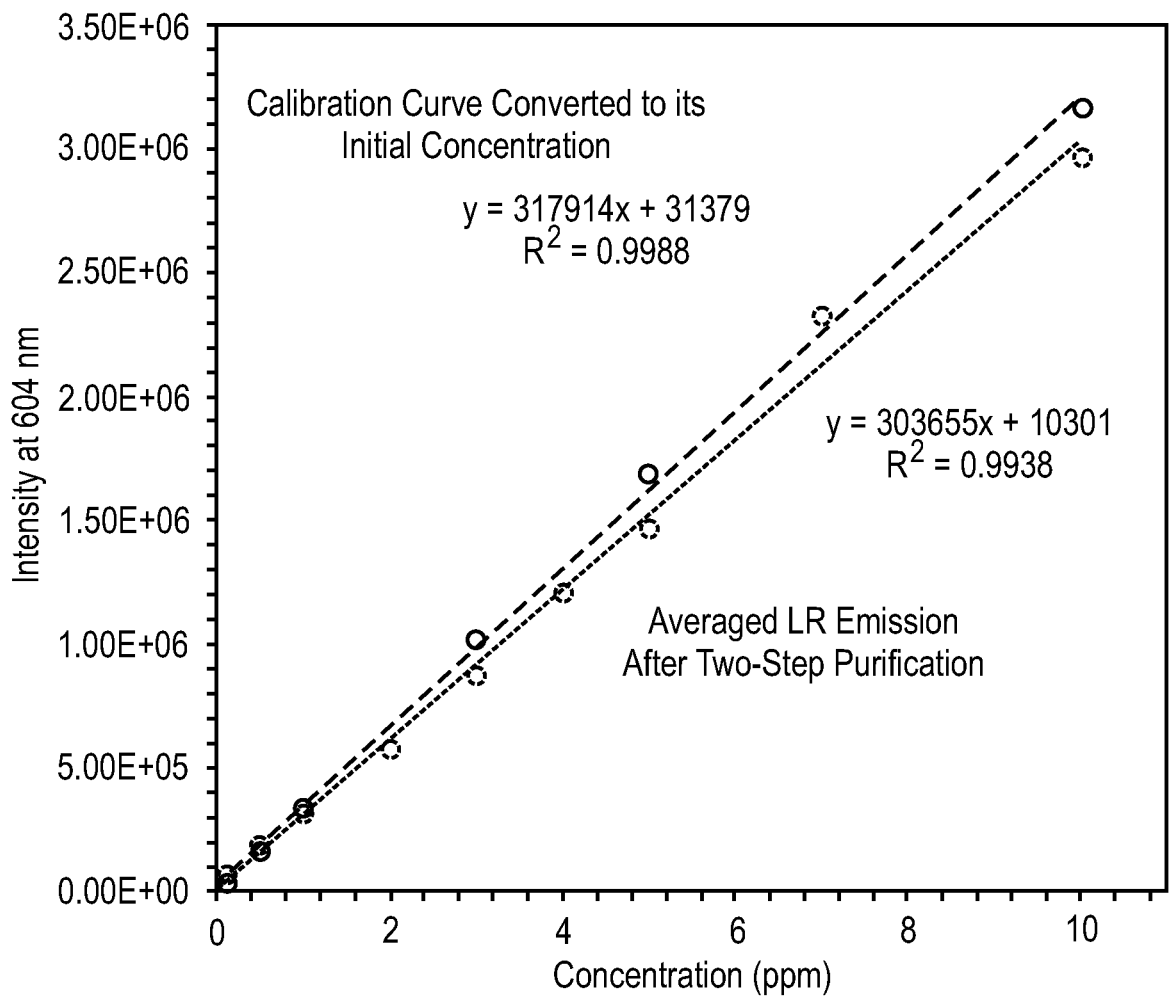
FIG. 17 is a plot of intensity versus concentration of LR in DCM, giving a calibration curve for LR and a curve for averaged LR emission after two-step purification.

FIG. 17 is a plot of intensity at 604 nm versus concentration (ppmv) of LR in DCM, giving a calibration curve for LR and a curve for averaged LR emission after two-step purification. The calibration curve was plotted against the LR concentration converted to its initial concentration by using a dilution factor of 40. Both curves were obtained by plotting the peak intensity observed at 604 nm upon excitation at 578 nm.

Figure 18:
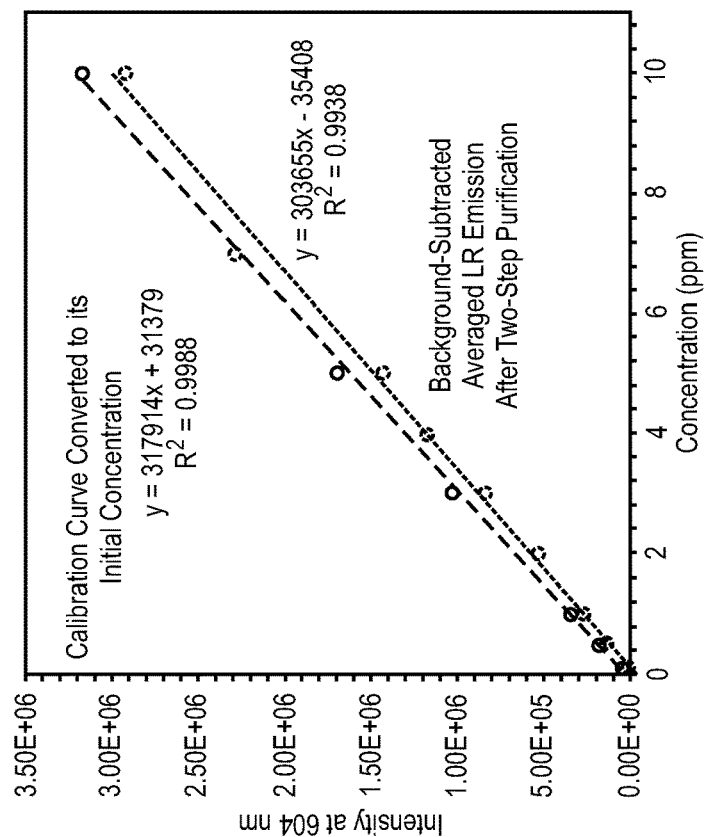
FIG. 18 is two plots showing the comparison between the LR calibration curve and its recovery, representing from the curve for averaged LR emission where the background signal from crude oil was subtracted.
Figure 18:
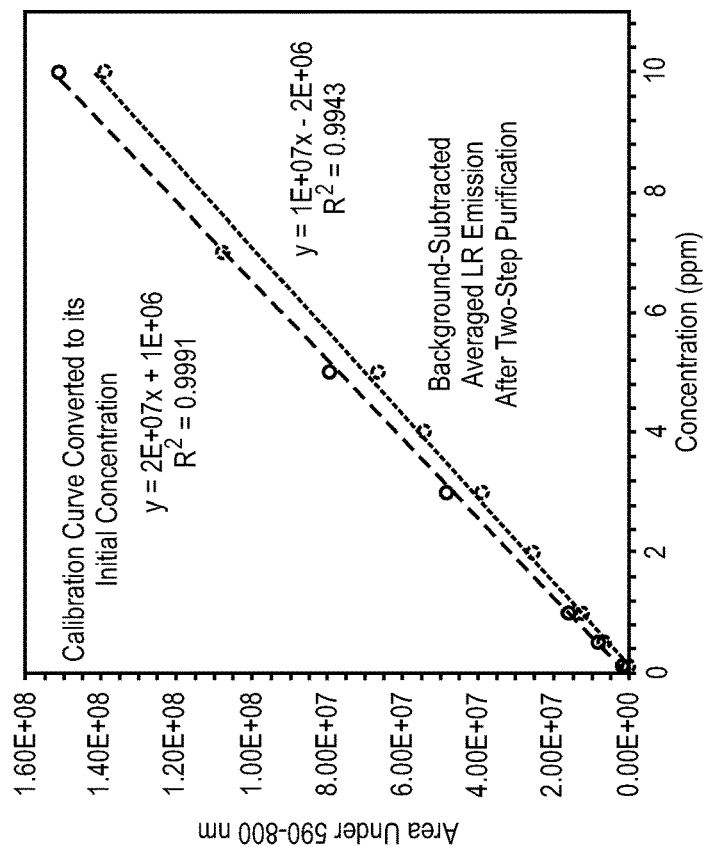

FIG. 18 is two plots showing the comparison between the LR calibration curve and its recovery, representing from the curve for averaged LR emission where the background signal from crude oil was subtracted. The averaged recovery factors for LR at an initial concentration range of 0.5-10 ppmv were found to be 84±5% in both cases (see FIG. 19). Note that the low recovery of LR at 0.1 ppm is because the concentration is out of its LOD range. Calibration curves for LR and the curves for averaged LR emission after two-step purification where the background signal from crude oil was subtracted. Note that the calibration curves (black) were plotted against the LR concentration converted to its initial concentration by using a dilution factor of 40. The curves in the plot on the left were obtained either by plotting the integrated peak area from 590 to 800 nm. The curves in the plot on the right were obtained by plotting the peak intensity observed at 604 nm upon excitation at 578 nm.

FIG. 19 is recovery factors for LR after two-step purification. The factors are given for before background subtraction and for after background subtraction. Multiple concentrations (ranging from 0.1 ppmv to 10 ppmv) of the LR are considered.

The discussion now turns to Lumogen Violet and Lumogen Yellow. Comparative studies of LV and LY were also conducted using the same or similar techniques for dye separation from crude oil matrix to evaluate their potential as a tracer in present applications. While naphthalimide-based LV and perylene-based LY are both considered to be highly fluorescent oil-soluble fluorophores, they have limited solubility in toluene compared to LR as mentioned above (10 g/L for LV and <1 g/L for LY), which therefore the utilization of LV and LY may benefit from higher detectability than LR because LV and LT may generally be injected in relatively low concentrations in the field. First identified were retention factors ($R_f$) for LV and LY by silica TLC using 100% DCM, which showed the values of 0.14 and 0.06 for LV and LY, respectively, representing more polar characteristics for these two fluorophores on a silica matrix. Therefore, a solvent mixture of DCM/MeOH (95:5, v/v) was chosen for a chromatography solvent, which increased their $R_f$ values to 0.91 and 0.96 for LV and LY, respectively, enabling separation of LV and LY not only from crude oil but also from LR.

In this beneficial or optimized chromatography procedure, each crude oil mixture containing either LV or LY at 10 ppm was applied to the same set up (FIG. 7) for a custom-made gravity-column chromatography system with sequential elution process. Briefly, the first elution step was configured using 100% DCM to be the same with the procedure for LR, so that multiple tracers can be used and analyzed in the same cycle of separation/purification. In the subsequent elution, a 10 mL of solvent mixture of DCM/MeOH (95:5, v/v) was passed through the column by gravity and then additional 4 mL of the solvent mixture was added and passed through the column to collect relatively polar LV or LY in a new collecting vial. However, the collected sample solution after silica column chromatography appeared to be dark brown, likely resulted from the co-eluted polar fractions of crude oil because of the increased chromatography solvent strength. The effluents were characterized by fluorescence spectroscopy as shown in FIG. 20 (see both plots).

Figure 20:
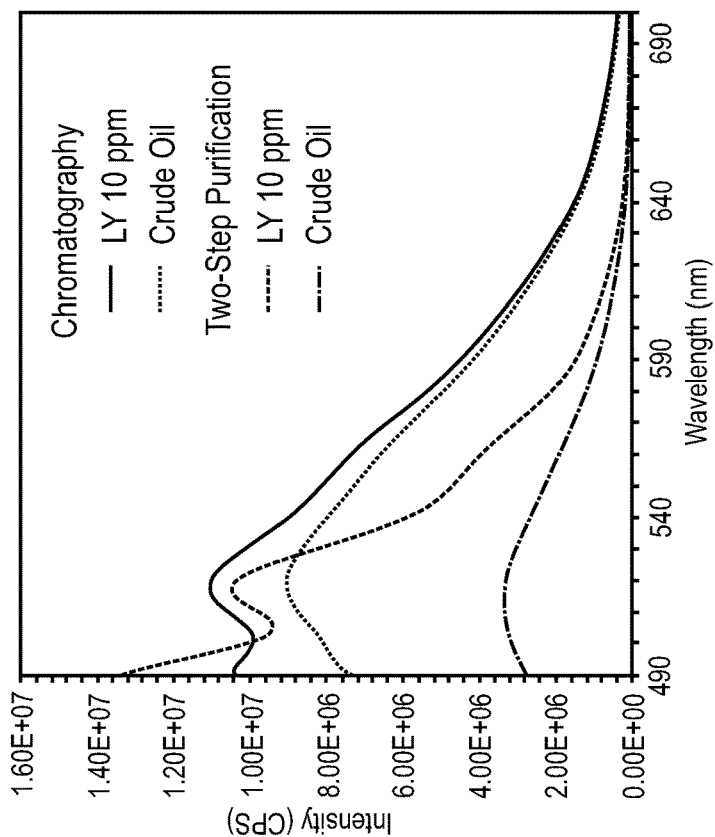
FIG. 20 is two plots both of intensity versus wavelength, giving characterization of effluents by fluorescence spectroscopy.
Figure 20:
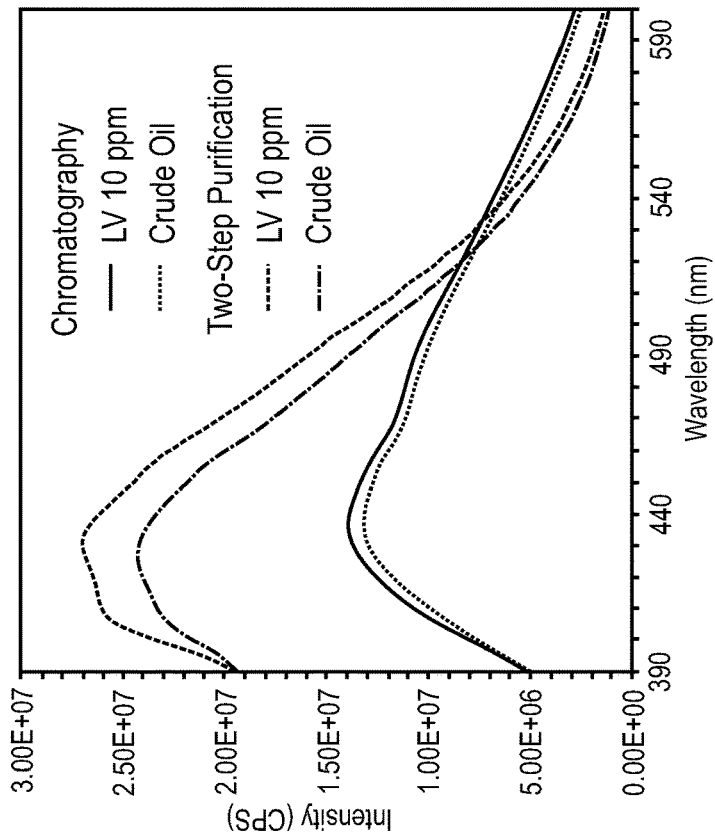

FIG. 20 is two plots both of intensity (CPS) versus wavelength (nm), giving characterization of the effluents by fluorescence spectroscopy. The dotted lines represent the results obtained after gravity column chromatography. The plot on the left is fluorescence emission spectra of LV in DCM/MeOH (95/5) at 10 ppm and the crude oil control sample. The plot on the right is fluorescence emission spectra of LY in DCM/MeOH (95/5) at 10 ppm and the crude oil control sample. The dotted lines represent the results in DCM/MeOH (95/5) obtained by gravity column chromatography and the plain lines were obtained by two-step purification where the resultant materials are dissolved in DCM. (Excitation at 378 nm for LV and 476 nm for LY.) The results show that while the improved fluorescence characteristics for LV and LY can be achieved by chromatography separation, the fluorescence of the polar crude oil fractions overlapped with the tracer emission band, which possesses 95% and 87% of the integrated area under the curve for LV (390-600 nm) and LY (490-700 nm), respectively, significantly affects the tracer detectability. Also performed was Celite filtration for the samples after chromatography to remove any MeOH insoluble residues for fluorescence signal enhancement. The left plot in FIG. 20 shows increased fluorescence intensities not only for LV but also for crude oil control sample after two-step purification (plain lines), presumably because of the noticeable amount of MeOH soluble crude oil fractions remaining in the sample that can be excited at 378 nm (crude $oil_{area}/LV_{area}$=89%). On the other hand, LY showed decrease in signal intensity of the fluorescence emission after Celite filtration (crude $oil_{area}/LY_{area}$=39%). However, compared to LR that has the background signal ratio of 2% at 10 ppm, the detectability of LY may not be adequate in some implementations because of relatively high background signal.

The discussion now turns to Nile Red (NR). To utilize multiple oleophilic tracers together for our applications that are separable using the current two-step purification method, a few important criteria need to be considered. First, the tracer candidates should be soluble at least in these three solvents, toluene, DCM and MeOH. Second, for separation by gravity column chromatography, they should have different adsorption capacities onto silica gel to be isolated from one another. And lastly, their emission spectral bands should be distinguished from each other for reliable quantification of fluorescence signal if they have similar adsorption capacities onto silica gel. In this regard, Nile Red (NR)

can be another potential candidate as an oleophilic tracer since this well-known commercially available fluorophore is highly soluble in organic solvents such as DCM and toluene and has high quantum efficiency.

Because NR is also a solvatochromic compound, its maximum absorption wavelength when dissolved in DCM was first determined by UV-vis spectroscopy, which appeared at 539 nm (data not shown). Then $R_f$ was identified for NR by silica TLC first using 100% DCM, with the result showing $R_f$ of 0.13 similar to that of LV or LY. When tested with a solvent mixture of DCM/MeOH (95:5, v/v), the $R_f$ of NR was >0.71. Because these $R_f$ values enable the separation of NR from LR that has $R_f$>0.87 in DCM, evaluation of a NR and LR mixture in crude oil in the same cycle of two-step purification can be achieved. Therefore, a mixture of LR and NR at the concentration from 5 ppmv down to 0.5 ppmv in crude oil was applied to the two-step purification method used for LV and LY, including the sequential elution for gravity column chromatography using DCM and DCM/MeOH (95:5, v/v), for separation/purification of LR and NR from crude oil.

Figure 21:
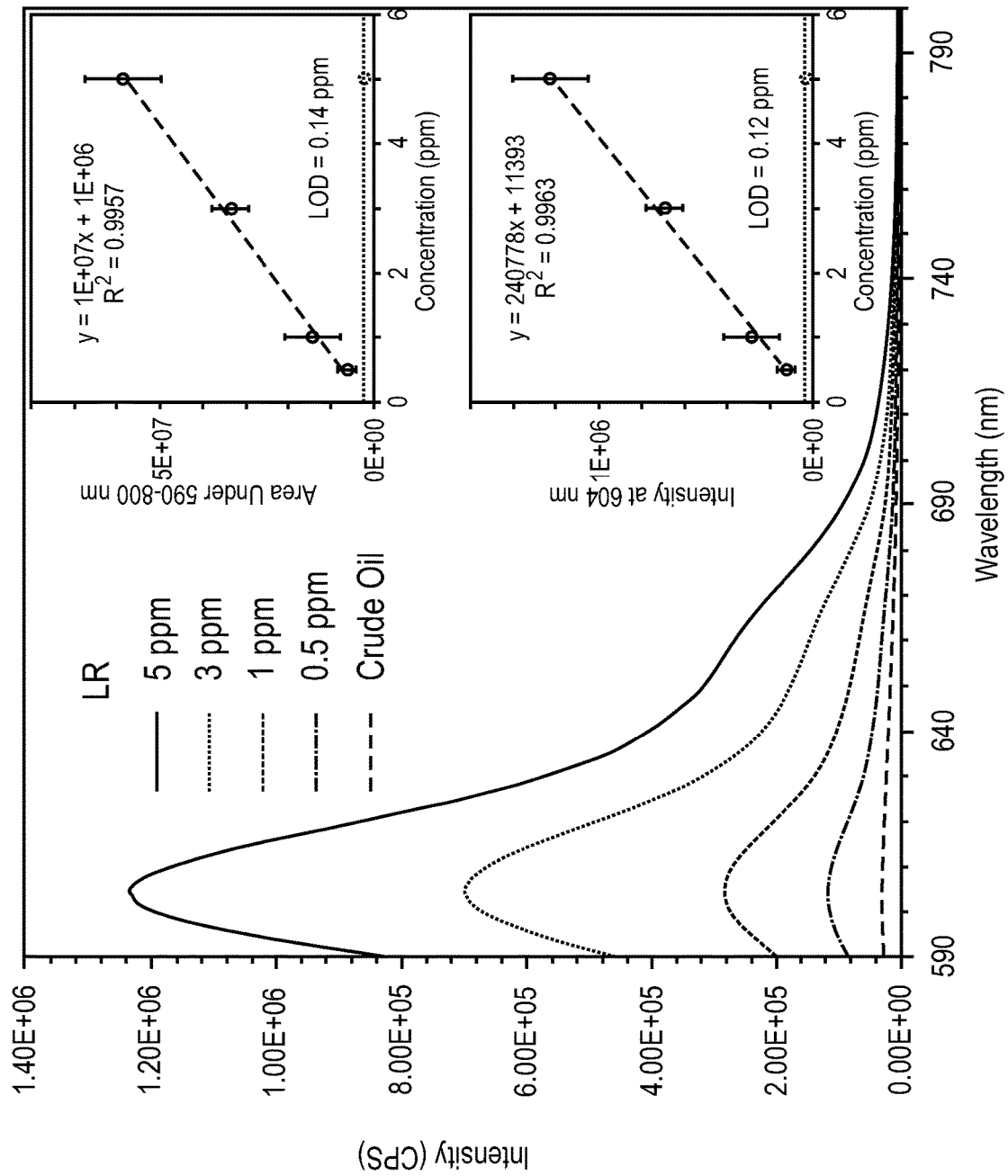
FIG. 21 is a plot of intensity versus wavelength depicting fluorescence emission spectra of LR, co-injected with Nile Red (NR), averaged over three measurements at varied concentration after two-step purification by chromatography and Celite filtration.

FIG. 21 is a plot of intensity (CPS) versus wavelength (nm) depicting fluorescence emission spectra of LR, co-injected with NR, averaged over three measurements at various concentration after two-step purification by chromatography and Celite filtration. The top inset in FIG. 21 is a plot of area (under 590-800 nm) versus concentration (ppmv) of LR, depicting linear regression analyses of the integrated fluorescence peak intensities ranging between 590 nm and 800 nm. The bottom inset in FIG. 21 is a plot of intensity (CPS) at 604 nm versus concentration (ppmv) of LR depicting the emission intensities observed at 604 nm of LR at various concentrations after the two-step purification, respectively, upon excitation at 578 nm.

In FIG. 21, the averaged fluorescence emission spectra of LR, separated from LR/NR crude oil mixture, at various concentration after two-step purification by chromatography using 100% DCM and Celite filtration with MeOH are consistent with the spectral trends shown in FIG. 12 where LR was separated from a crude oil that does not contain NR, showing no interaction between LR and NR during the separation and purification. Because that yield of the purification observed may vary due to the manual nature of the purification steps, automation of part of or the entire process would mitigate some of the sources of variability. As indicated above, the insets of FIG. 21 represent linear regression analyses performed on the data sets of the integrated LR fluorescence peak intensities ranging between 590 nm and 800 nm (top) and of the emission intensities observed at 604 nm of LR at various concentrations after the two-step purification (down), respectively, upon excitation at 578 nm. The calculated LODs are in the same order of magnitude with the one separated without NR, 0.14 ppmv for the top chart and 0.12 ppmv for the bottom chart.

Figure 22:
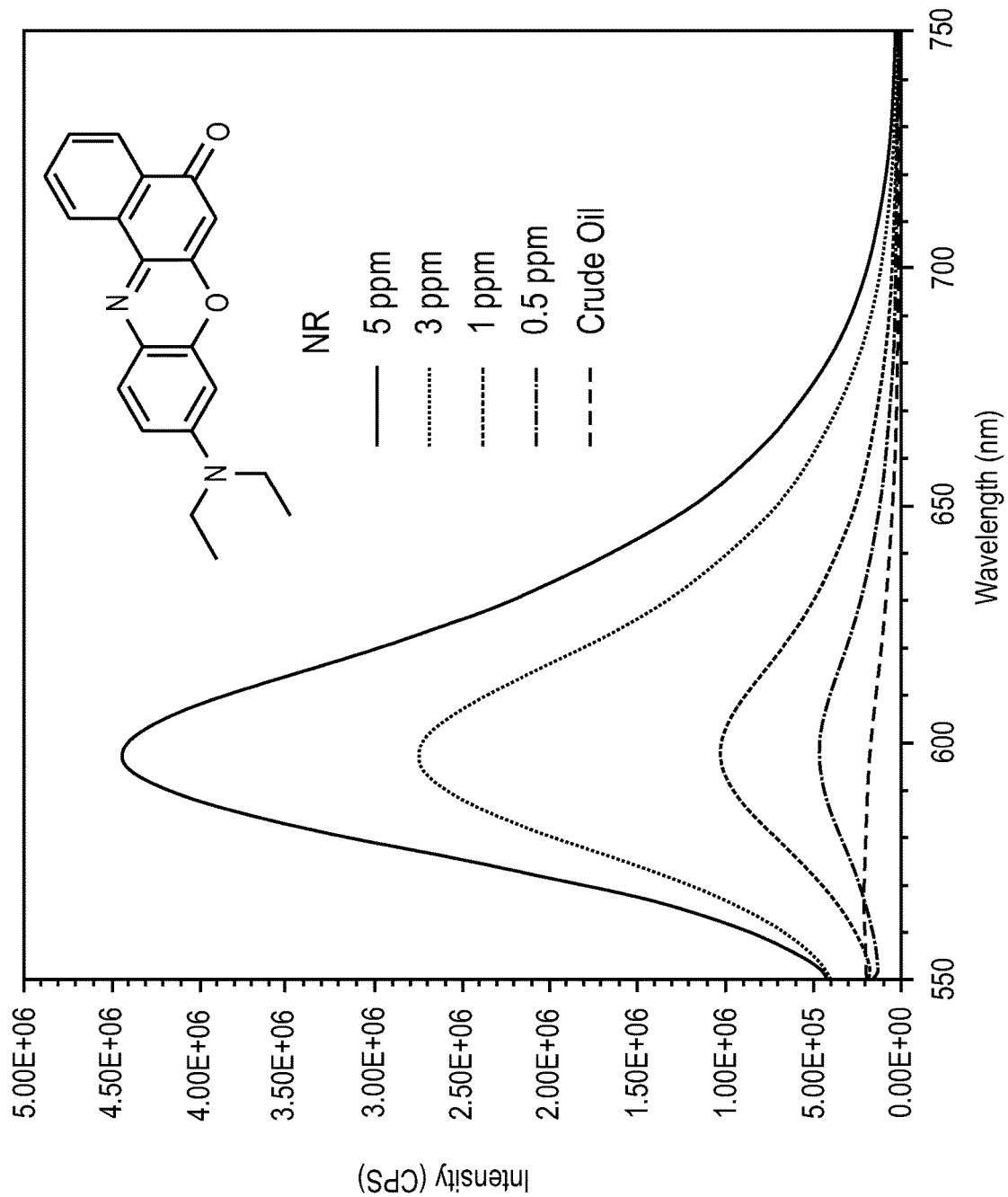
FIG. 22 is a plot of intensity versus wavelength of NR, depicting fluorescence emission spectra of NR averaged over three measurements at varies concentration after chromatography with sequential elution using DCM and DCM/methanol (95/5).

FIG. 22 is a plot of intensity (CPS) versus wavelength (nm) of NR, depicting fluorescence emission spectra of NR averaged over three measurements at various concentration after chromatography with sequential elution using DCM and DCM/MeOH (95/5), and Celite filtration using MeOH, followed by evaporation and re-dissolving in 4 mL of DCM.

NR separated via sequential elution using DCM/MeOH (95:5, v/v) followed by Celite filtration was also characterized by fluorescence spectroscopy. Upon excitation at 539 nm, NR showed emission maximum at 597 nm (FIG. 22). Although the fluorescence emission band of NR is overlapped with that of LR to some extent, its quantification is not affected by LR emission because they had completely separated each other during the chromatography. A high degree of linearity was found for both the integrated NR fluorescence peak intensities (550-750 nm) and the emission intensities observed at 597 nm of NR at a concentration range of 0.5-5 ppm ($R^2$>0.99) with LODs of 0.27 ppm and 0.15 ppm, respectively (see FIG. 23).

Figure 23:
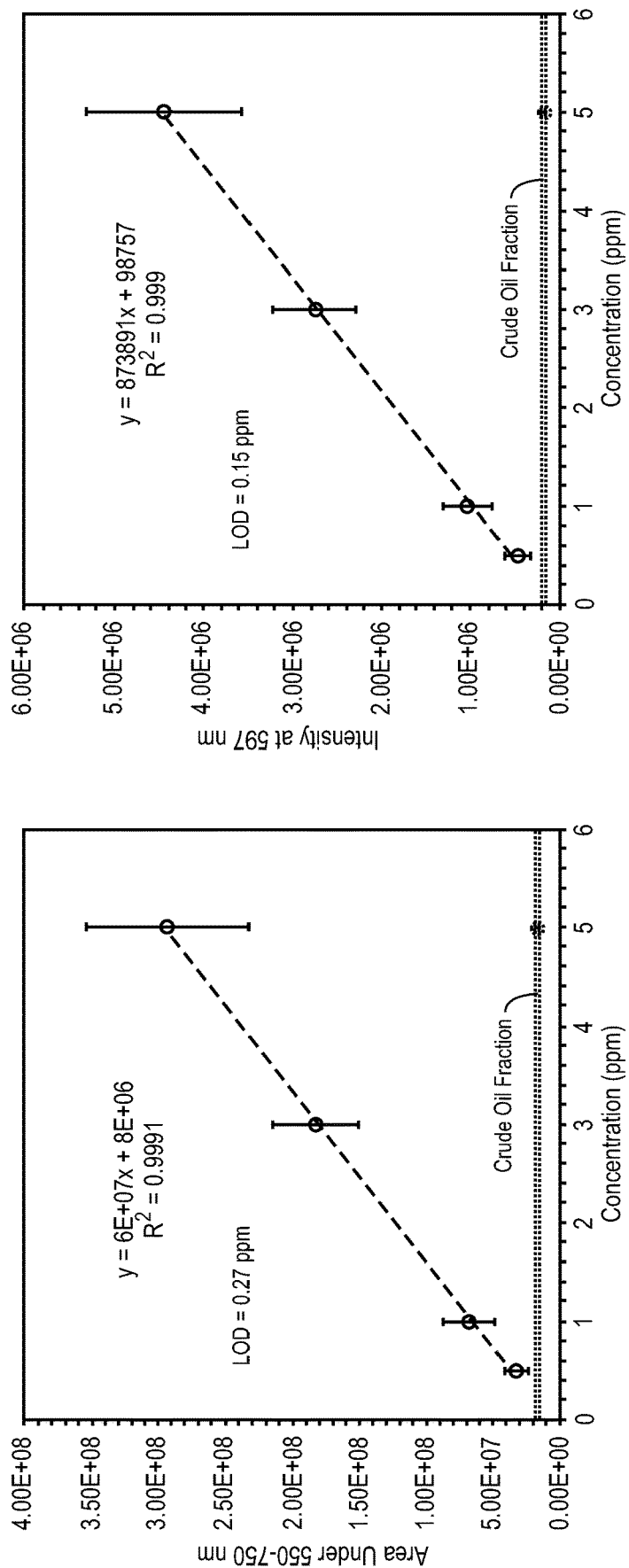
FIG. 23 is two plots associated with NR.

FIG. 23 is two plots. The plot on the left is area (under 550-750 nm) versus concentration (ppmv) of NR, depicting linear regression analyses of the integrated NR fluorescence peak intensities ranging between 550 nm and 750 nm. The LOD is 0.27 ppmv. The plot on the right is intensity at 597 nm versus concentration (ppmv) of NR, depicting emission intensities observed at 597 nm of NR at various concentrations after two-step purification, respectively, upon excitation at 539 nm. The LOD is 0.15 ppmv.

Figure 24:
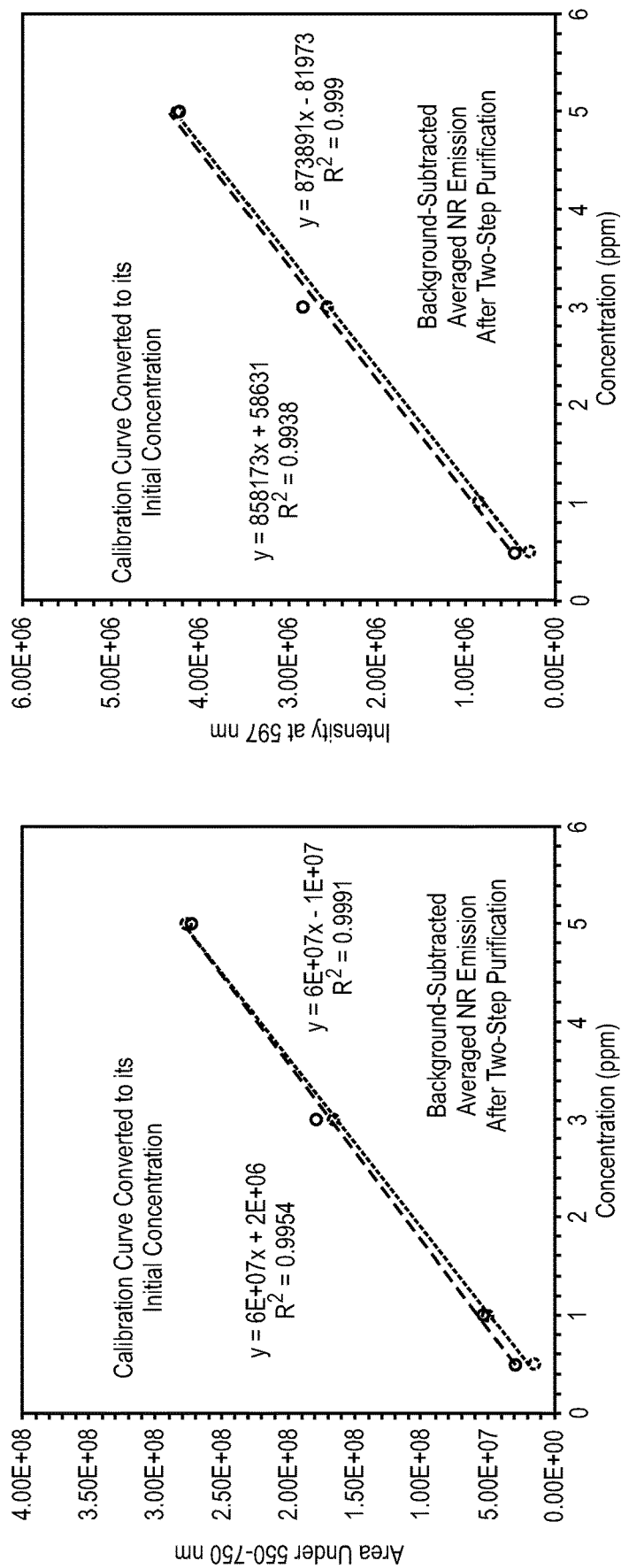
FIG. 24 is calibration curves for NR and the curves for averaged NR emission after two-step purification where the background signal from crude oil was subtracted.

FIG. 24 is calibration curves for NR (black) and the curves for averaged NR emission after two-step purification where the background signal from crude oil was subtracted (red). Note that the calibration curves (black) were plotted against the NR concentration converted to its initial concentration by using a dilution factor of 40. The curves were obtained by plotting the integrated peak area from 550 to 750 nm in the plot on the left, and by plotting in the plot on the right the peak intensity observed at 597 nm upon excitation at 539 nm. Calibration curves for NR dissolved in DCM at concentrations from 12.5 ppbv to 125 ppbv are plotted against its initial concentrations from 0.5 ppmv to 5 ppmv using a dilution factor of 40, shown in FIG. 24 (black line).

FIG. 25 indicates that determined was a recovery factor for NR after two-step purification. FIG. 25 is a table of recovery factors for NR after two-step purification. As expected, because of the background signal of the polar fractions of crude oil, the recovery factors for NR were found to be >100% in the tested concentration ranges (FIG. 25, data not shown). The linear curves for the background-subtracted averaged NR emission after two-step purification were each plotted on the same chart (red line) in FIG. 24. After subtracting the background intensities, the averaged recovery factors were estimated as >95% in a concentration range of 1-5 ppmv (FIG. 25). Similar to the cases for LV and LY, because there is still a noticeable background signal from the polar crude oil fractions soluble in MeOH, NR at 0.5 ppmv shows the background signal ratio of 53% (Crude $oil_{area}/NR_{area}$), resulting in relatively low recovery factors of 54% and 63% for the integrated intensities and the emission observed at 597 nm, respectively. However, given the high detectability and applicability to the purification technique, NR can be considered as an oleophilic tracer.

Automatable chromatographic separation techniques are applicable. With chromatographic separation in certain implementations as a key component of the analysis technique, where fluorogenic interferents in crude oil can be effectively removed or significantly reduced, automating of this action with instruments is applicable. For instance, employing a flash chromatography system (set-up, arrangement), e.g., CombiFlash (Teledyne ISCO) or similar automated flash systems, or a high-performance liquid chromatography (HPLC) system with an inline fluorescence module as the detector, and so forth.

Figure 26:
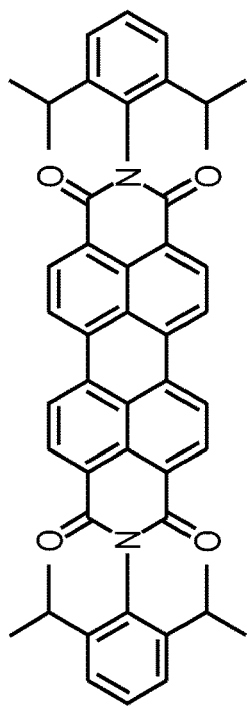
FIG. 26 and FIG. 27 are diagrams of structures of applicable oil-soluble taggants
Figure 26:
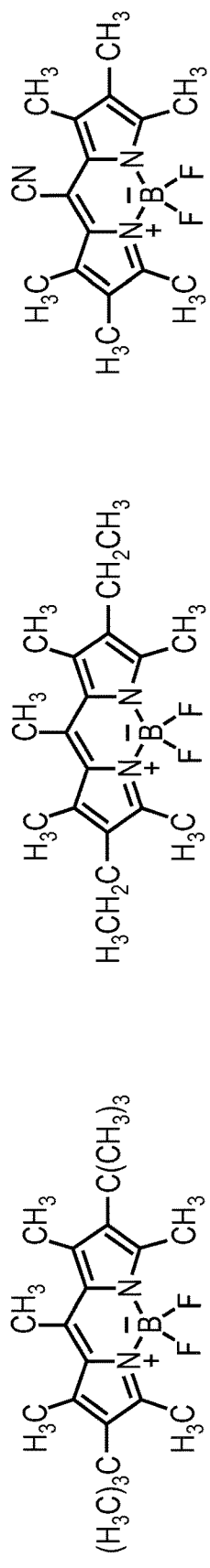
Figure 27:
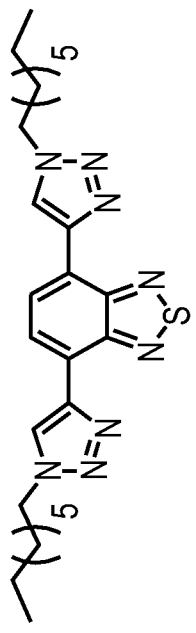
Figure 27:
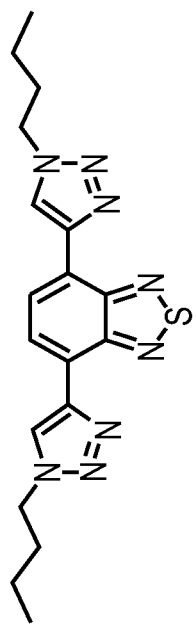
Figure 27:
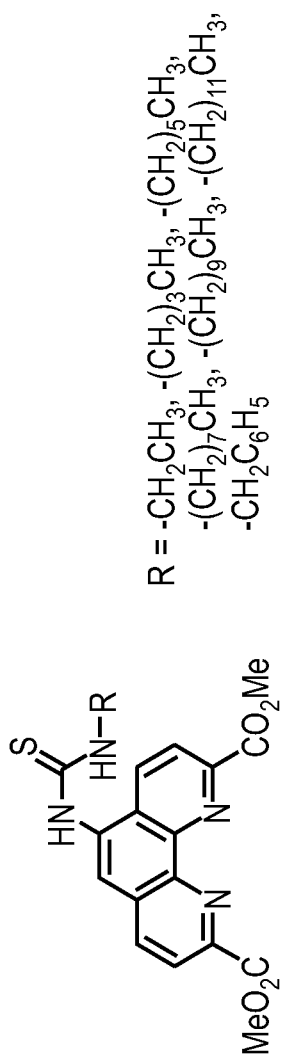
Figure 27:
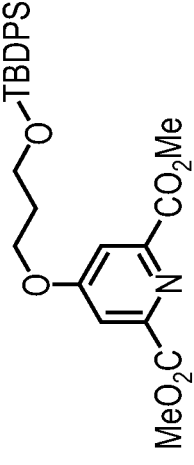

FIG. 26 and FIG. 27 depict structures of applicable oil-soluble taggants, which are in addition to those previously discussed. These fluorescent molecules applicable for present embodiments include derivatives of perylene, e.g., Lumogen F Orange 240, derivatives of pyrromethene, derivatives of benzothiadiazole, and derivatives of dipicolinic acid (DPA) and phenanthroline dicarboxylic acid (PDCA) that have been specifically functionalized to compatibilize their solubility in apolar solvent or hydrophobic environment.

In addition, derivatives of dipicolinic acid (DPA) and phenanthroline dicarboxylic acid (PDCA) can be utilized as oleophilic molecular ligands after hydrolysis of the dimethylester group, which complex lanthanide ions such as $Eu^{3+}$ and $Tb^{3+}$. Because the energy transfer from the ligand to the lanthanide leads to a high degree of fluorescence with long lifetime, any background oil signals can be effectively filtered out while monitoring in a time-gated fluorescence.

Example 2: Evaluated optically detectable hydrophobically-modified organic fluorophore (Nile Blue). In the discussion below for Example 2, after an introduction, given are the experimental procedure and results.

Figure 28:
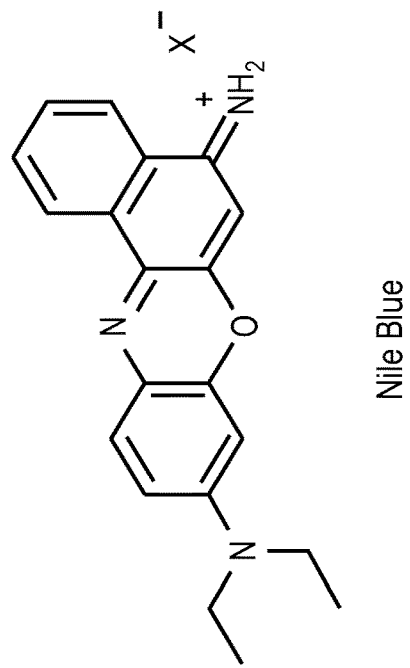
FIG. 28 is diagrams of molecular structures of NR and Nile Blue (NB).
Figure 28:
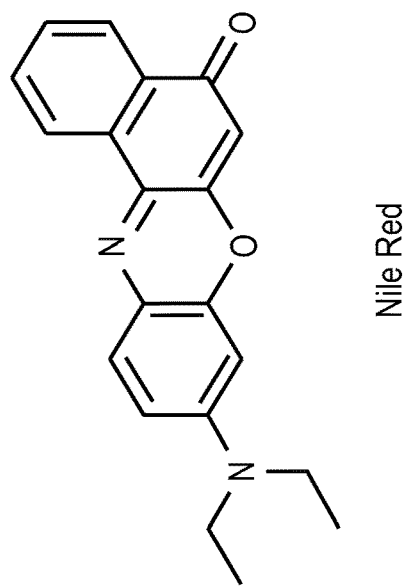

FIG. 28 is molecular structures of Nile Red and Nile Blue. As for an introduction for Example 2, Nile Blue (NB) has a positively charged and oxidized phenoxazine system, i.e., it is a phenoxazinium; the conspicuous difference between NB and Nile Red (NR) is that the latter is neutral. Both dyes have a 9-diethylamino substituent to donate electron density across the ring, but NR and NB each have different electron acceptors, a carbonyl and an iminium group, respectively (see FIG. 28). One characteristic that distinguishes NB from NR is that NB is significantly more water-soluble. Since the NB is much easier to be produced in synthesis than NR, it is much cheaper as a common commercial dye. Again, NB is a fluorescent dye that is highly soluble in water. NB also shows significant fluorescence in nonpolar solvents with a high quantum yield, although NB solubility in organic solvents is relatively low. The fluorescence of NB is stable in varying solvents and wide pH range, but the absorption and emission maxima are dependent on pH and the solvents used, as shown in Table 1 below.

TABLE 1

The absorption and emission maxima of Nile Blue in different solvents.

| Solvent | Absorption λ max (nm) | Emission λ max (nm) |
|---|---|---|
| Toluene | 493 | 574 |
| Acetone | 499 | 596 |
| N,N-Dimethylformamide | 504 | 598 |
| Chloroform | 624 | 647 |
| 1-Butanol | 627 | 664 |
| 2-Propanol | 627 | 665 |
| Ethanol | 628 | 667 |
| Methanol | 626 | 668 |
| Water | 635 | 674 |
| 1.0 molar (M) hydrochloric acid (pH = 1.0) | 457 | 556 |
| 0.1M sodium hydroxide solution (pH = 11.0) | 522 | 668 |
| Ammonia water (pH = 13.0) | 524 | 668 |

Based on the inexpensive water-soluble NB, present embodiments have developed techniques to economically use NB as an oil-soluble tracer by modifying the NB molecular structure. The NB molecular structure is modified by chemically grafting various hydrophobic functional groups, and thus converted this water-soluble molecule to highly oil soluble. Ten (10) new Nile Blue derivatives were chemically synthesized. The introduced functional groups not only enhance the hydrophobicity but also function as structural barcodes for the resulting new compounds, enabling them to be applied as barcoded oil tracers.

As for experimental procedure in Example 2, the syntheses were achieved utilizing the reaction of primary amine with isothiocyanate to result substituted thioureas through chemical reaction:

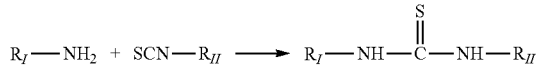

where the $R_I$ is an aromatic or heterocyclic group and the $R_{II}$ is a dye group.

Figure 29:
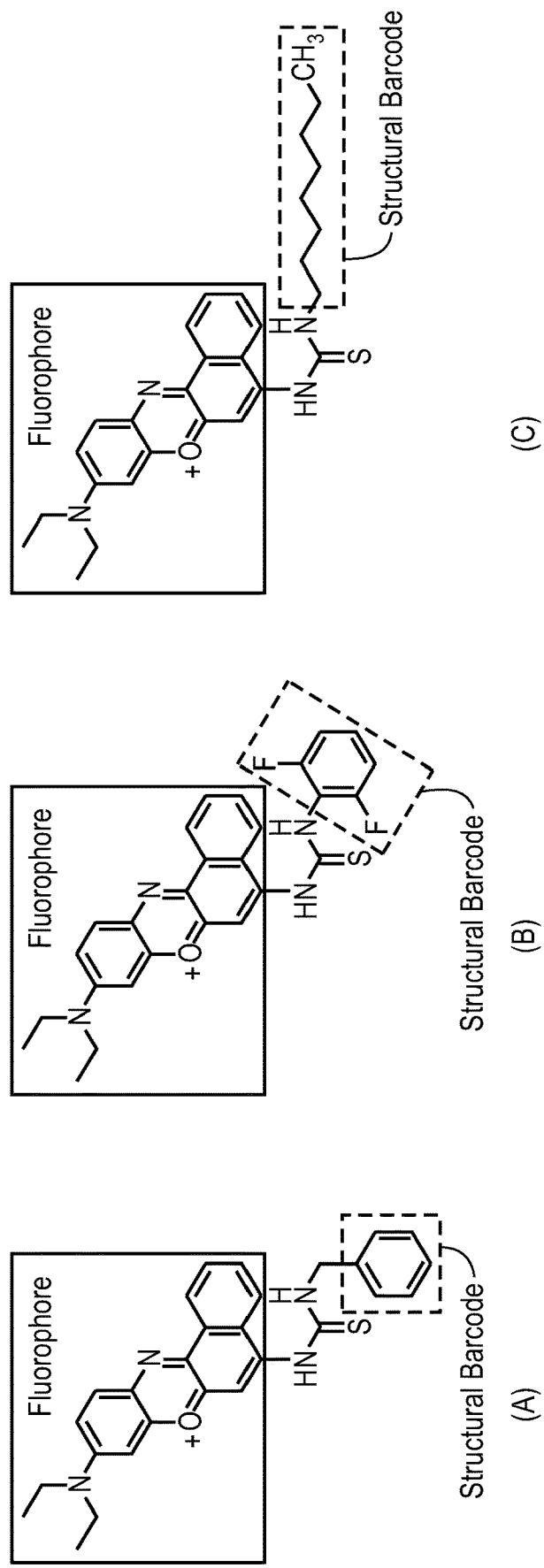
FIG. 29 is diagrams of typical molecular structures of synthesized fluorescent hydrophobic NB derivatives in Example 2.

The reactions were performed at room temperature in a bi-phase system. Typically, an isothiocyanate compound containing a hydrophobic fatty chain or an aromatic ring was dissolved in an organic solvent such as chloroform, and NB containing amino groups was dissolved in deionized water, respectively. Then, the two solutions at stoichiometric molecular ratio were mixed in equal volumes. Applying vigorous magnetic stirring, the biphasic solutions became emulsion-like, and the reaction could continue under the stirring for >12 hours. Upon completion of the reaction and stop of the stirring, the emulsion-like solutions became biphasic again where the color of dye transferred from water phase to organic phase, implying the chemical conjugation between the isothiocyanate compound and the amine-tethered NB. By measuring and comparing the UV-vis absorption spectra before and after the reaction both in water and organic phases, results confirmed that >90% dye molecules in water can be effectively transferred into organic phase through the reactions. The isothiocyanate compounds used in in the synthesis and their structures are summarized in Table 2 and typical examples of the synthesized new dye compounds with different functional groups are shown in FIG. 29.

TABLE 2

Isothiocyanate compounds with alkyl or aromatic functional groups tested in Example 2 and their molecular structures.

| Name of Compound | Molecular Structure |
|---|---|
| Ethyl isothiocyanate | $CH_3-CH_2-NCS$ |
| Butyl isothiocyanate | $CH_3-(CH_2)_3-NCS$ |
| Hexyl isothiocyanate | $CH_3-(CH_2)_5-NCS$ |
| Octyl isothiocyanate | $CH_3-(CH_2)_7-NCS$ |
| Decyl isothiocyanate | $CH_3-(CH_2)_9-NCS$ |
| Dodecyl isothiocyanate | $CH_3-(CH_2)_{11}-NCS$ |
| Benzyl isothiocyanate | (benzyl-NCS structure) |
| 3-Fluorophenyl isothiocyanate | (3-fluorophenyl-NCS structure) |
| 2,6-Difluorophenyl isothiocyanate | (2,6-difluorophenyl-NCS structure) |

TABLE 2-continued

Isothiocyanate compounds with alkyl or aromatic functional groups tested in Example 2 and their molecular structures.

| Name of Compound | Molecular Structure |
|---|---|
| Trifluorophenyl isothiocyanate | 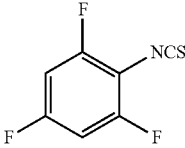 |

FIG. 29 is typical molecular structures of synthesized fluorescent hydrophobic Nile Blue derivatives in Example 2.

The ten synthesized NB derivative samples (modified Nile Blue compounds) were visually confirmed as highly soluble in toluene and chloroform, and thus confirmed as soluble in oil phases. Evaluated in both (A) water-toluene and (B) water-chloroform mixtures were NB, NB-Ethyl, NB-Butyl, NB-Octyl, NB-Decyl, NB-Benzyl, NB-4-Fluorophenyl, NB-2,6-Difluorophenyl, and NB-2,4,6-Trifluorophenyl.

Figure 30:
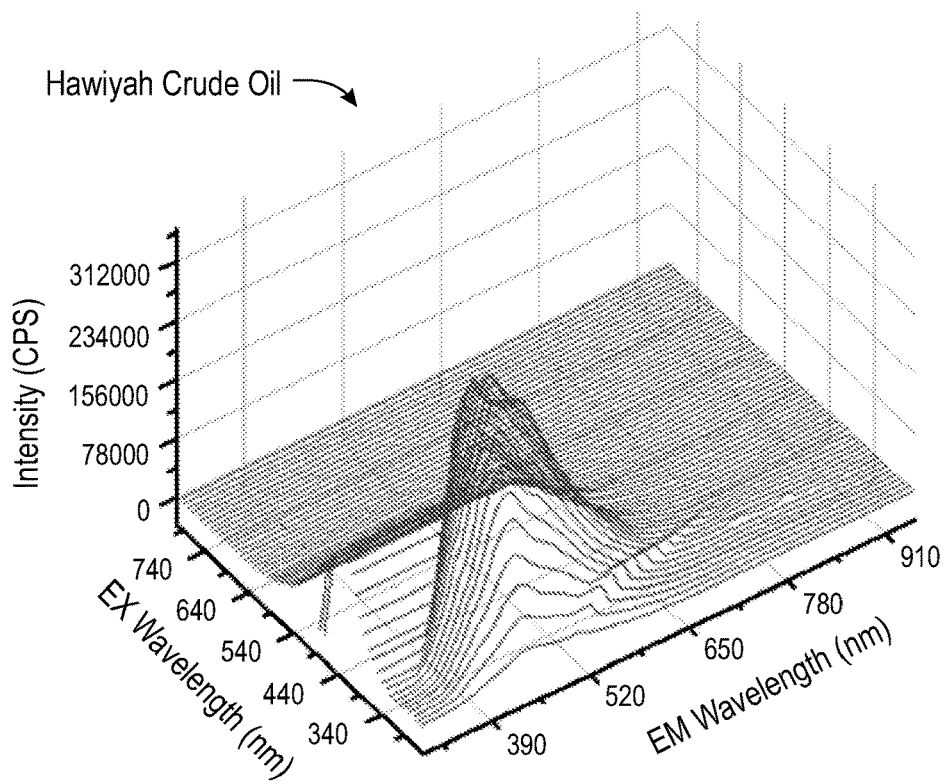
FIG. 30 is plots of fluorescence spectra of (A) crude oil and (B) NB in water.
Figure 30:
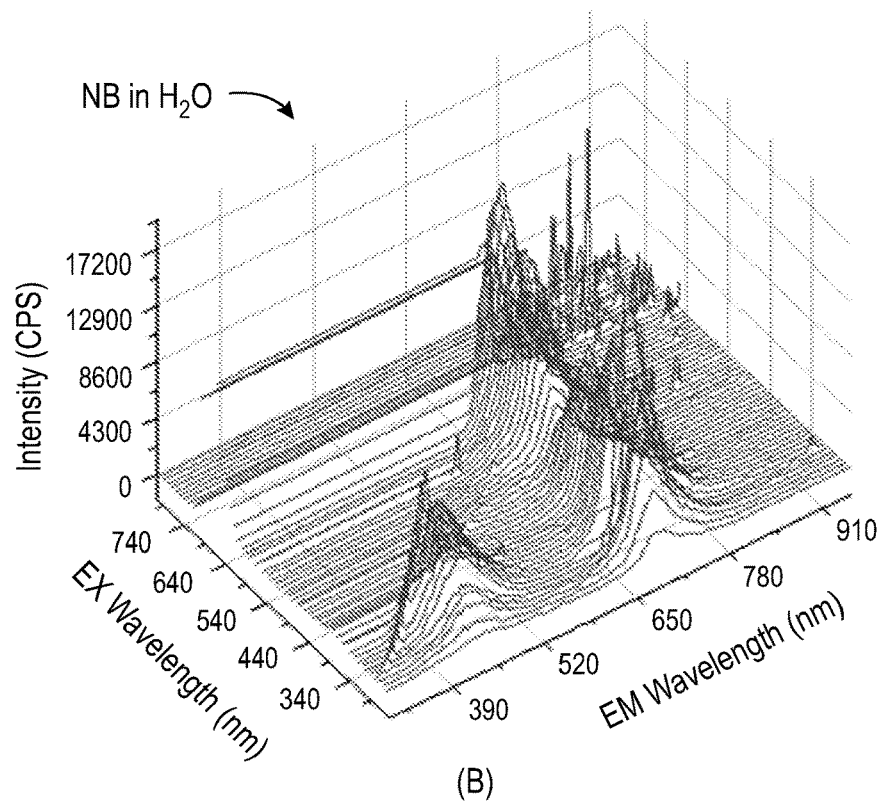
Figure 31:
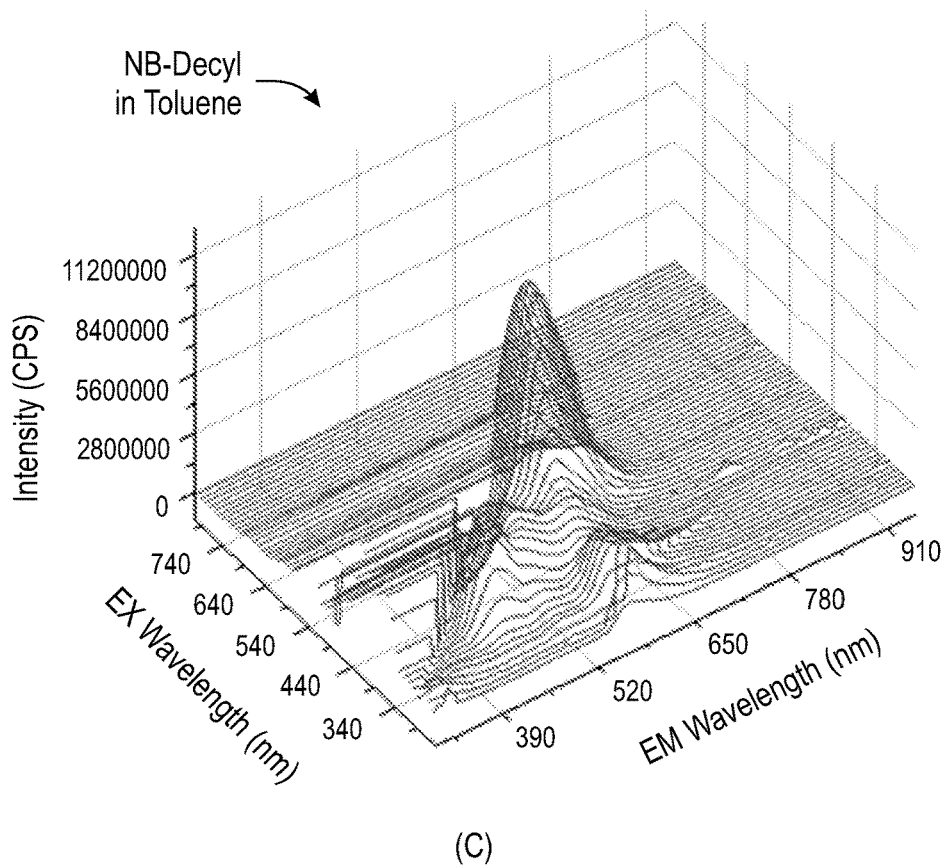
FIG. 31 is plots of fluorescence spectra of (C) NB-Decyl in toluene and (D) NB-Benzyl in chloroform.
Figure 31:
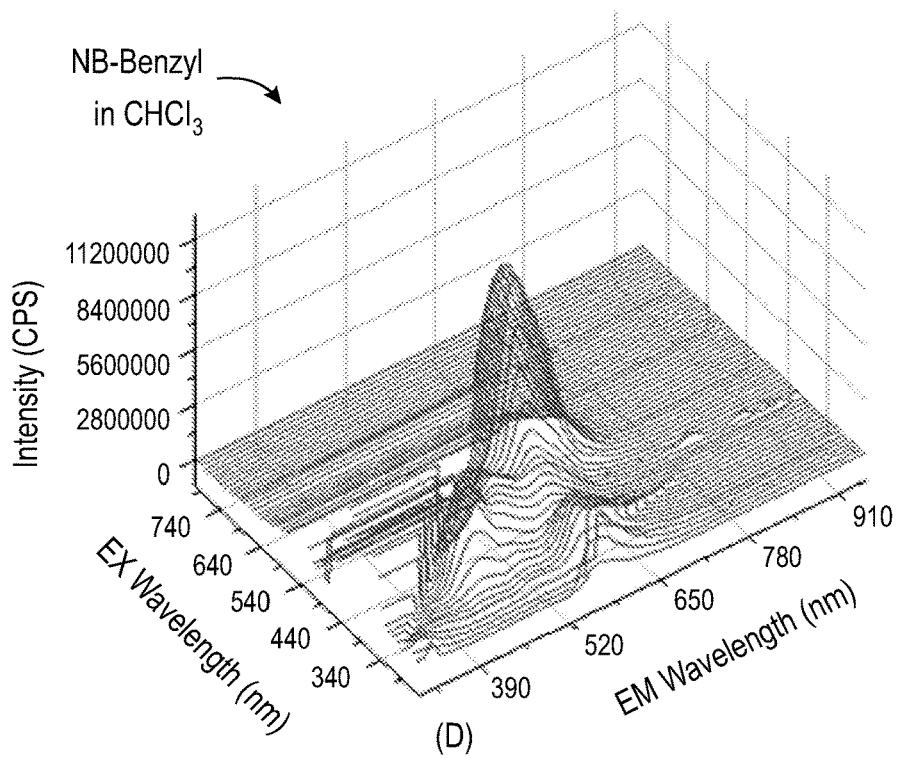

FIG. 30 is fluorescence spectra of (A) crude oil and (B) NB in water. FIG. 31 is fluorescence spectra of (C) NB-Decyl in toluene and (D) NB-Benzyl in chloroform. Two-dimensional (2D) fluorescence spectra of the synthesized compounds in different solvents were measured with a Horiba NanoLog spectrometer with a Xenon lamp and 2658 PMT detector. Three-dimensional (3D) representations are given.

Compared to the water-soluble NB, the spectra for the oil-soluble NB derivatives reveal that the introduction of different functional groups into structure of NB does not affect the intensity on fluorescence. Some degree of shifts in profiles of excitation-emission confirms the chemical modification on molecular structures (see FIG. 30 and FIG. 31). When compared the spectra between a typical crude oil and the structure-modified NB, it can be noticed that the excitation-emission maxima of crude oil mainly appear in relatively low wavelength range at around 400-500 nm, while the NB derivatives are in relatively high wavelength range at around 500-600 nm. This mismatch in spectral ranges give some potential to detect the dyes by fluorescence spectroscopy in crude oil samples without need of a complete pre-separation.

Figure 32:
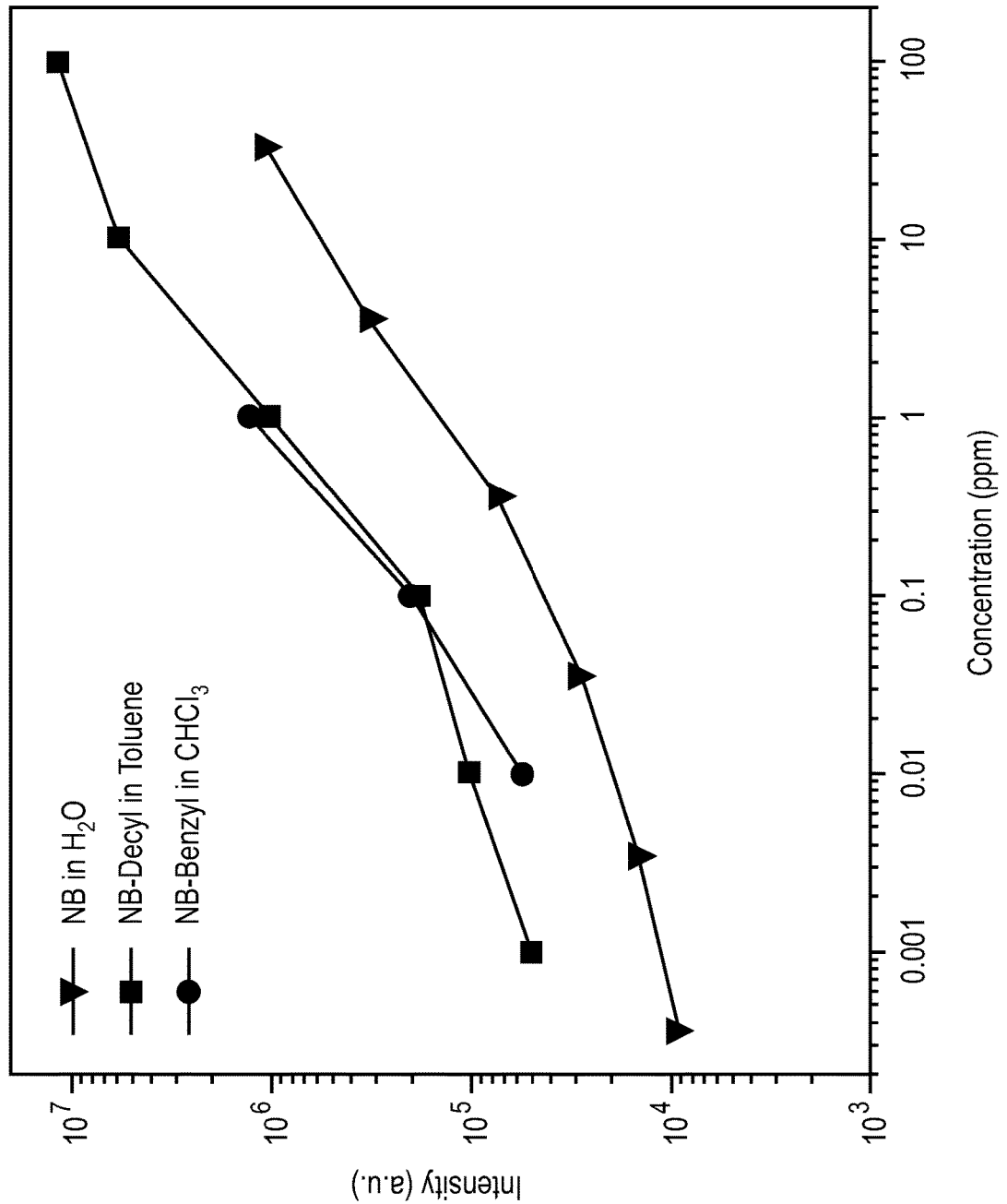
FIG. 32 is a plot of intensity versus concentration for three solutions of NB.

FIG. 32 is a plot of intensity (a.u.) versus concentration (ppmv) for three solutions: NB in water, NB-Decyl in toluene, and NB-Benzyl in chloroform ($CHCl_3$). The LOD of NB derivatives in organic solvents was determined by fluorescence spectroscopy with Horiba NanoLog spectrometer. Fluorescence measurement at different concentrations of the NB derivatives in different solvents showed that limit of detection (LOD) could lower down to ppbv levels (FIG. 32). These experimental results demonstrate that oil-soluble NB derivatives with different structural barcodes can be synthesized and they exhibit high potentials to be used as oleophilic tracers for quantification of zonal flow in embodiments of the present techniques.

Example 3: Evaluated were optically detectable commercially available fluorophores (curcumin). Presented is an introduction on curcumin. Also given are results of the evaluation in Example 3.

Figure 33:
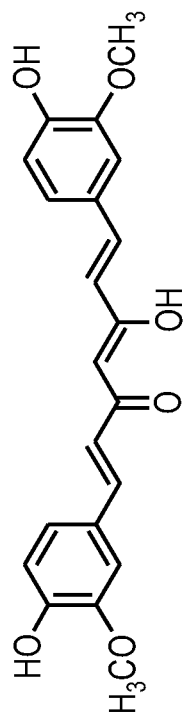
FIG. 33 is a diagram of the chemical structure of curcumin molecule.
Figure 33:
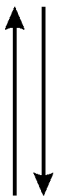
Figure 33:
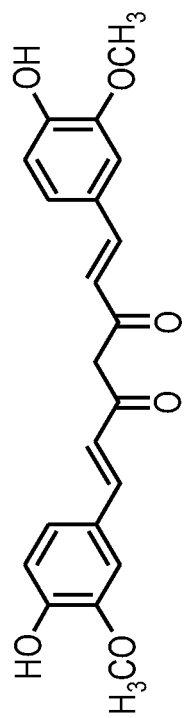

FIG. 33 is the chemical structure of curcumin molecule. As for an introduction, curcumin is an inexpensive natural compound used for medical and food-industrial applications due to its antioxidant, anti-inflammatory, antifungal, antiviral, and antiseptic properties. In addition to these applications, curcumin can be used for fluorescence labeling in disease diagnostics/theranostics and monitoring photodynamic antimicrobial inactivation. Because curcumin is soluble in various organic solvents and displays strong green fluorescence under UV light, curcumin can be readily utilized as oil-soluble tracers. Again, the structure of curcumin is shown in FIG. 33.

As for results, the primary experimental results in Example 3 demonstrated that curcumin in organic solvents exhibits strong fluorescence (see FIG. 34), and the LOD could achieve to ppb concentration level, indicating the potential for application as oil-soluble tracers. Due to the linear β-diketone structure of curcumin, curcumin may chelate with certain rare-earth ions such as $Eu^{3+}$ and $Tb^{3+}$ to form complexes. Energy transfer between rare earth ions and the organic ligands can happen in this type of complexes, which results significantly long life-time enhancement of fluorescence from the rare-earth ions. Based on these properties, it is possible to detect the curcumin molecules from crude oil by time-gated fluorescence without the need for a pre-separation from the crude oil matrix because the background fluorescence signal from crude oil can be filtered out in a time-gated fluorescence.

Figure 34:
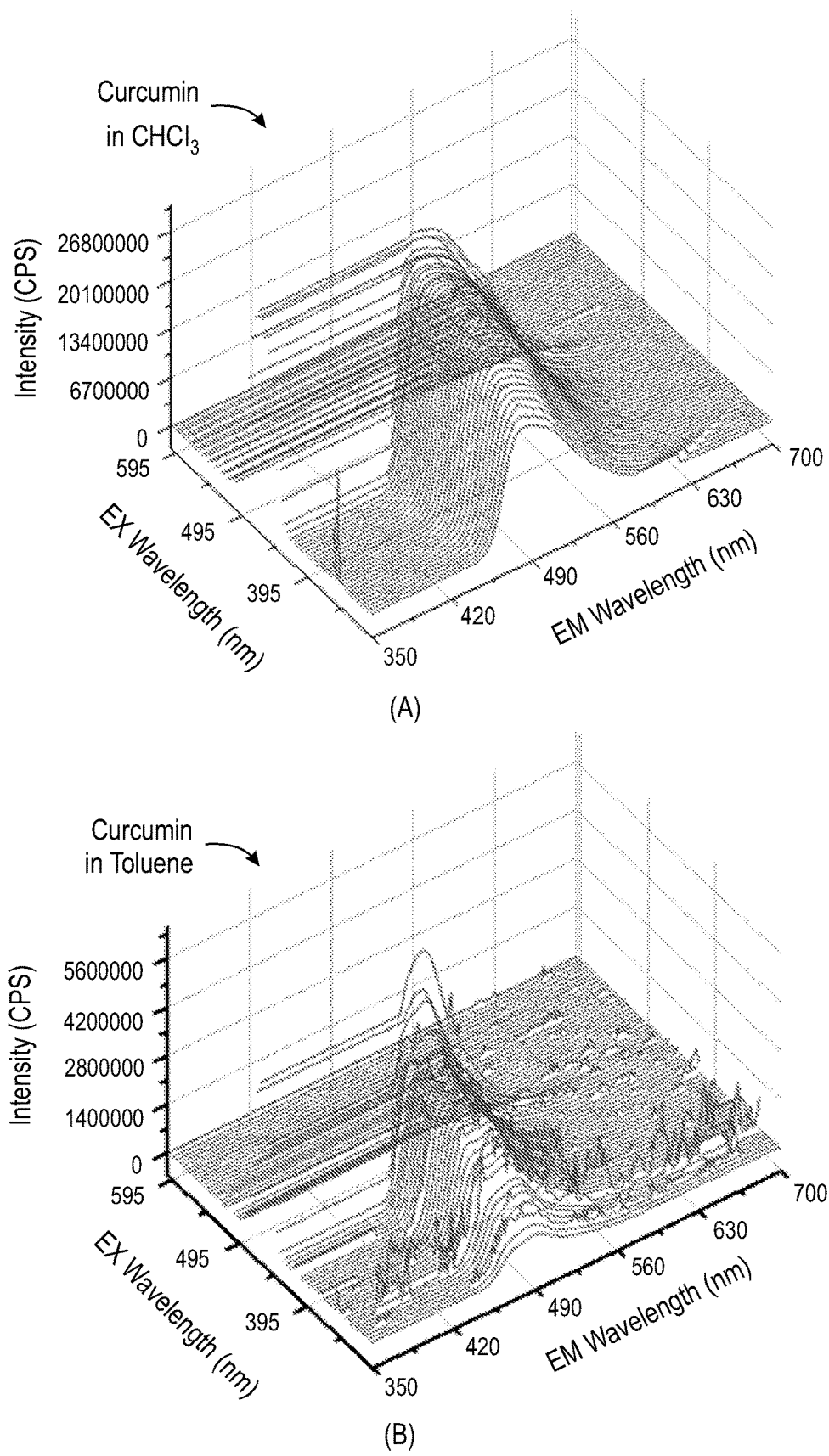
FIG. 34 is plots of fluorescence spectra of curcumin in different organic solvents (a) chloroform and (b) toluene.

FIG. 34 is fluorescence spectra of curcumin in different organic solvents (a) chloroform and (b) toluene.

Figure 35:
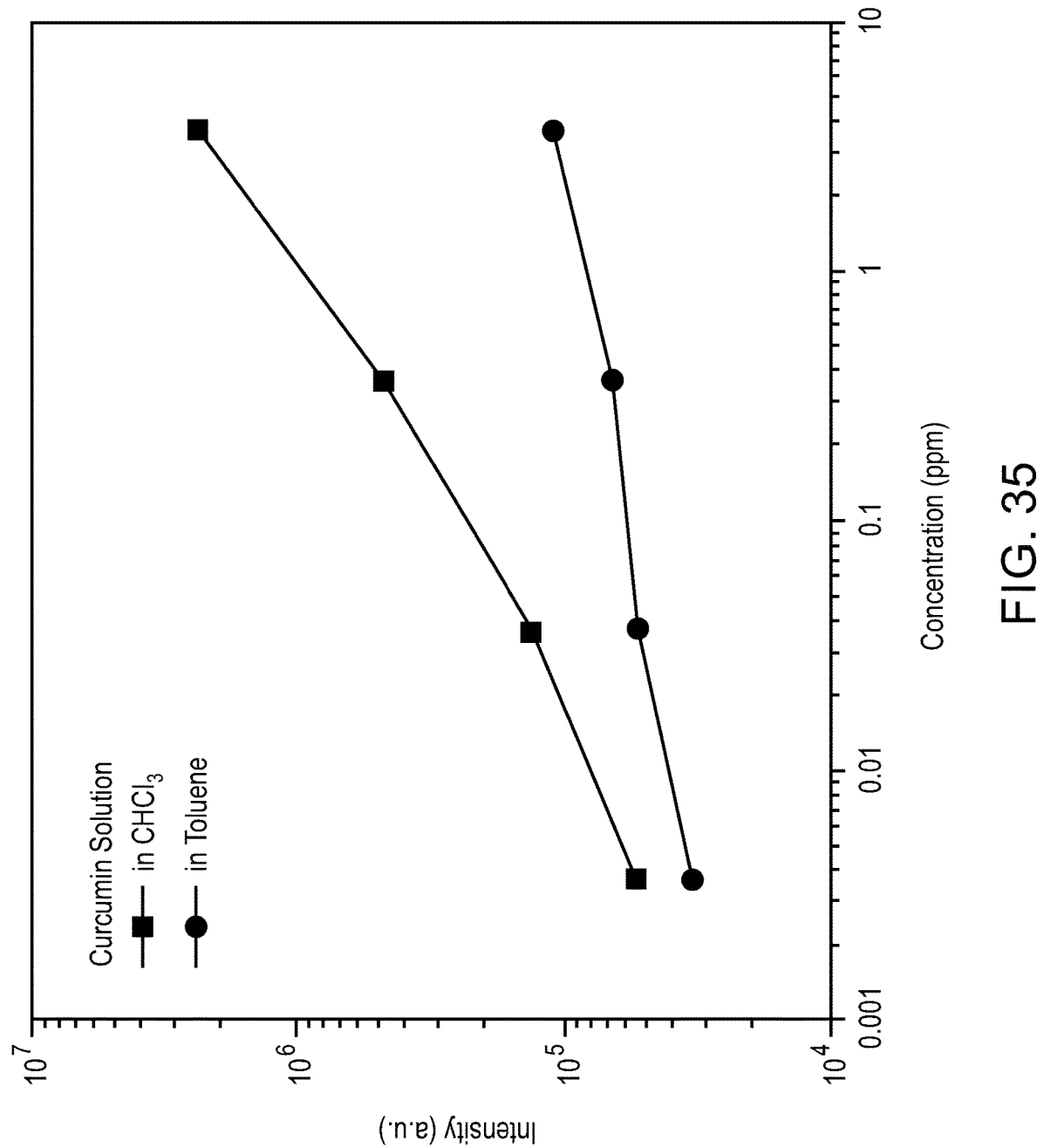
FIG. 35 is a plot indicating limits of detection (LOD) of curcumin in organic solvents determined by fluorescence spectroscopy.
Figure 36A:
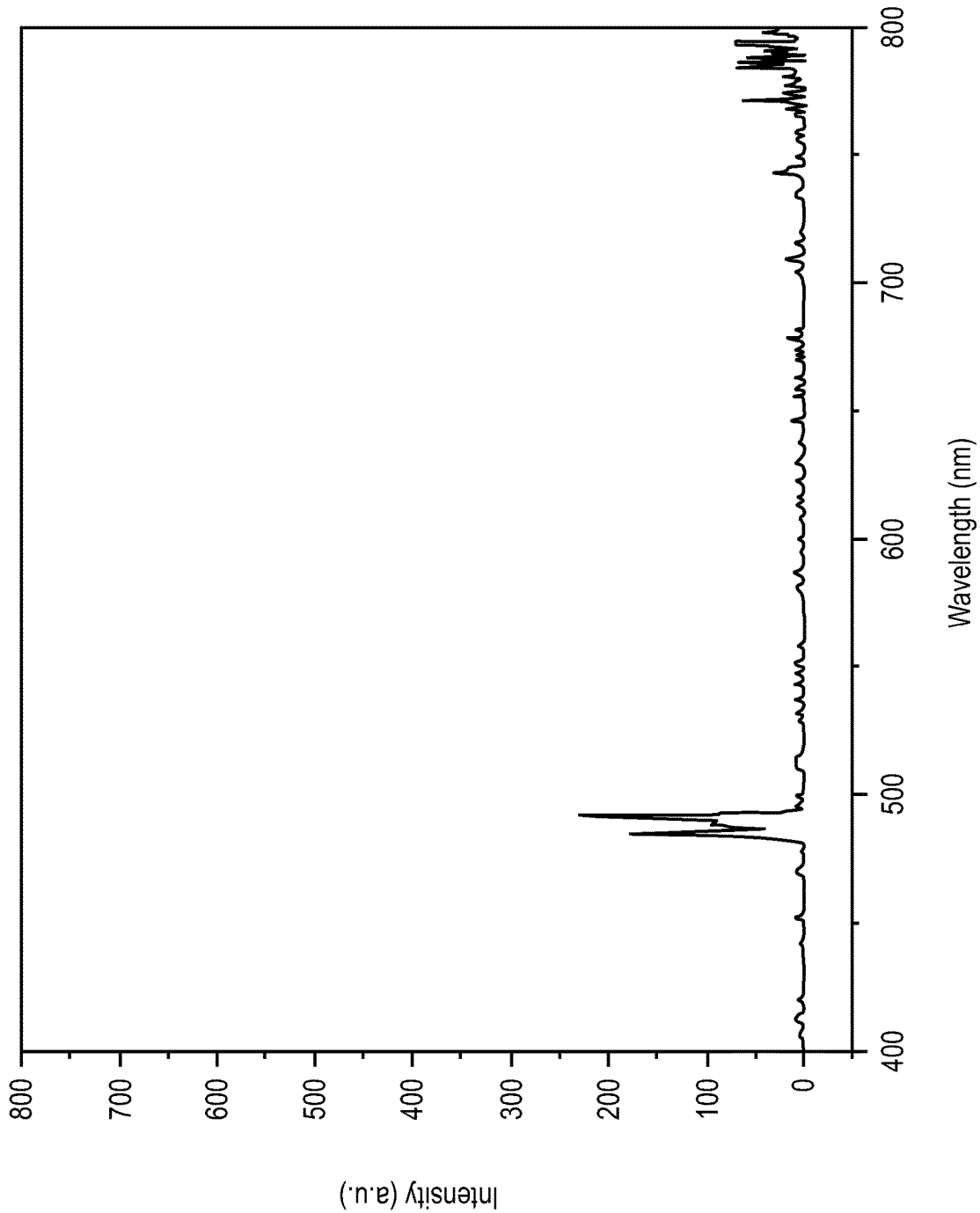
FIG. 36A, FIG. 36B, FIG. 36C, and FIG. 36D are plots of intensity (a.u.) versus wavelength (nm) giving fluorescence emission spectra for upconverting nanoparticles (UCNP) and blank.
Figure 36B:
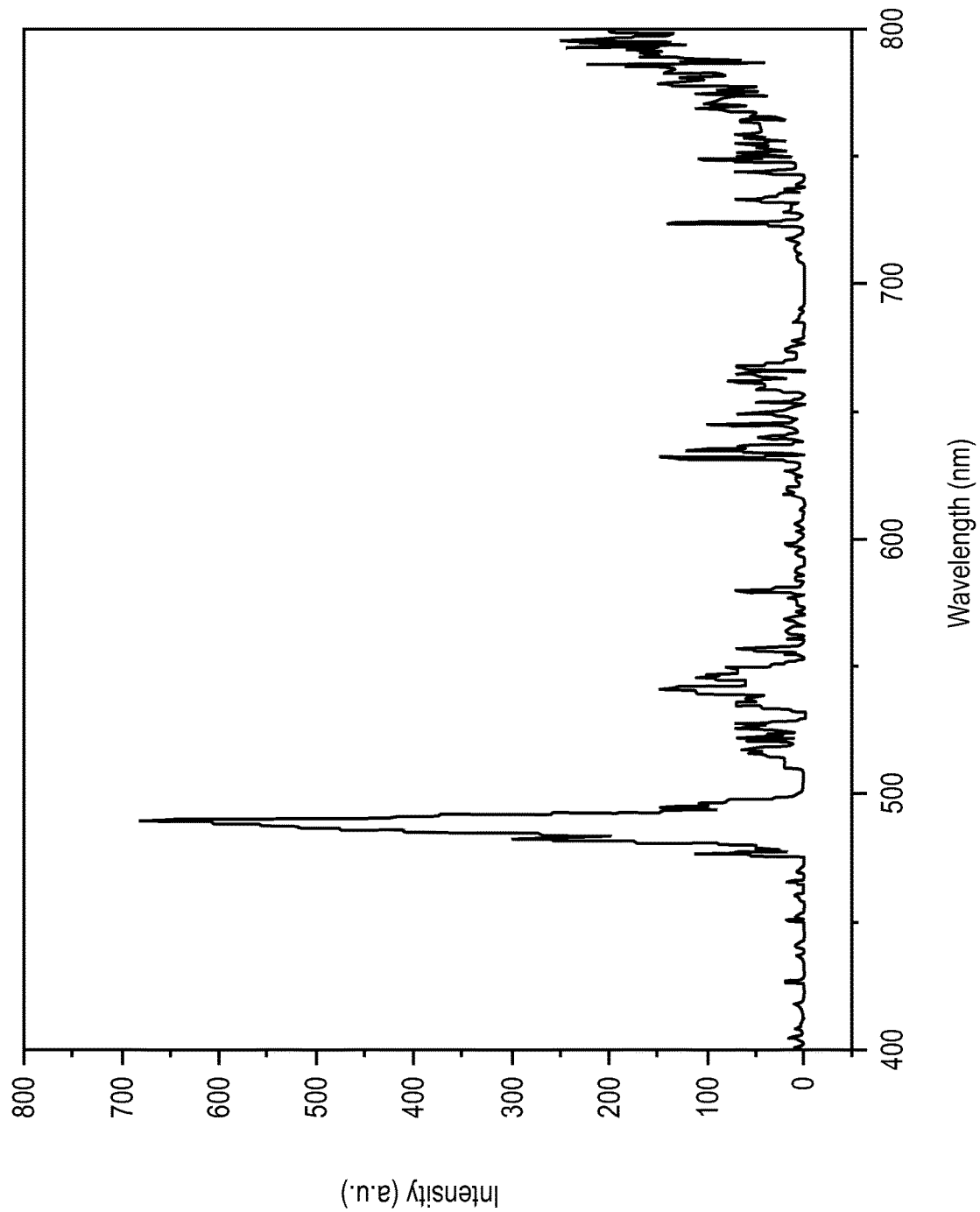
Figure 36C:
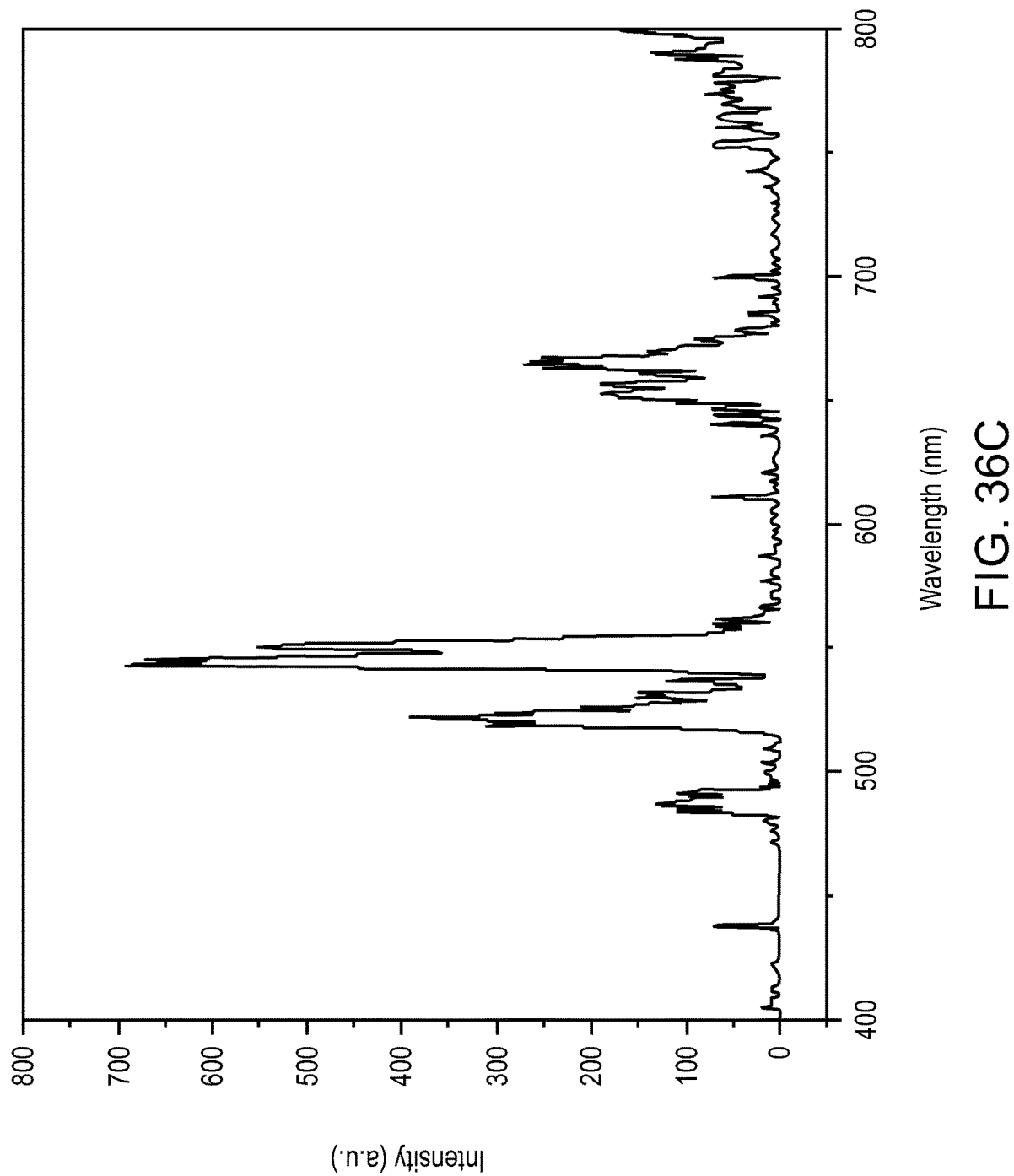
Figure 36D:
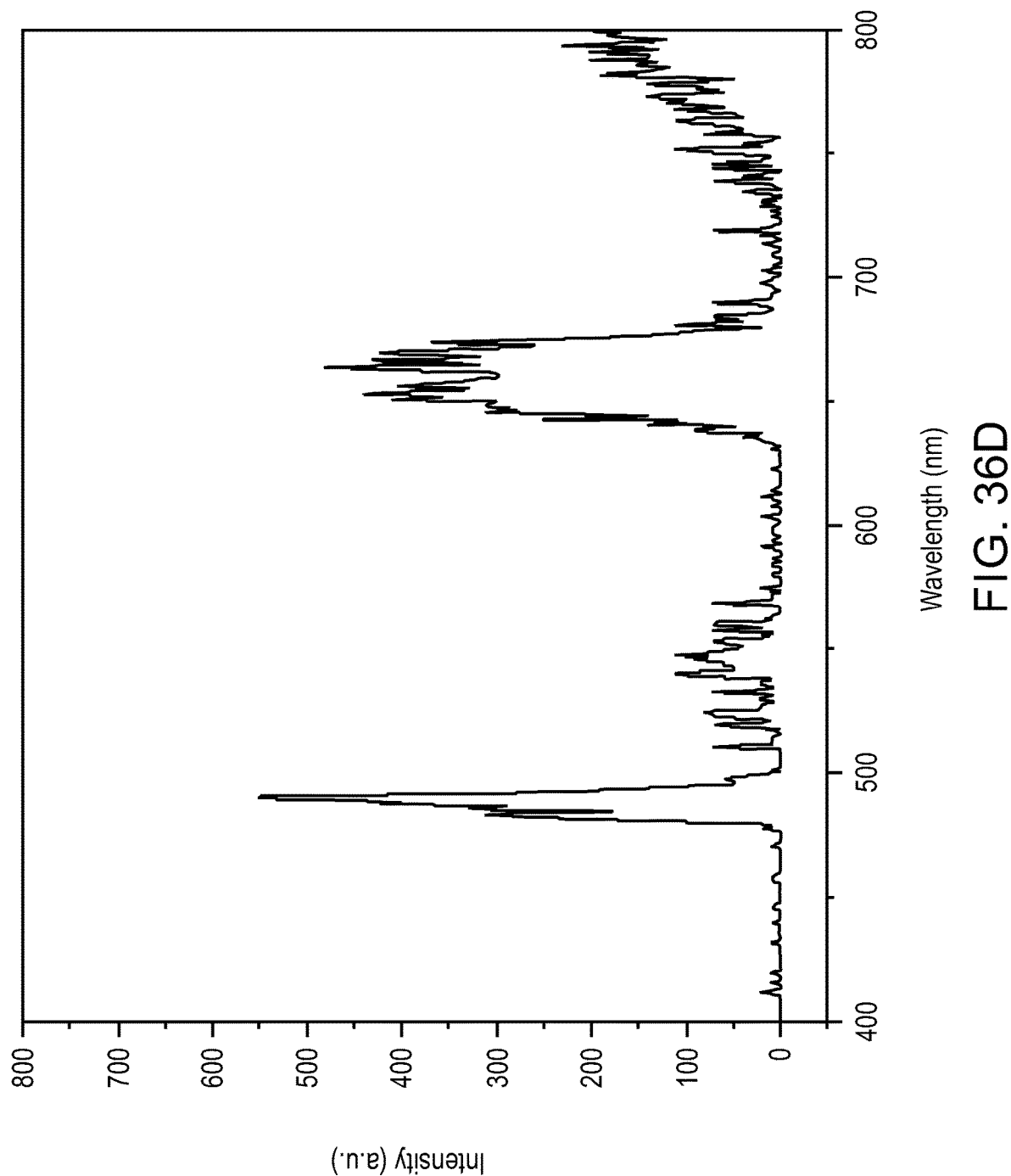

FIG. 35 is a plot indicating LOD of curcumin in organic solvents determined by fluorescence spectroscopy with Horiba NanoLog spectrometer.

Example 4: Evaluated were optically detectable upconverting nanoparticles. Presented are an introduction, experimental procedure, and results.

As for the introduction, upconverting nanoparticles (UCNP) have unique characteristics that two or more incident photons with relatively low energy are absorbed and converted into one emitted photon with higher energy. The absorption of UCNPs occurs in the infrared while the emission arises in the visible or ultraviolet regions of the electromagnetic spectrum. Because crude oil has no such upconversion properties, there will be generally little or no background interference in the measurement of fluorescence for the UCNPs and thus no complex sample preparation (separation and purification) is required. Synthesized in Example 4 is a series of UCNPs. The synthesized samples are rare-earth element doped oxides and are environment-friendly for industrial application. The UCNPs of $NaYF_4$:Yb/Er, $NaYF_4$:Yb/Ho, $NaYF_4$:Yb/Tm, $NaGdF_4$:Yb/Er, $NaGdF_4$:Yb/Ho, $NaGdF_4$:Yb/Tm, $YbPO_4$:Yb/Er, $YbPO_4$:Yb/Ho and $YbPO_4$:Yb/Tm were synthesize, where Na is sodium, Y is Yttrium, F is fluorine, Yb is Ytterbium, Ho is holmium, Tm is thulium, Er is erbium, Gd is gadolinium, P is phosphorous, and O is oxygen. These synthesized UCNPs emit the light in different colors (blue, yellow and red) at visible wavelength range under near infrared (NIR) excitation (980 nm).

As for experimental procedure, UCNPs, $NaYF_4$:$Er^{3+}$(3%) $Yb^{3+}$(20%) were synthesized by wet-chemical method and their surfaces were functionalized to hydrophobic, enabling to be dispersible in organic solvents. The surface functionalization was performed by chemically bonding a hydrophobic group of —$(CH_2)_{17}$—$CH_3$ via hydrolysis reaction with a silane coupling agent, trimethyl(octadecyloxy)silane, or via physical adsorption of oleyl amine. UCNPs were prepared in crude oil at various concentrations for fluorescence measurement. The fluorescence emission spectra with wavelength at 663 nm were measured with laser excitation wavelength at 980 nm with laser power of 2.0 W using Horiba Nanolog system.

FIGS. 36A-36D are plots of intensity (a.u.) versus wavelength (nm) giving fluorescence emission spectra for UCNP (and blank) with wavelength at 663 nm measured with the excitation wavelength at 980 nm. The three concentrations of UCNP plotted include 0.001 weight percent (wt %) in crude oil, 0.01 wt % in crude oil, and 0.1 wt % in crude oil. As for results in Example 4, see FIGS. 36A-36D. The fluorescence spectra of UCNPs in crude oil were collected, and clear fluorescent upconverting emission wavelength centered at 633 nm with excitation wavelength of 980 nm over crude oil observed. The limit of detection was determined as about 0.001 wt % (about 10 ppmv as shown in FIGS. 36A-36D) of UCNPs in crude oil. Note that the measurement was performed without purification or separation of UCNPs from crude oil, and front face measurement by measuring only one face of samples in 3 mL cuvettes.

A number of implementations have been described. Nevertheless, it will be understood that various modifications may be made without departing from the spirit and scope of the disclosure.

What is claimed is:

1. A method of quantifying zonal flow in a multi-lateral well, comprising:
   flowing first produced fluid comprising hydrocarbon from a subterranean formation via a first lateral in a wellbore of the multi-lateral well through a first valve into production tubing in the wellbore;
   flowing second produced fluid comprising hydrocarbon from the subterranean formation via a second lateral in the wellbore through a second valve into the production tubing;
   providing a first taggant through a first dosing tubing to the first produced fluid in the first lateral;
   providing a second taggant through a second dosing tubing to the second produced fluid in the second lateral, wherein the first taggant and the second taggant are oil soluble;
   flowing a produced stream comprising the first produced fluid and the second produced fluid uphole through the production tubing and discharging the produced stream from the wellbore;
   shutting off the first taggant and the second taggant provided to the first produced fluid and the second produced fluid, respectively, resulting in respective transients in concentrations of the first taggant and the second taggant flowed with the produced stream;
   analyzing the produced stream to measure an amount of the first taggant in the produced stream and an amount of the second taggant in the produced stream; and
   analyzing the respective transients in concentrations of the first taggant and the second taggant to determine influx rate of the first produced fluid and the second produced fluid from the first lateral and the second lateral, respectively.

2. The method of claim 1, wherein the first taggant and the second taggant each comprise a taggant that comprises hydrophobic organic fluorophores soluble in apolar phases.

3. The method of claim 1, wherein the first taggant and the second taggant each comprise at least one of a perylene derivative, a pyrromethene derivative, a benzothiadiazole derivative, a dipicolinic acid (DPA) derivative, a phenanthroline dicarboxylic acid (PDCA) derivative, curcumin, or an upconverting nanoparticle (UCNP).

4. The method of claim 1, wherein the hydrocarbon comprises crude oil, wherein the first taggant is different from the second taggant, and wherein the first valve and the second valve are disposed along the production tubing to receive the first produced fluid and the second produced fluid, respectively, into the production tubing.

5. The method of claim 4, wherein the hydrocarbon further comprises natural gas, wherein the first valve and the second valve are each an interval control valve (ICV), wherein the wellbore is formed through the Earth's surface into the subterranean formation in the Earth's crust, and wherein at least one of the first produced fluid or the second produced comprises water.

6. The method of claim 1, comprising determining an amount of the first produced fluid in the produced stream and an amount of second produced fluid in the produced stream based on the amount of the first taggant in the produced stream as measured and the amount of the second taggant in the produced stream as measured.

7. A method of quantifying zonal flow in a multi-lateral well, comprising:
   providing a first tracer through a first dosing tubing to a first region of a wellbore of the multi-lateral well, the first region associated with a first lateral of the wellbore;
   providing a second tracer through a second dosing tubing to a second region of the wellbore, the second region associated with a second lateral of the wellbore, wherein the first tracer and the second tracer are each oil soluble and optically detectable;
   flowing from a subterranean formation a first produced fluid comprising hydrocarbon through the first lateral and a first valve into production tubing in the wellbore;
   flowing from the subterranean formation a second produced fluid comprising hydrocarbon through the second lateral and a second valve into the production tubing;
   flowing a produced stream comprising the first produced fluid and the second produced fluid uphole through the production tubing and discharging the produced stream from the wellbore;
   shutting off the first tracer and the second tracer provided to the first region and to the second region, respectively, resulting in respective transients in concentrations of the first tracer and the second tracer flowed with the produced stream;
   analyzing the produced stream to measure an amount of the first tracer in the produced stream and an amount of the second tracer in the produced stream; and
   analyzing the respective transients in concentrations of the first tracer and the second tracer to determine influx rate of the first produced fluid and the second produced fluid from the first lateral and the second lateral, respectively.

8. The method of claim 7, wherein the first region comprises an intersection of the first lateral with a vertical portion of the wellbore, wherein the second region comprises an intersection of the second lateral with the vertical portion, and wherein the production tubing is disposed in the vertical portion.

9. The method of claim 7, wherein the first tracer and the second tracer are soluble in crude oil.

10. The method of claim 7, wherein the first tracer and the second tracer each comprise a taggant that comprises hydrophobic organic fluorophores soluble in apolar phases.

11. The method of claim 7, wherein the first tracer and the second tracer each comprise at least one a perylene derivative, a pyrromethene derivative, a benzothiadiazole derivative, a dipicolinic acid (DPA) derivative, a phenanthroline dicarboxylic acid (PDCA) derivative, curcumin, or an upconverting nanoparticle (UCNP).

12. The method of claim 7, wherein the hydrocarbon comprises crude oil, wherein the first tracer is different from the second tracer, and wherein the first valve and the second valve are disposed along the production tubing.

13. The method of claim 12, wherein the hydrocarbon further comprises natural gas, wherein the first valve and the second valve are each an interval control valve (ICV), and wherein the wellbore is formed through the Earth's surface into the subterranean formation in the Earth's crust.

14. The method of claim 13, wherein the first tracer is provided from the Earth's surface through the first dosing tubing to the first region, and wherein the second tracer is provided from the Earth's surface through the second dosing tubing to the second region.

15. A method of quantifying zonal flow in a multi-lateral well, comprising:
provriding a first taggant from the Earth's surface through a first dosing tubing to a first region in a wellbore of the multi-lateral well, wherein the wellbore is formed through the Earth's surface into a subterranean formation in the Earth's crust, wherein the first region is a region of intersection of a first lateral in the wellbore with a vertical portion of the wellbore;
providing a second taggant from the Earth's surface through a second dosing tubing to a second region in the wellbore, wherein the second region is a region of intersection of a second lateral in the wellbore with the vertical portion;
producing a first produced fluid from the subterranean formation through the first lateral into production tubing in the wellbore;
producing a second produced fluid from the subterranean formation through the second lateral into the production tubing;
flowing a produced stream comprising the first produced fluid and the second produced fluid uphole through the production tubing and discharging the produced stream from the wellbore;
shutting off providing the first taggant and the second taggant to the first region and the second region, respectively, resulting in respective transients in concentrations of the first taggant and the second taggant flowed with the produced stream;
analyzing the produced stream to measure an amount of the first taggant in the produced stream and an amount of the second taggant in the produced stream, wherein the first taggant and the second taggant each comprise a taggant that comprises hydrophobic organic fluorophores soluble in apolar phases; and
analyzing the respective transients in concentrations of the first taggant and the second taggant to determine influx rate of the first produced fluid and the second produced fluid from the first lateral and the second lateral, respectively.

16. The method of claim 15, wherein producing the first produced fluid comprises flowing the first produced fluid through a first valve into the production tubing, wherein producing the second produced fluid comprises flowing the second produced fluid through a second valve into the production tubing, wherein the first valve and second valve are disposed along the production tubing.

17. The method of claim 16, wherein the first valve and the second valve are each an interval control valve (ICV).

18. The method of claim 15, wherein the first produced fluid comprises hydrocarbon and water, wherein the hydrocarbon comprises crude oil or natural gas, or both, and wherein the first taggant is different from the second taggant.

19. The method of claim 15, wherein the second produced fluid comprises hydrocarbon and water, wherein the hydrocarbon comprises crude oil or natural gas, or both, and wherein the production tubing is disposed in the vertical portion of the wellbore.

20. The method of claim 15, comprising calculating an amount of the first produced fluid in the produced stream and an amount of second produced fluid in the produced stream based on the amount of the first taggant in the produced stream as measured and the amount of the second taggant in the produced stream as measured.

* * * * *